United States Patent [19]
Ferris et al.

[11] Patent Number: 5,011,413
[45] Date of Patent: Apr. 30, 1991

[54] MACHINE-INTERPRETABLE FIGURAL RESPONSE TESTING

[75] Inventors: John J. Ferris, Titusville; William Kraft, Cranbury; Winton H. Manning, Princeton; Michael Martinez, Hopewell, all of N.J.

[73] Assignee: Educational Testing Service, Princeton, N.J.

[21] Appl. No.: 382,716

[22] Filed: Jul. 19, 1989

[51] Int. Cl.$^5$ .............................................. G09B 7/00
[52] U.S. Cl. .................................... 434/358; 434/325; 434/356; 434/362; 382/48; 382/59; 358/96
[58] Field of Search ............... 434/155, 162, 163, 165, 434/169, 201, 282, 307, 310, 314, 322, 323, 325–327, 331, 335–337, 349, 350, 354, 356, 358, 362, 363, 428, 429, 430; 382/48, 59; 340/706, 707, 708; 178/78; 341/5, 12, 14; 358/75, 96

[56] References Cited

U.S. PATENT DOCUMENTS

| | | | |
|---|---|---|---|
| 3,382,588 | 5/1968 | Serrell et al. | 434/335 X |
| 3,501,851 | 3/1970 | Price, Jr. et al. | 434/325 X |
| 3,761,877 | 9/1973 | Fernald | 434/337 X |
| 3,963,866 | 6/1976 | Tanie | 358/96 |
| 4,475,329 | 10/1984 | van Raamsdonk | 382/59 X |
| 4,518,361 | 5/1985 | Conway | 434/362 X |
| 4,547,161 | 10/1985 | Manning | 434/358 |
| 4,656,507 | 4/1987 | Greaves et al. | 358/96 |
| 4,897,736 | 1/1990 | Sugino | 358/75 X |

Primary Examiner—Robert Bahr
Assistant Examiner—Joe H. Cheng
Attorney, Agent, or Firm—Woodcock, Washburn, Kurtz, Mackiewicz & Norris

[57] ABSTRACT

This invention provides automatic testing systems and methods for testing for figural responses to a test inquiry. The testing system includes a test sheet of predetermined dimensions having a grid with a plurality of marking areas arranged in predetermined position and a figural arrangement having a first optical reflectivity arranged within the grid corresponding to one or more of the marking areas. The system includes indicia of a second optical reflectivity overmarking a selected number of the marking areas associated with the figural arrangement and optical scanning means having different optical sensitivities to the first and second optical reflectivities for scanning the sheet to determine the positions of the overmarked areas. The method of testing of this invention includes storing the position of at least one of the marking areas corresponding to a specified figural response to the test inquiry and instructing the test taker to make a figural response to the test inquiry by marking within the grid with indicia of a second optical reflectivity. This method of testing further includes optically scanning the test sheet to determined the positions of the marks made by the test taker and generating data representative of the marked positions, and then comparing the determined positions with stored positions in generating a numerical indication of the comparison of the test takers response to the specified stored response.

12 Claims, 5 Drawing Sheets

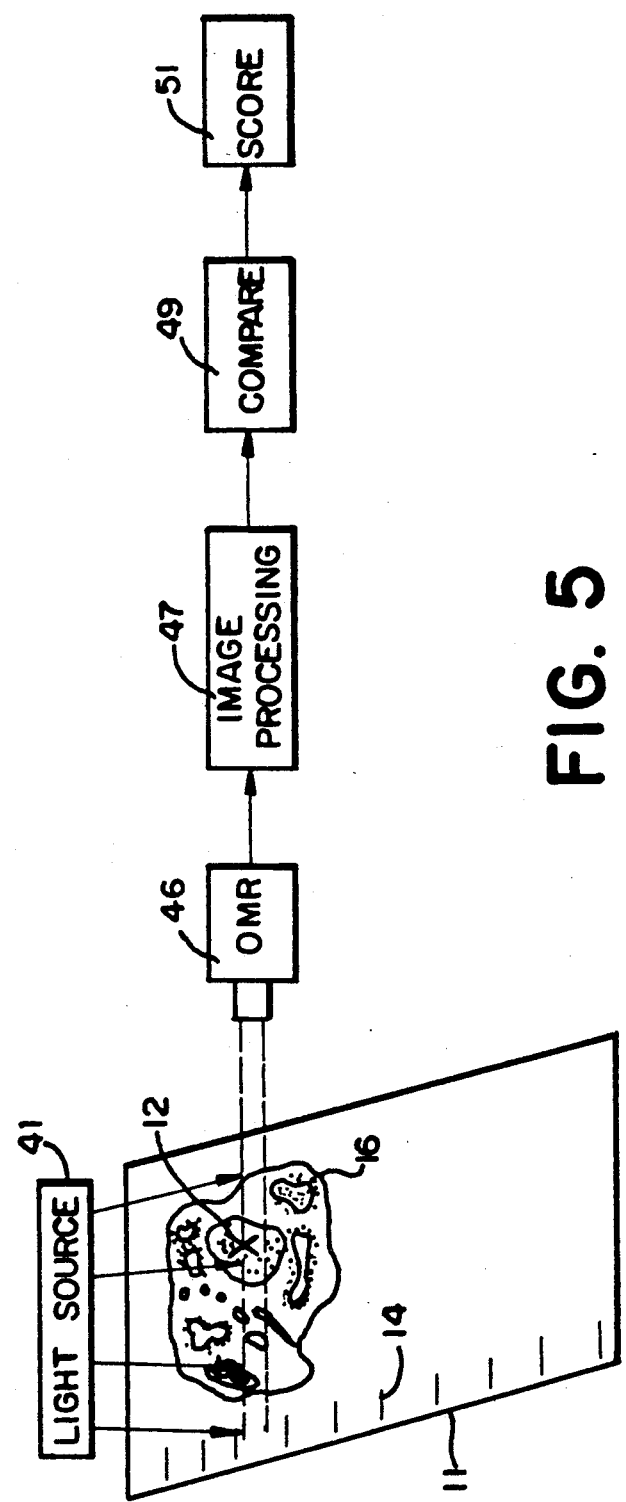

MACHINE-INTERPRETABLE FIGURAL RESPONSE TESTING

FIELD OF THE INVENTION

This invention relates to materials and techniques for standardized tests, and more particularly, to machine scoring of testing responses which measure skills not determined by multiple-choice tests.

BACKGROUND OF THE INVENTION

Large-scale standardized tests are generally limited to certain cognitive processes and behaviors that they require of examinees. Multiple-choice questions are favored because they can be scored objectively, quickly and at low cost. Scores derived from multiple-choice questions typically have good predictive and concurrent validity. However, such questions generally only test for recognition of correct answers and do not require constructed responses which more appropriately conform to the kinds of behavior that teachers want their students to express.

More recently, computers have been isolated as a potential medium for new forms of assessment. However, the economic and logistical problems of using computers for large scale assessment probably prohibits this option, at least in the foreseeable feature. It may be years before a feasible system of computer-based standardized testing can be provided to thousands of students, nationally.

Recently, an automatic testing system, referred to as "CLOZE-ELIDE" testing was developed at Educational Testing Service, Princeton, N.J. U.S. Pat. No. 4,547,161, Oct. 15, 1985, which is hereby incorporated by reference. This method provides a text of words having distractive words inserted therein to be elided by an examinee, the distractive words being positioned at predetermined positions in a text. Automatic scoring apparatuses are employed for determining the positions of the word "selected", comparing them to known locations, and automatically computing an indication of a test score. The scanner employed in the scoring of Cloze-Elide tests offers approximately 8 "dots" or "pixels" to the horizontal inch and 6 to the vertical inch. This type of testing is limited to textual responses within a very limited range of physical boundaries.

Accordingly, there is a need for a more general model for testing that is open-ended and not limited to the mere recognition of correct answers.

SUMMARY OF THE INVENTION

This invention provides automatic testing systems and methods of testing for determining and evaluating a figural response to test inquiries. The testing systems include a testing sheet of predetermined dimensions having a grid with a plurality of marking areas arranged in predetermined positions. The systems include a figural arrangement having a first optical reflectivity arranged within the grid and corresponding to one or more of the marking areas. As part of these systems, indicia of a second optical reflectivity, created by examinees, overmark a selective number of marking areas associated with a figural arrangement. The systems further include optical scanning means having different optical sensitivities to the first and second optical reflectivities for scanning the sheet to determine the position of the overmarked areas.

The methods of testing provided by this invention present a test sheet of predetermined dimensions having a grid comprising a plurality of marking areas arranged in predetermined positions. The grid further includes a figural arrangement having a first optical reflectivity and corresponding to one or more of the marking areas. The methods include storing the position of at least one of the marking areas corresponding to a specified figural response to the test inquiry and instructing a test taker to make a figural response to the test inquiry by marking within the grid with indicia of a second optical reflectivity. After the test has been completed by the examinee, the method optically scans a test sheet to determine the position of marks made by the test taker and generates data representative of the marked positions indicative of the shape and content of the marks. Finally, the determined positions are compared with the stored positions and a numerical indication of the comparison is generated.

Accordingly, the methods and systems provided by this invention more appropriately conform to the kind of problems likely to be faced in life, those that require the ability to recall and apply information, often in some kind of creative fashion. From a psychological point of view, very different kinds of processes occur when students must construct the response, compared to tasks which require recognition of a correct answer. This invention provides open-ended items which are preferable as teaching models. This is a significant improvement because of the perception that tests drive curricula, not only by influencing the kind of instruction teachers provide, but also by affecting the kinds of tests they construct and administer. Finally, this invention is better suited to diagnosing students' misconceptions than those items that only require selection of a correct response from among distractors. There has been a growing recognition that students' prior knowledge is very important from a pedagogical point of view; it can be a bridge or a barrier to further learning.

The figural response testing provided by this invention is especially important in the domain of science, where much information is stored and represented in the forms of tables, drawings, flow charts, matrixes, diagrams and pictures. Tests that allow students to represent data in graphs, point to and arrange components of systems, and show direction of processes or objects, are more representative of the kinds of activities scientists carry out than are the responses called for in most multiple choice tests. The inclusion of items that require figural responses increases the construct validity of a test.

Finally, the automatic testing methods and systems of this invention are machine-scorable. Figural responses, of course, can be scored by hand, but this would be expensive and time-consuming. However, machine scoring allows for an unconstrained number of such items on large scale assessments, involving thousands of examinees over multiple administrations. Once a program is written to reliably score an item, the item can be scanned an unlimited number of times at little cost and at high speed. Furthermore, it is likely that items will overlap in the kinds of scanning programs that can be written, and the process will become even more efficient and less expensive.

It is therefore, an object of this invention to provide an automatic testing system for administering figural response tests that is both economical and accurate.

It is another object of this invention to provide a method of testing for open-ended responses by requiring answers to figural inquiries that do not rely merely on the recognition of a correct answer.

BRIEF DESCRIPTION OF THE DRAWING

The accompanying drawings illustrate preferred flow charts and test inquiries suitable for use in connection with this invention, according to the best mode so far devised for the practical application of the principles thereof, and in which:

FIG. 5 is a diagrammatic illustration of a preferred testing system having an optical mark reader and image processing software.

DETAILED DESCRIPTION OF THE INVENTION

Figure 1:
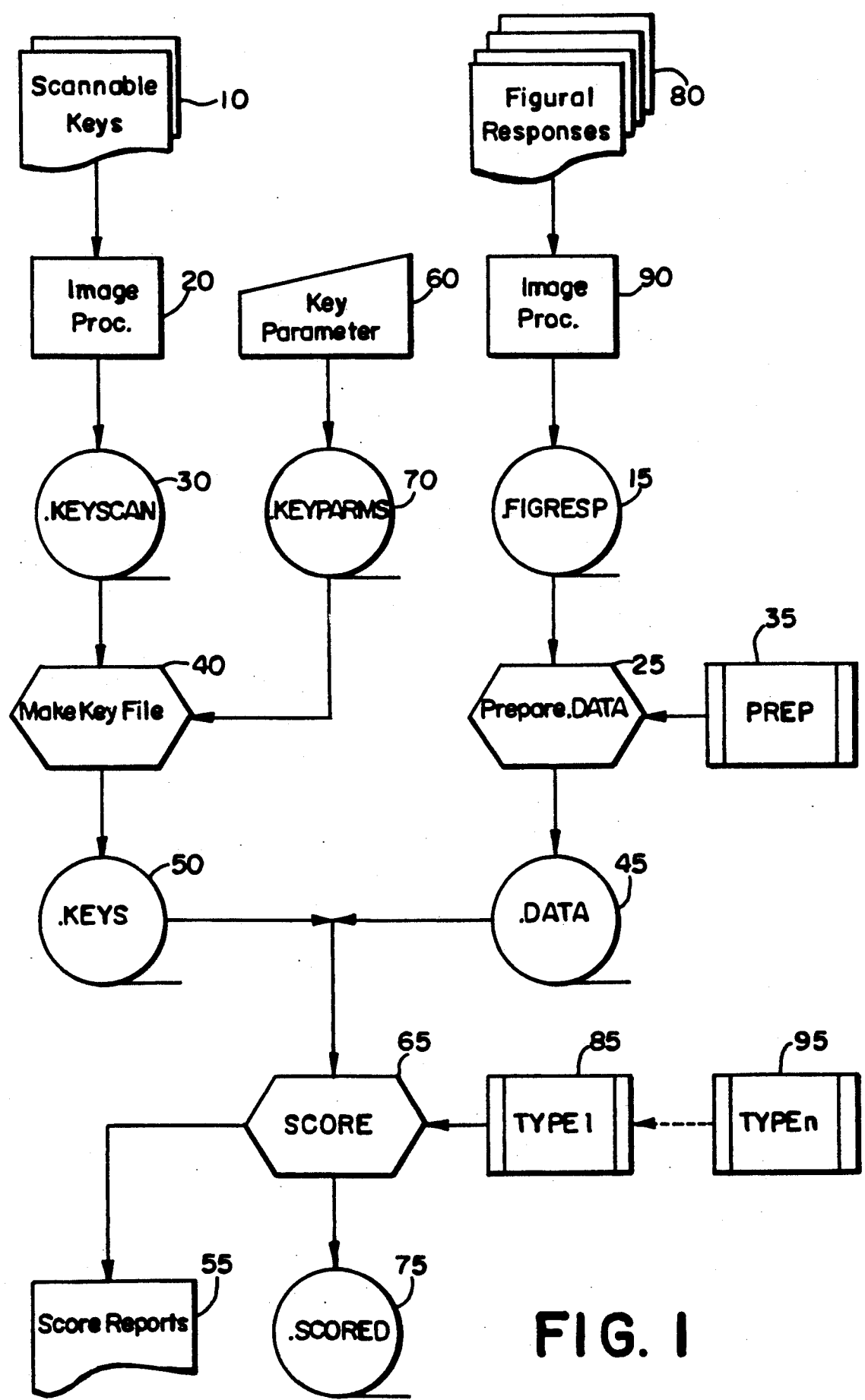
FIG. 1 is a preferred flow chart of the automatic testing system of this invention indicating how the keys are stored and compared with an examinee's figural responses.
Figure 2:
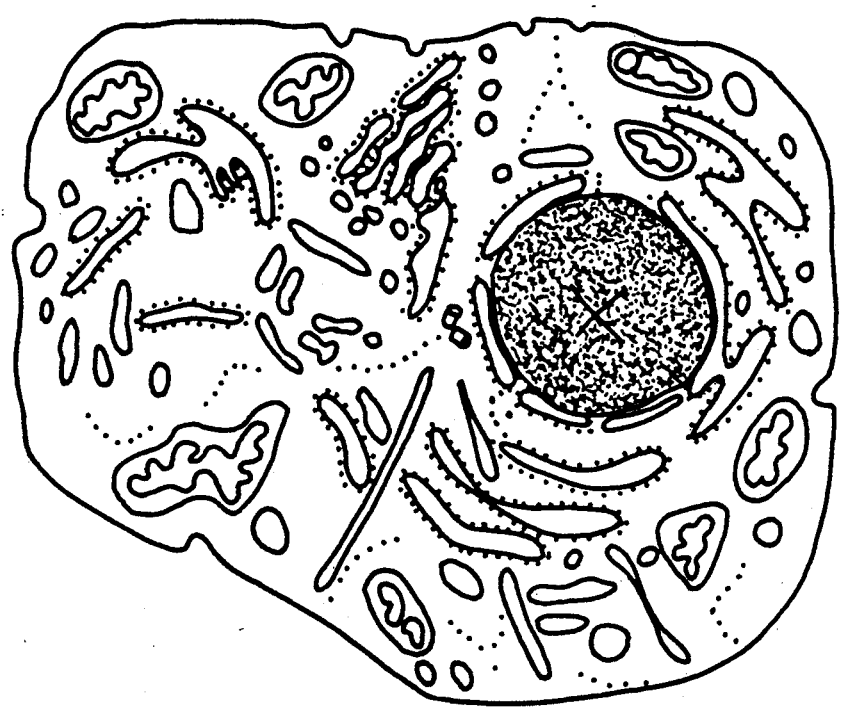
FIG. 2 is an exemplary test inquiry in which a diagram of a cell is shown, and an examinee has marked an X over the part of the cell where most of the cell's DNA can be found.
Figure 3:
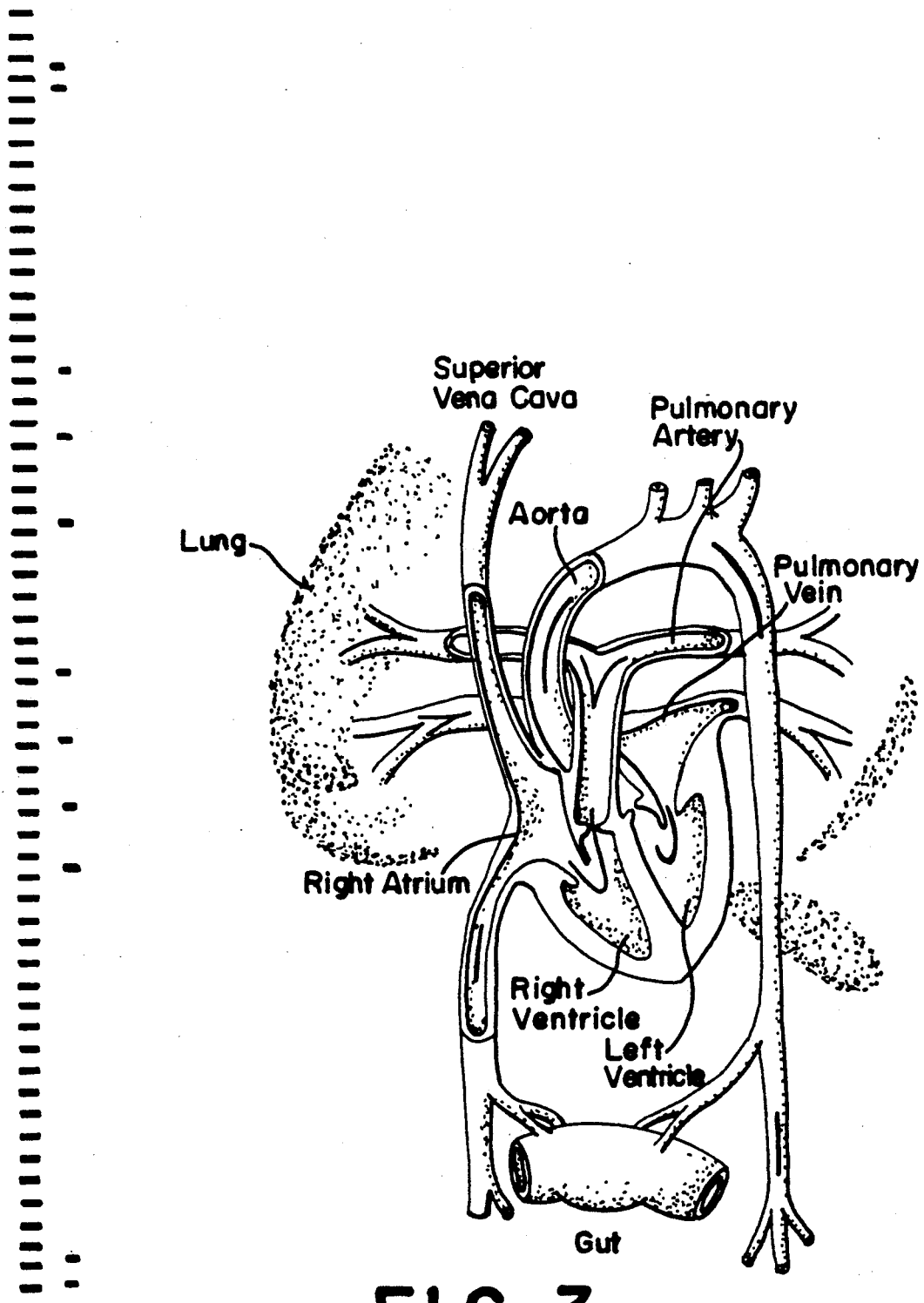
FIG. 3 is an exemplary test inquiry in which a diagram of blood flow and the circulatory system of a human chest is described, an examinee is requested to draw arrowheads on the dark lines to show which way the blood flows.
Figure 4:
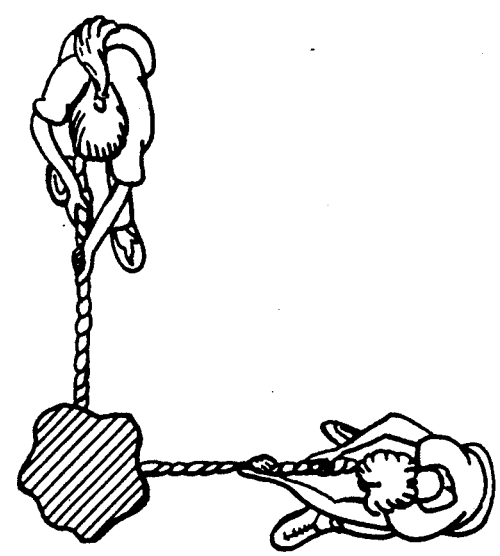
FIG. 4 is another exemplary test inquiry including a description of two children moving a rock by pulling equally on two ropes attached to it, whereby the examinee is instructed to draw an arrow to show the direction that the rock will move.

The preferred embodiments employing the principles of this invention will now be described. In the automatic testing system of this invention, described in FIGS. 1 and 5, a test sheet 11 is provided including predetermined dimensions having a grid comprising a plurality of marking areas arranged in predetermined positions. For the purposes of this embodiment, the grid and marking areas are not visible to the examinee, but represent memory areas in a data bank for use in scoring. The test sheet 11 includes a figural arrangement 16 on the grid having a first optical reflectivity. Preferably, the first and second optical reflectivities described herein contrast one another in sufficient amount to permit a difference in detection in the scanner. The term "figural arrangement" includes the figure of the inquiry as well as the underlying test sheet. Preferably, both the figure and test sheet have low optical reflectivity representing the first optical reflectivity, although their reflectivities may differ somewhat. The overmarking created by an examinee, which preferably is a pencil mark 12, represents the second optical reflectivity and preferably has a very enhanced optical reflectivity relative to the first optical reflectivity. The figural arrangement corresponds to one or more of the marking areas. Drawings, diagrams, flow charts, tables and graphs of all kinds can be used for the figural arrangement of this invention. These arrangements are important in summarizing scientific data and models. Examples of figural arrangements suitable for use in connection with this invention are described in FIGS. 2-4.

Science tests, and tests in other subjects, that freely call for figural responses, assess knowledge and skills left unexamined by most tests. Furthermore the knowledge gained from research in the analysis of pencil-and-paper figural responses should be directly transferrable to a computer based assessment. Figural responses may have great value in the areas outside of science including mathematics, engineering and geology, and in such occupational fields as plumbing, auto mechanics and art. However, they are not limited to any of these subject areas; rather one can think of figural responses that would be appropriate to just about any field.

After the examinee has provided a figural response to a test inquiry by marking within a grid indicia of a second optical reflectivity, it becomes necessary to determine the positions of the marks 12 made by the test taker. One method of optically scanning figural responses is to use existing optical mark reader (OMR) scanning systems having sufficient resolution to produce meaningful data. In this context, the scanner used in U.S. Pat. No. 4,547,161 for Cloze-Elide scoring offers approximately 8 "bubbles" to the horizontal inch and 6 to the vertical inch. While this has been reasonably adequate for the purposes of Cloze-Elide, it is believed that this resolution would make the scanning of two-dimensional drawings, at best, difficult. Accordingly, high resolution OMR 46 and optical-scanning imaging (OSI) is preferred in combination with light source 41. OSI scanners have a known resolution exceeding 400 dots per inch (dpi), both vertically and horizontally, although a resolution of about 40-300 dpi is more favorable for the invention. At this resolution, it is believed that there would be little chance of significant portions of a response going undetected because they did not fall within the boundaries of a particular pixel. In a most preferred embodiment, blocks of 30×30 pixels are employed, having a very manageable 2500 dot blocks in about a 5-inch square. This would be a resolution of about 10 dpi in both the horizontal and vertical directions, and essentially no space between these square pixels.

The test sheet 11 can also include timing marks 14, which are generally required for optical mark readers to coordinate the optics with the movement of the document through the OMR device. Each mark indicates the presence of a potential row of response positions and provides the system's optics with precise information on the relative position within the document. These marks also provide the system's optics with critical timing information regarding the document's movement through the mark reading optics and the activation of those optics. The presence of these marks on the figural answer sheet allows these documents to be graded by both OMR and image processing systems 47. These marks are preferably printed in ink that is visible to the reader's optics, as indicia of an optical reflectivity which differs from that of the base sheet.

When image processing technology is employed, the response data results in a high density of picture elements (pixels) and a uniform distribution across the face of input documents. In experiments, a Laser View System by LASER DATA, Inc. was employed. The components of this system for the figural response project included:

Ricoh IS-400 table-top scanner with selectable document scanning resolution as high as 300×300 dpi, optionally equipped with an automatic document feeder.

Write Once Read Many (WORM) 12" Optical Disks for document storage.

PC-compatible NEC PowerMate workstations and servers.

High-resolution full-page monitors (300×150 dpi) for image display and program development.

Ricoh Laser Printers, model LP4150V, capable of printing at 300 dpi resolution.

Calera (formerly Palantir) CDP-3000, Optical Character Recognition Sub-system.

Ethernet-compatible electronic document management network, which allows multi-user storage and retrieval of document images.

ETS also employed various optical filters on the Ricoh scanner lens to enhance the drop-out characteristics of the ink specifically chosen to print the answer sheets, so the primary images visible to the scanner were the test-taker's responses, not the background figures representing the test question.

As the final step to the method of testing provided by this invention, a numerical indication of score is produced at block 51 by comparing stored positions with the positions of marks made by a test taker at process block 49 of FIG. 5. The general approach to machine scoring is to develop definitions of families or types of items that can be scored with the same algorithm. Clearly, if every individual item needed a separate algorithm, machine scoring would be difficult. Each of the derived item types must have a common structure in terms of the key parameters needed and the algorithm used to compare the key to the response. Since one of the objectives of this open-ended item format is the identification of various misconceptions a respondent might have, it is necessary that the system be able to deal with multiple-keyed items. These alternatives are considered in order of their "importance", with the correct answer at the top of the list. If the response is not correct, the system considers whether the next alternative key is satisfied, and so forth to the end of the list of alternative keys. If none of the keys are satisfied, a score of "no response" is assigned.

The sheets upon which the respondents have put their "figures", Figural Responses 80, are read through one of the previously disclosed scanning devices, image processor 90, which generates a machine-readable representation of the responses, FIGRESP 15. This raw data is in turn pre-processed by software, Prepare .DATA 25 and PREP 35 (the latter of which is attached hereto), designed to generate a collection of X-coordinates, Y-coordinates and/or associated weights or darkness values for each pixel, .DATA 45. This may require a grouping operation to achieve a horizontal and vertical density that is desirable for the set of items to be scored.

Many of the keys will not require a scanner for their specification. The necessary parameters can be simply hand-keyed, key parameters 60, into a data set, .KEYPARMS 70. This dataset will provide the details necessary to completely define the response required for an alternative of interest. To specify some parameters, however, it may be necessary to scan, with Image Processor 20, an item sheet, Scannable Keys 10, that contains a figure relevant to the definition of a key. This step will generate a file, .KEYSCAN 30, of machine-readable key information. In either case, the output from this step, Make Key File 40, is a dataset, .KEYS 50, that defines each key for each item.

As noted above, the scoring of each item, preferably accomplished by software steps SCORE 65, TYPE 1 85 +... TYPEn 95 (attached hereto) is hierarchical. After the item type is identified, from the associated key record, the response, .DATA 45, is compared with the key, .KEYS 50, for the correct answer. Satisfaction of a key depends not only on the presence of a correct response but also on the absence of an incorrect response. If the response fails to satisfy the key for the correct answer at a pre-established confidence level, the question of a need for human intervention is considered. If there is no such need, then the next most interesting alternative key is compared with the response. As soon as the response satisfies a key, no further comparisons are made. If the response satisfies none of the keys, a score of zero is assigned. The output of this step is a written report, Score Reports 55, summarizing the results of the scoring of the set of item responses, and a dataset, .SCORED 75, containing, for each respondent, a set of scores for each item scored. This dataset is then available for subsequent analysis.

From the foregoing, it is understood that this invention provides improved automatic testing systems and methods of testing for figural responses. This type of testing can serve as a more adequate model for teaching, and conforms to the kind of processes which occur in carrying out tasks that require a constructed response compared to tests that require recognition of a correct answer and indicates proficiency in determining spatial arrangements, graphical data and parts of objects. It is also possible that the use of this testing format can be applicable to subject areas that are textually based, such as English or a foreign language. For example, students might be asked to detect grammatical errors, correct punctuation, or find a weak argument in a passage of text.

Although various embodiments have been illustrated, this was for the purpose of describing, but not limiting the invention. Various modifications, which will become apparent to one skilled in the art, are within the scope of this invention described in the attached claims.

APPENDIX

Exemplary software programs suitable for use in connection with the preparation and scoring of the testing procedures of this invention are hereby included as follows:

```
            J E S 2   J O B   L O G  --  S Y S T E M   C P U 2  --  N O D E   P 0

-------- JOB 5121  IEF097I JJF6600A - USER JJF6600 ASSIGNED
14.14.45 JOB 5121  IEF677I WARNING MESSAGE(S) FOR JOB JJF6600A ISSUED
14.14.45 JOB 5121  $HASP373 JJF6600A STARTED - INIT  1 - CLASS X - SYS CPU2
14.14.46 JOB 5121  IEF403I JJF6600A - STARTED - TIME=14.14.46
14.15.22 JOB 5121  IEF404I JJF6600A - ENDED   - TIME=14.15.22
14.15.22 JOB 5121  $HASP395 JJF6600A ENDED

------ JES2 JOB STATISTICS ------

07 APR 89 JOB EXECUTION DATE

19 CARDS READ 1,330 SYSOUT PRINT RECORDS

0 SYSOUT PUNCH RECORDS

82 SYSOUT SPOOL KBYTES 0.62 MINUTES EXECUTION TIME
```

```
1   //JJF6600A JOB (6600,55,1,5),'39109,TRN,FERRISJJ',CLASS=X,TIME=(,5),   JOB 5121
    //         MSGCLASS=T
    ***JOBPARM S=CPU2,P=PROC02                                             ACF2
    *** $ACFJ219 ACF2 ACTIVE P0
    ***ROUTE PRINT LOCAL                                                   00000030
    ***UTPUT FT06 N=1
    ***UTPUT FT06 N=1,F=3181,DEST=LOCAL                                    00000030
2   // EXEC RSTATVLG,PARM.GO='TRY USING ARTIFICIAL ITEM 15 DATA*'
    ***ORT.SYSPRINT DD DUMMY                          NAE.PROCLIB(RSTATVLG)
    ***                                                                    00010012
3   XXRSTATVLG PROC CLIB=FORTVS,COMPILR=FORTVS,FORTREG=1200K,C='*',        00020013
    XX          SOURCE=SOURCE,LIST=NOLIST,XREF=NOXREF,MAP=MAP,             00030021
    XX          OPTLVL=2,LANGLVL=77,MSGS=E,TERM=TERM,OBSPACE='(125,50)',   00040021
    XX          NAME=GO,LLIB1=VFORTLIB,LLIB2=VFORTLIB,AMODE=31,RMODE=ANY,  00050020
    XX          MYLIB='OCS.FVSTAT',MYLIB2='OCS.FVSTAT',MYLIB3='OCS.FVSTAT',00060020
    XX          GOREG=4000K,DUMP=SHORT                                     00070024
    ***************************************************************       00080000
    ***              VS FORTRAN COMPILE, LINK AND GO               *       00090002
    ***************************************************************       00100000
    ***                                                                    00110000
    ***                                                                    00120000
    ***      STEP    PARAMETER  DEFAULT    USE                             00130000
    ***                                                                    00140000
    ***      FORT    CLIB       FORTVS     COMPILER LIBRARY                00150000
    ***              COMPILR    FORTVS     COMPILER NAME                   00160002
    ***              FORTREG    1200K      FORT-STEP REGION SIZE           00170000
    ***              SOURCE     SOURCE     SOURCE LISTING PRINT CONTROL    00180000
    ***              LIST       NOLIST     OBJECT LISTING PRINT CONTROL    00190000
    ***              XREF       NOXREF     XREF PRINT CONTROL              00200006
    ***              MAP        MAP        MAP PRINT CONTROL               00210000
    ***              OPTLVL     2          OPTIMIZATION LEVEL              00220000
    ***              LANGLVL    77         LANGUAGE LEVEL                  00230021
    ***              MSGS       E          MESSAGE PRINT CONTROL           00240010
    ***              TERM       TERM       SYSTERM PRINT CONTROL           00250004
    ***              OBSPACE    (125,50)   OBJECT MODULE SPACE ALLOC       00260000
    ***                                                                    00270004
    ***      LKED    NAME       GO         LOAD MODULE NAME                00280000
    ***              GOSET                 MODULE LIBRARY                  00290020
    ***              AMODE      31         ADDRESSING MODE                 00300020
    ***              RMODE      ANY        RESIDENCY MODE                  00310000
    ***              LLIB1      VFORTLIB   SYSTEM LINK LIBRARY             00320000
    ***              LLIB2      VFORTLIB   SYSTEM LINK LIBRARY             00330015
    ***              MYLIB      OCS.FVSTAT USER LINK LIBRARY               00340004
    ***              MYLIB2     OCS.F4STAT USER LINK LIBRARY               00350004
    ***              MYLIB3     OCS.F4STAT USER LINK LIBRARY               00360000
    ***                                                                    00370024
    ***      GO      GOREG      4000K      GO-STEP REGION SIZE             00380002
    ***                                                                    00390002
    ***      DMP     DUMP       SHORT      DUMP LENGTH                     00400018
    ***************************************************************       00410000
4   XXFORT   EXEC PGM=&COMPILR,REGION=&FORTREG,COND=(4,LT),
    IEF653I SUBSTITUTION JCL - PGM=FORTVS,REGION=1200K,COND=(4,LT),
    XX         PARM=('&SOURCE','&LIST','&XREF','&MAP','OPT(&OPTLVL)',      00420011
    IEF653I SUBSTITUTION JCL - PARM=('SOURCE','NOLIST','NOXREF','MAP','OPT(2)',
    XX         'LANGLVL(&LANGLVL)','FLAG(&MSGS)','&TERM',                  00430011
    IEF653I SUBSTITUTION JCL - 'LANGLVL(77)','FLAG(E)','TERM',
    XX         'CHARLEN(32767)','GOSTMT','NOTF')                           00440011
                                                                           00450014
5   XXSTEPLIB  DD DSN=SYS1.&CLIB,DISP=SHR
    IEF653I SUBSTITUTION JCL - DSN=SYS1.FORTVS,DISP=SHR                    00460014
6   XXSYSLIN   DD DSN=&&LOADSET,DISP=(MOD,PASS),UNIT=TEMP,                 00470000
    XX            SPACE=(3200,&OBSPACE),DCB=BLKSIZE=3200
```

```
        IEF653I SUBSTITUTION JCL - SPACE=(3200,(125,50)),DCB=BLKSIZE=3200
 7      XXSYSPRINT  DD  SYSOUT=&C,DCB=BLKSIZE=3429                              00480014
        IEF653I SUBSTITUTION JCL - SYSOUT=*,DCB=BLKSIZE=3429
 8      XXSYSPUNCH  DD  SYSOUT=B,DCB=BLKSIZE=3440                               00490014
 9      XXSYSTERM   DD  SYSOUT=&C                                               00500014
        IEF653I SUBSTITUTION JCL - SYSOUT=*
10      //FORT.SYSIN  DD DSN=JJF6600.FIG.FORT(SCORE),DISP=SHR
11      //FORT.SYSLIB DD DSN=JJF6600.FIG.FORT,DISP=SHR
12      //            DD DSN=JJF6600.MISC.FORT,DISP=SHR
        ***0.FT06F001 DD SYSOUT=(*,,FT06)                                       00000090
13      XXLKED      EXEC PGM=IEWL,PARM='MAP,LIST,AMODE=&AMODE,RMODE=&RMODE',    00510022
        IEF653I SUBSTITUTION JCL - PGM=IEWL,PARM='MAP,LIST,AMODE=31,RMODE=ANY',
        XX          COND=(4,LT,FORT)                                            00520014
14      XXSYSLIB    DD  DISP=SHR,DSN=SYS1.&LLIB1                                00530000
        IEF653I SUBSTITUTION JCL - DISP=SHR,DSN=SYS1.VFORTLIB
15      XX          DD  DISP=SHR,DSN=SYS1.&LLIB2                                00540000
        IEF653I SUBSTITUTION JCL - DISP=SHR,DSN=SYS1.VFORTLIB
16      XX          DD  DISP=SHR,DSN=&MYLIB                                     00550000
        IEF653I SUBSTITUTION JCL - DISP=SHR,DSN=OCS.FVSTAT
17      XX          DD  DISP=SHR,DSN=OCS.FVSTAT                                 00560015
18      XX          DD  DISP=SHR,DSN=&MYLIB2                                    00570000
        IEF653I SUBSTITUTION JCL - DISP=SHR,DSN=OCS.FVSTAT
19      XX          DD  DISP=SHR,DSN=NAE.PGM.XALIB                              00580023
20      XX          DD  DISP=SHR,DSN=&MYLIB3                                    00590000
        IEF653I SUBSTITUTION JCL - DISP=SHR,DSN=OCS.FVSTAT
21      XX          DD  DISP=SHR,DSN=ETS.SYSLIB                                 00600000
22      XXSYSLIN    DD  DSN=&&LOADSET,DISP=(OLD,DELETE)                         00610000
23      XX          DD  DDNAME=SYSIN                                            00620000
24      XXSYSLMOD   DD  DSN=&GOSET(&NAME),DISP=(MOD,PASS),UNIT=TEMP,           +00630000
        IEF653I SUBSTITUTION JCL - DSN=&GOSET(GO),DISP=(MOD,PASS),UNIT=TEMP,
        XX              SPACE=(CYL,(2,1,1))                                     00640000
25      XXSYSPRINT  DD  SYSOUT=&C,DCB=BUFNO=1                                   00650013
        IEF653I SUBSTITUTION JCL - SYSOUT=*,DCB=BUFNO=1
26      XXSYSUT1    DD  DSN=&&SYSUT1,UNIT=TEMP,DCB=BLKSIZE=1024,               +00660000
        XX              SPACE=(1024,(20,10),RLSE)                               00670000
27      XXGO        EXEC PGM=&NAME,COND=((4,LT,FORT),(4,LT,LKED)),REGION=&GOREG 00680000
        IEF653I SUBSTITUTION JCL - PGM=GO,COND=((4,LT,FORT),(4,LT,LKED)),REGION=4000K
28      XXSTEPLIB   DD  DSN=&GOSET,DISP=(OLD,KEEP,DELETE)                       00690000
29      XX          DD  DSN=SYS1.VFORTLIB,DISP=SHR                              00700019
30      XX          DD  DSN=OCS.FVSTAT,DISP=SHR                                 00710019
31      XX          DD  DSN=NAE.PGM.XALIB,DISP=SHR                              00720023
32      XXFT05F001  DD  DDNAME=SYSIN                                            00730000
33      XXFT06F001  DD  SYSOUT=&C                                               00740013
        IEF653I SUBSTITUTION JCL - SYSOUT=*
34      XXFT07F001  DD  SYSOUT=B                                                00750000
35      XXFT97F001  DD  SPACE=(CYL,(1,1)),DISP=NEW,UNIT=TEMP,DSN=&&SYSUT1       00760000
36      XXFT98F001  DD  SPACE=(CYL,(1,1)),DISP=NEW,UNIT=TEMP,DSN=&&SYSUT2       00770000
37      XXSYSUDUMP  DD  DSN=&&DUMP,SPACE=(CYL,(1,1)),UNIT=TEMP,DISP=(NEW,PASS)  00780004
38      //GO.FT10F001 DD DSN=JJF6600.FIG.EMKNUC,DISP=SHR
39      //GO.FT11F001 DD DUMMY,DCB=BLKSIZE=20
        ***0.FT11F001 DD UNIT=STOR,SPACE=(TRK,1),DISP=(,CATLG),
        ***   DCB=(RECFM=FB,LRECL=80,BLKSIZE=6320),
        ***   DSN=JJF6600.FIG.TRYSCOR
40      //GO.FT19F001 DD DSN=JJF6600.FIG.KEYTST,DISP=SHR
41      XXDMP       EXEC PGM=SHRTDMP,COND=ONLY,REGION=50K,PARM=&DUMP            00790000
        IEF653I SUBSTITUTION JCL - PGM=SHRTDMP,COND=ONLY,REGION=50K,PARM=SHORT
42      XXSTEPLIB   DD  DSN=OCS.SAPGM,DISP=SHR                                  00800000
43      XXFT06F001  DD  SYSOUT=&C                                               00810013
        IEF653I SUBSTITUTION JCL - SYSOUT=*
44      XXFT10F001  DD  DSN=&&DUMP,DISP=(OLD,DELETE)                            00820000
```

```
STMT NO. MESSAGE
   27   IEF686I DDNAME REFERRED TO ON DDNAME KEYWORD IN PRIOR STEP WAS NOT RESOLVED
   28   IEF648I INVALID DISP FIELD- PASS SUBSTITUTED
   41   IEF686I DDNAME REFERRED TO ON DDNAME KEYWORD IN PRIOR STEP WAS NOT RESOLVED
IEF236I ALLOC. FOR JJF6600A FORT
IEF237I D2E  ALLOCATED TO STEPLIB
IEF237I E0C  ALLOCATED TO SYSLIN
IEF237I JES2 ALLOCATED TO SYSPRINT
IEF237I JES2 ALLOCATED TO SYSPUNCH
IEF237I JES2 ALLOCATED TO SYSTERM
IEF237I 128  ALLOCATED TO SYSIN
IEF237I 25B  ALLOCATED TO SYS02374
IEF237I 128  ALLOCATED TO SYSLIB
IEF237I A29  ALLOCATED TO
IEF142I JJF6600A FORT - STEP WAS EXECUTED - COND CODE 0000
IEF285I   SYS1.FORTVS                                 KEPT
IEF285I   VOL SER NOS= SYS004.
IEF285I   SYS89097.T141445.RA000.JJF6600A.LOADSET     PASSED
IEF285I   VOL SER NOS= ETS010.
IEF285I   JES2.JOB05121.SO000101                      SYSOUT
IEF285I   JES2.JOB05121.SO000102                      SYSOUT
IEF285I   JES2.JOB05121.SO000103                      SYSOUT
IEF285I   JJF6600.FIG.FORT                            KEPT
IEF285I   VOL SER NOS= USER09.
IEF285I   ICFCAT.VSYS017
IEF285I   VOL SER NOS= SYS017.
IEF285I   JJF6600.FIG.FORT                            KEPT
IEF285I   VOL SER NOS= USER09.
IEF285I   JJF6600.MISC.FORT                           KEPT
IEF285I   VOL SER NOS= USER01.
IEF373I STEP /FORT   / START 89097.1414
IEF374I STEP /FORT   / STOP  89097.1414 CPU   0MIN 00.35SEC SRB  0MIN 00.02SEC VIRT 1172K SYS 288K EXT   4K SYS  8860K
************************************************************
```

| JOB NAME | STEP NAME | PROGRAM EXECUTED | CC/RC | STEP DATE | START TIME | WALL CLK HH.MM.SS | CPU (308X) MM.MM.SS.HD |
|---|---|---|---|---|---|---|---|
| JJF6600A | FORT | FORTVS | 0000 | 89.097 | 14.14 | 0.00 | 0.35 |

| PRIVATE AREA RECLAIMS | PAGE INS NON-SWAP | PAGE OUTS NON-SWAP | MOUNTS DISK TAPE | | DEDICATED DISK TAPE | | EST STEP COST |
|---|---|---|---|---|---|---|---|
| 0 | 0 | 0 | 0 | 0 | 0 | 0 | .11 |

| ADDRESS | ACCESSES | ADDRESS | ACCESSES | ADDRESS | ACCESSES |
|---------|----------|---------|----------|---------|----------|
| 0D2E | 68 | 0E0C | 9 | 0128 | 4 |
| 025B | 0 | 0128 | 23 | 0A29 | 6 |

```
IEF236I ALLOC. FOR JJF6600A LKED
IEF237I D2E  ALLOCATED TO SYSLIB
IEF237I D2E  ALLOCATED TO
IEF237I E1C  ALLOCATED TO
IEF237I E1C  ALLOCATED TO
IEF237I E06  ALLOCATED TO
IEF237I E1C  ALLOCATED TO
IEF237I 704  ALLOCATED TO
IEF237I 704  ALLOCATED TO SYS02378
IEF237I 25B  ALLOCATED TO SYS02376
IEF237I E0C  ALLOCATED TO SYSLIN
IEF237I DMY  ALLOCATED TO
IEF237I E0E  ALLOCATED TO SYSLMOD
IEF237I JES2 ALLOCATED TO SYSPRINT
IEF237I E0E  ALLOCATED TO SYSUT1
IEF142I JJF6600A LKED - STEP WAS EXECUTED - COND CODE 0000
IEF285I    SYS1.VFORTLIB                            KEPT
IEF285I    VOL SER NOS= SYS004.
IEF285I    SYS1.VFORTLIB                            KEPT
IEF285I    VOL SER NOS= SYS004.
IEF285I    OCS.FVSTAT                               KEPT
IEF285I    VOL SER NOS= CICS01.
IEF285I    OCS.FVSTAT                               KEPT
IEF285I    VOL SER NOS= CICS01.
IEF285I    OCS.FVSTAT                               KEPT
IEF285I    VOL SER NOS= CICS01.
IEF285I    NAE.PGM.XALIB                            KEPT
IEF285I    VOL SER NOS= CICS02.
IEF285I    OCS.FVSTAT                               KEPT
IEF285I    VOL SER NOS= CICS01.
IEF285I    ETS.SYSLIB                               KEPT
IEF285I    VOL SER NOS= SYS027.
IEF285I    CATALOG.VSYS027                          KEPT
IEF285I    VOL SER NOS= SYS027.
IEF285I    ICFCAT.VSYS017                           KEPT
IEF285I    VOL SER NOS= SYS017.
IEF285I    SYS89097.T141445.RA000.JJF6600A.LOADSET  DELETED
IEF285I    VOL SER NOS= ETS010.
IEF285I    SYS89097.T141445.RA000.JJF6600A.GOSET    PASSED
IEF285I    VOL SER NOS= ETS012.
IEF285I    JES2.JOB05121.S0000104                   SYSOUT
IEF285I    SYS89097.T141445.RA000.JJF6600A.SYSUT1   DELETED
IEF285I    VOL SER NOS= ETS012.
IEF373I STEP /LKED    / START 89097.1414
IEF374I STEP /LKED    / STOP  89097.1415 CPU  0MIN 00.15SEC SRB  0MIN 00.03SEC VIRT  432K SYS  280K EXT    0K SYS  8864K
```

| JOB NAME | STEP NAME | PROGRAM EXECUTED | CC/RC | STEP DATE | START TIME | WALL CLK HH.MM.SS | CPU (308X) HH.MM.SS.HD |
|----------|-----------|------------------|-------|-----------|------------|-------------------|------------------------|
| JJF6600A | LKED | IEWL | 0000 | 89.097 | 14.14 | 0.14 | 0.15 |

| PRIVATE AREA RECLAIMS | PAGE INS NON-SWAP | PAGE OUTS NON-SWAP | MOUNTS DISK TAPE | DEDICATED DISK TAPE | EST STEP COST |
|-----------------------|-------------------|--------------------|------------------|---------------------|---------------|
| 0 | 0 | 0 | 0  0 | 0  0 | .05 |

| ADDRESS | ACCESSES | ADDRESS | ACCESSES | ADDRESS | ACCESSES |
|---------|----------|---------|----------|---------|----------|
| 0D2E | 82 | 0D2E | 0 | 0E1C | 167 |
| 0E1C | 0 | 0E1C | 0 | 0E06 | 2 |
| 0E1C | 0 | 0704 | 2 | 0704 | 0 |
| 025B | 0 | 0E0C | 10 | 0E0E | 47 |
| 0E0E | 0 | | | | |

```
IEF236I ALLOC. FOR JJF6600A GO
IEF237I E0E  ALLOCATED TO STEPLIB
IEF237I D2E  ALLOCATED TO
IEF237I E1C  ALLOCATED TO
IEF237I E06  ALLOCATED TO
IEF237I 704  ALLOCATED TO SYS02382
IEF237I 25B  ALLOCATED TO SYS02380
IEF237I DMY  ALLOCATED TO FT05F001
IEF237I JES2 ALLOCATED TO FT06F001
IEF237I JES2 ALLOCATED TO FT07F001
IEF237I E0C  ALLOCATED TO FT97F001
IEF237I E0E  ALLOCATED TO FT98F001
IEF237I E0C  ALLOCATED TO SYSUDUMP
IEF237I A29  ALLOCATED TO FT10F001
IEF237I DMY  ALLOCATED TO FT11F001
IEF237I A22  ALLOCATED TO FT19F001
IEF142I JJF6600A GO - STEP WAS EXECUTED - COND CODE 0000
IEF285I    SYS89097.T141445.RA000.JJF6600A.GOSET    PASSED
IEF285I    VOL SER NOS= ETS012.
IEF285I    SYS1.VFORTLIB                            KEPT
IEF285I    VOL SER NOS= SYS004.
IEF285I    OCS.FVSTAT                               KEPT
IEF285I    VOL SER NOS= CICS01.
IEF285I    NAE.PGM.XALIB                            KEPT
IEF285I    VOL SER NOS= CICS02.
IEF285I    CATALOG.VSYS027                          KEPT
IEF285I    VOL SER NOS= SYS027.
IEF285I    ICFCAT.VSYS017                           KEPT
IEF285I    VOL SER NOS= SYS017.
IEF285I    JES2.JOB05121.S0000105                   SYSOUT
IEF285I    JES2.JOB05121.S0000106                   SYSOUT
IEF285I    SYS89097.T141445.RA000.JJF6600A.SYSUT1   DELETED
IEF285I    VOL SER NOS= ETS010.
IEF285I    SYS89097.T141445.RA000.JJF6600A.SYSUT2   DELETED
IEF285I    VOL SER NOS= ETS012.
IEF285I    SYS89097.T141445.RA000.JJF6600A.DUMP     PASSED
IEF285I    VOL SER NOS= ETS010.
IEF285I    JJF6600.FIG.EMKNUC                       KEPT
IEF285I    VOL SER NOS= USER01.
IEF285I    JJF6600.FIG.KEYTST                       KEPT
IEF285I    VOL SER NOS= USER11.
IEF373I STEP /GO      / START 89097.1415
IEF374I STEP /GO      / STOP  89097.1415 CPU  0MIN 00.07SEC SRB  0MIN 00.00SEC VIRT  88K SYS  292K EXT  544K SYS  8864K
```

| JOB NAME | STEP NAME | PROGRAM EXECUTED | CC/RC | STEP DATE | START TIME | WALL CLK HH.MM.SS | CPU (308X) HH.MM.SS.HD |
|----------|-----------|------------------|-------|-----------|------------|-------------------|------------------------|

```
JJF6600A   00        00        0000   89.097  14.15     0.89       0.07
```

| PRIVATE AREA RECLAIMS | PAGE INS NON-SWAP | PAGE OUTS NON-SWAP | MOUNTS DISK TAPE | DEDICATED DISK TAPE | EST STEP COST |
|---|---|---|---|---|---|
| 0 | 3 | 0 | 0  0 | 0  0 | .02 |

| ADDRESS | ACCESSES | ADDRESS | ACCESSES | ADDRESS | ACCESSES |
|---|---|---|---|---|---|
| 0E0E | 9 | 0D2E | 10 | 0E1C | 2 |
| 0E06 | 0 | 0704 | 0 | 025B | 0 |
| 0E0C | 0 | 0E0E | 0 | 0E0C | 0 |
| 0A29 | 2 | 0A22 | 2 | | |

```
********************************************************
IEF202I JJF6600A DMP - STEP WAS NOT RUN BECAUSE OF COND=ONLY
IEF272I JJF6600A DMP - STEP WAS NOT EXECUTED.
IEF373I STEP /DMP    / START 89097.1415
IEF374I STEP /DMP    / STOP  89097.1415 CPU    0MIN 00.00SEC SRB    0MIN 00.00SEC VIRT    0K SYS    0K EXT    544K SYS    8864K
********************************************************
```

| JOB NAME | STEP NAME | PROGRAM EXECUTED | CC/RC | STEP DATE | START TIME | WALL CLK HH.MM.SS | CPU (308X) HH.MM.SS.HD |
|---|---|---|---|---|---|---|---|
| JJF6600A | DMP | SHRTDMP | 0000 | 89.097 | 14.15 | 24.00.00 | 0.00 |

| PRIVATE AREA RECLAIMS | PAGE INS NON-SWAP | PAGE OUTS NON-SWAP | MOUNTS DISK TAPE | DEDICATED DISK TAPE | EST STEP COST |
|---|---|---|---|---|---|
| 0 | 0 | 0 | 0  0 | 0  0 | .00 |

```
********************************************************
IEF237I E0E  ALLOCATED TO SYS00001
IEF285I    SYS89097.T141522.RA000.JJF6600A.R0000001    KEPT
IEF285I    VOL SER NOS= ETS012.
IEF285I    SYS89097.T141445.RA000.JJF6600A.GOSET       DELETED
IEF285I    VOL SER NOS= ETS012.
IEF237I E0C  ALLOCATED TO SYS00005
IEF285I    SYS89097.T141522.RA000.JJF6600A.R0000003    KEPT
IEF285I    VOL SER NOS= ETS010.
IEF285I    SYS89097.T141445.RA000.JJF6600A.DUMP        DELETED
IEF285I    VOL SER NOS= ETS010.
IEF375I  JOB /JJF6600A/ START 89097.1414
IEF376I  JOB /JJF6600A/ STOP  89097.1415 CPU    0MIN 00.57SEC SRB    0MIN 00.05SEC

REQUESTED OPTIONS (EXECUTE): SOURCE,NOLIST,NOXREF,MAP,OPT(2),LANGLVL(77),FLAG(E),TERM,CHARLEN(32767),80STMT,NOTF
OPTIONS IN EFFECT:  NOLIST   MAP  NOXREF   GOSTMT NODECK   SOURCE    TERM    OBJECT FIXED  NOTEST NOTRMFLG   SRCFLG
                    NOSYM NORENT NOSDUMP AUTODBL(NONE)    NOSXM   IL
                    OPT(2) LANGLVL(77) NOFIPS   FLAG(E)   NAME(MAIN )   LINECOUNT(60)     CHARLEN(32767)

*....*...1.........2.........3.........4.........5.........6.........7.*.......8

ISN    1         INCLUDE (PARMSET)
ISN    2         SUBROUTINE MAIN(PARMP2)
             C------ INCLUDE THIS AT BEGINNING OF MAIN PGM TO SETUP TO USE PARM
             C       INPUT; INCLUDE PARMDAT AFTER ALL TYPE DECLARATIONS,
             C       STATEMENT FUNCTIONS AND COMMON STATEMENTS.
ISN    3         CHARACTER*80 PARM
ISN    4         INTEGER PARMP2*2(1),MAXPRL/80/
ISN    5         PARAMETER (NMAXS=7,MAXNIT=15,MAXTYP=1,MAXKEY=8,MAXWND=20,
                &           MAXVRT=20,MAXPIX=500,LENID=6,LENOP=80,MAXKVL=8,
                &           LFD=(MAXKVL+10)*MAXNIT+13)
             C
             C------ SCORE-ING PARAMETERS:
             C   NMAXS = NO. OF MAX'S LISTED IN VECTOR MAXS:
             C    1) MAXNIT = MAXIMUM NUMBER OF ITEMS
             C    2) MAXTYP =    "      "      "   ITEM TYPES
             C    3) MAXKEY =    "      "      "   KEYS FOR AN ITEM
             C    4) MAXWND =    "      "      "   WINDOWS FOR AN ITEM
             C    5) MAXVRT =    "      "      "   VERTICES FOR A WINDOW
             C    6) MAXPIX =    "      "      "   POINTS/PIXELS PER ITEM RESPONSE
             C    7) MAXKVL =    "   KEY VALUE (TO USE WITH FD)
             C
ISN    6         INTEGER MAXS(NMAXS)/MAXNIT,MAXTYP,MAXKEY,MAXWND,MAXVRT,MAXPIX,
                &           MAXKVL/
ISN    7         INTEGER ITYPE(MAXKEY,MAXNIT),NKEYS(MAXNIT),KVAL(MAXKEY,MAXNIT),
                &           NWIND(MAXKEY,MAXNIT),NVW(MAXWND,MAXKEY,MAXNIT)
ISN    8         REAL  VWX(MAXVRT,MAXWND,MAXKEY,MAXNIT),
                &       VWY(MAXVRT,MAXWND,MAXKEY,MAXNIT),  X(MAXPIX),Y(MAXPIX),
                &       WT(MAXNIT),S(MAXNIT), FD(LFD)
                 CHARACTER  OP*(LENOP),ID*(LENID),IDOLD*(LENID)
ISN    9         INCLUDE (PARMDAT)
ISN   10     C------ SEE PARMSET
ISN   11         CALL VSINIT
ISN   12         LENP=PARMP2(1)
ISN   13         IF (LENP.GT.MAXPRL) LENP=MAXPRL
ISN   15         CALL MOVSTR(LENP,3,PARMP2,1,PARM)
ISN   16         CALL START('SCORE THE FIGURAL RESPONSE DATA*',PARM)
ISN   17         WRITE (6,666) MAXS
ISN   18   666   FORMAT ('0IN THIS RUN, THE FOLLOWING LIMITATIONS ARE IMPOSED:'/
                &        ' 0              MAX. NO. OF ITEMS =',I4/
                &        ' 0          MAX. NO. OF ITEM TYPES =',I4/
                &        ' 0         MAX. NO. KEYS PER ITEM =',I4/
                &        ' 0       MAX. NO. WINDOWS PER KEY =',I4/
                &        ' 0      MAX. NO. VERT. PER WINDOW =',I4/
                &        ' 0    MAX. NO. PTS. PER RESPONSE =',I4/
                &        ' 0              MAXIMUM KEY VALUE =',I4)
ISN   19         CALL OPEN(-11)
ISN   20         CALL FDA(FD,0,MAXKVL,MAXNIT)
ISN   21         CALL KEYS(NKEYS,ITYPE,KVAL,NWIND,NVW,VWX,VWY,MAXS,MAXKEY,MAXWND,
                &           MAXVRT)
ISN   22         CALL GETIT(ID,ITNO,X,Y,WT,NPIX,*301)
```

```
ISN   23        1 IDOLD=ID
ISN   24          OP=ID
ISN   25          CALL SCLEAR(S,MAXNIT)
ISN   26          GO TO 5
ISN   27      201 CALL GETIT(ID,ITNO,X,Y,WT,NPIX,*301)
ISN   28          IF (ID.NE.IDOLD) THEN
ISN   29            CALL PUT(11,OP)
         C81
ISN   30            WRITE (6,'(/'' SCORE.1 '',A,'' SCORE = '',15F6.0)') IDOLD,S
ISN   31            GO TO 1
ISN   32          ENDIF
ISN   33        5 IF (NKEYS(ITNO).EQ.0) THEN
         C82
ISN   34            WRITE (6,'(''-SCORE.2-----> NOT READY FOR ITEM '',I2)') ITNO
ISN   35            GO TO 201
ISN   36          ENDIF
         C
         C-------- LOOP THROUGH THE KEYS FOR THIS ITEM
         C
ISN   37          DO 30 K=1,NKEYS(ITNO)
ISN   38            IT=ITYPE(K,ITNO)
         C-------- THIS IS THE ITEM-TYPE SWITCHBOARD:
ISN   39            GO TO (1001),IT
         C83
ISN   40            WRITE (6,'(''-SCORE.3---> NOT READY FOR ITEM TYPE '',I2)') IT
ISN   41            GO TO 30
         C
         C-------- ITEM TYPE 1, MARK-IN
         C
ISN   42     1001   IP=LENID+2*ITNO-1
ISN   43            WRITE (OP(IP:IP+1),'(I2)') 0
ISN   44            CALL TYPE1(X,Y,WT,NPIX,NWIND(K,ITNO),NVW(1,K,ITNO),
              &          VWX(1,1,K,ITNO),VWY(1,1,K,ITNO),MAXVRT,*30)
ISN   45            S(ITNO)=KVAL(K,ITNO)
ISN   46            CALL FDB(FD,S(ITNO),ITNO)
ISN   47            WRITE (OP(IP:IP+1),'(I2)') KVAL(K,ITNO)
ISN   48            GO TO 201
         C
         C-------- ITEM TYPE 2, ...
         C
         C2001      CALL TYPE2(X,Y,WT,NPIX,...
ISN   49       30 CONTINUE
ISN   50          CALL FDB(FD,0,ITNO)
         C-------- FINISHED PROCESSING THIS ITEM RESPONSE
ISN   51          GO TO 201
ISN   52      301 CONTINUE
ISN   53          CALL PUT(11,OP)
         C84
ISN   54          WRITE (6,'(/'' SCORE.4 '',A,'' SCORE = '',15F6.0)') IDOLD,S
ISN   55          CALL FDC(FD,'SUMMARY OF RESPONSES*')
ISN   56          CALL CLOSE(11)
ISN   57          CALL STEXIT
ISN   58          STOP
ISN   59          END
```

STORAGE MAP

TAG: SET(S) ENTRY(N)  ASSIGNED(B)   IN COMMON(C)   EQUIVALENCED(E)   INITIAL VALUE(V)   INTRINSIC FCT(I)
     REFERENCED(F)    SUBPROGRAM(X) NAMED CONSTANT(K) STATEMENT FUNCTION(T) USED AS ARGUMENT(A) SUBPROGRAM NAME

PROGRAM NAME: MAIN.    SIZE OF PROGRAM:   642B6 HEX BYTES.

| NAME | MODE | TAG | ADDR | NAME | MODE | TAG | ADDR | NAME | MODE | TAG | ADDR | NAME | MODE | TAG | ADDR |
|---|---|---|---|---|---|---|---|---|---|---|---|---|---|---|---|
| CLOSE | | FX | 063E44 | FD | R*4 | FA | 001000 | FDA | | FX | 063E2C | FDB | | FX | 063E3 |
| FDC | | FX | 063E34 | GETIT | | FX | 063E4B | ID | CHAR | FA | 0005C0 | IDOLD | CHAR | SFA | 00066 |
| IP | I*4 | SF | 0003B8 | IT | I*4 | SFA | 0003BC | ITNO | I*4 | FA | 0003C0 | ITYPE | I*4 | FA | 00093 |
| K | I*4 | SF | 0003B4 | KEYS | | FX | 063E3C | KVAL | I*4 | FA | 000750 | LENID | I*4 | FK | 00032 |
| LENOP | I*4 | FK | 000354 | LENP | I*4 | SFA | 0003C4 | LFD | I*4 | FK | | MAIN | | R | 00000 |
| MAXKEY | I*4 | FK | 000348 | MAXKVL | I*4 | FK | | MAXNIT | I*4 | FK | 000318 | MAXPIX | I*4 | FK | |
| MAXPRL | I*4 | FV | 0003D0 | MAXS | I*4 | FAV | 000670 | MAXTYP | I*4 | K | UNREFD | MAXVRT | I*4 | FK | 00034 |
| MAXWND | I*4 | FK | 00034C | MOVSTR | | FX | 063E58 | NKEYS | I*4 | FA | 000710 | NMAXS | I*4 | FK | 000321 |
| NPIX | I*4 | FA | 0003CB | NVW | I*4 | FA | 003000 | NWIND | I*4 | FA | 000B10 | OP | CHAR | SFA | 0005C |
| OPEN | | FX | 063E40 | PARM | CHAR | FA | 000616 | PARMP2 | I*2 | FA | 063E5C | PUT | | FX | 063E3 |
| S | R*4 | SFA | 000690 | SCLEAR | | FX | 063E64 | START | | FX | 063E4C | STEXIT | | FX | 063E6 |
| TYPE1 | | FX | 063E50 | VFEE* | | FX | 063E54 | VFIXF* | | FX | 063E6C | VFWIF* | | FX | 063E7 |
| VFWSF* | | FX | 063E74 | VSINIT | | FX | 063E78 | VWX | R*4 | FA | 006000 | VWY | R*4 | FA | 03500 |
| WT | R*4 | FA | 0006D0 | X | R*4 | FA | 001470 | Y | R*4 | FA | 002000 | | | | |

LABEL INFORMATION.

| LABEL | DEFINED | ADDR | LABEL | DEFINED | ADDR | LABEL | DEFINED | ADDR | LABEL | DEFINED | AD |
|---|---|---|---|---|---|---|---|---|---|---|---|
| 1 | 23 | 063F54 | 5 | 33 | 063FF2 | 30 | 49 | 0641EA | 201 | 27 | 063 |
| 301 | 52 | 064218 | 666 | 18 | 00014B | 1001 | 42 | 0640FE | | | |

*STATISTICS*  SOURCE STATEMENTS = 58, PROGRAM SIZE = 410294 BYTES, PROGRAM NAME = MAIN    PAGE:   1.

*STATISTICS*  NO DIAGNOSTICS GENERATED.

MAIN END OF COMPILATION 1 ******

OPTIONS IN EFFECT: NOLIST   MAP NOXREF  GOSTMT NODECK   SOURCE   TERM   OBJECT FIXED  NOTEST NOTRMFLG   SRCFLG
                   NOSYM NORENT NOSDUMP AUTODBL(NONE)  NOSXM   IL
                   OPT(2) LANGLVL(77) NOFIPS   FLAG(E)   NAME(MAIN )  LINECOUNT(60)     CHARLEN(32767)

```
ISN    1      INCLUDE (KEYS)
ISN    2      SUBROUTINE KEYS(NKEYS,ITYPE,KVAL,NWIND,NVW,VWX,VWY,MAXS,MAXXEY,
             &        MAXWND,MAXVRT)
         C
         C THIS ROUTINE PICKS UP THE KEY PARAMETERS TO BE USED BY PGM SCORE
         C TO SCORE THE FIGURAL RESPONSES.  RELEVANT KEY DATA IS ASSUMED TO
         C BE ON UNIT FT19.
         C
         C NKEYS(*) = NUMBER OF KEYS FOR EACH ITEM
         C ITYPE(MAXKEY,*) = ITEM TYPE OF EACH KEY FOR EACH ITEM IN CHECKING ORD
         C KVAL(MAXKEY,*) = KEY VALUE TO ASSIGN FOR "CORRECT" ANSWER, I.E.,
         C                   ANSWER THAT MATCHES THE KEY
```

```
C       NWIND(MAXKEY,*) = NO. OF WINDOWS FOR EACH KEY FOR EACH ITEM
C       NVW(MAXWND,MAXKEY,*) = NO. OF VERTICES EA WINDOW EA KEY EA ITEM
C       VWX(MAXVRT,MAXWND,MAXKEY,*) = CORRESPONDING X'S FOR EA VERTEX
C       VWY(DITTO) = CORRESPONDING Y'S FOR EA VERTEX
C       MAXS(*),MAXKEY,MAXWND,MAXVRT = SEE BELOW
C
C       VECTOR MAXS:
C           1) MAXNIT = MAXIMUM NUMBER OF ITEMS
C           2) MAXTYP =    "       "    "  ITEM TYPES
C           3) MAXKEY =    "       "    "  KEYS FOR AN ITEM
C           4) MAXWND =    "       "    "  WINDOWS FOR AN ITEM
C           5) MAXVRT =    "       "    "  VERTICES FOR A WINDOW
C           6) MAXPIX =    "       "    "  POINTS/PIXELS PER ITEM RESPONSE
C
        INTEGER MAXS(*)
        INTEGER ITYPE(MAXKEY,*),NKEYS(*),KVAL(MAXKEY,*),
     &          NWIND(MAXKEY,*),NVW(MAXWND,MAXKEY,*)
        REAL    VWX(MAXVRT,MAXWND,MAXKEY,*),
     &          VWY(MAXVRT,MAXWND,MAXKEY,*)
        LOGICAL EOF/.FALSE./
        CHARACTER KEYREC*87, IT*4
C
C------ LAYOUT OF KEYREC (RECORD LENGTH = 4*MAXVRT+7):
C           COLS  CONTENTS
C           1-2   ITEM NUMBER
C           3-4   KEY NUMBER
C           5-6   ITEM TYPE OF THIS KEY
C           7-8   KEY VALUE FOR THIS KEY
C           9-10  NO. OF WINDOWS FOR THIS KEY (MAX=MAXWND)
C           11-   NO. VERTICES FOR EACH WINDOW IN NI2
C        FOLLOWED BY WINDOW RECORDS:
C           1-2   ITEM NUMBER
C           3-4   KEY NUMBER
C           5-6   WINDOW NUMBER
C           7     'X' OR 'Y'
C           8-    X- OR Y-COORDINATES FOR THIS WINDOW IN NF4.1
C
        CALL OPEN(19)
        KEYBIG=0
  201   CALL GET(19,KEYREC,*301)

*....*...1.........2.........3.........4.........5.........6.........7.*......8

C 201   READ (19,'(A)',END=301) KEYREC
C       CALL CARDSW(KEYREC)
        IF (ITNO.NE.ICOLS(1,2)) THEN
            NKEYS(ITNO)=KEYBIG
            KEYBIG=0
            ITNO=ICOLS(1,2)
        ENDIF
        IT=KEYREC(:4)
        KEYN=ICOLS(3,4)
        IF (KEYN.GT.KEYBIG) KEYBIG=KEYN
        ITYPE(KEYN,ITNO)=ICOLS(5,6)
        KVAL(KEYN,ITNO)=ICOLS(7,8)
        NWIND(KEYN,ITNO)=ICOLS(9,10)
        IP=11
        DO 10 N=1,NWIND(KEYN,ITNO)
        NVW(N,KEYN,ITNO)=ICOLS(IP,IP+1)
   10   IP=IP+2
C
C------ LOOP THROUGH THE WINDOWS FOR EACH KEY
C
        DO 30 K=1,NWIND(KEYN,ITNO)
        DO 30 KXY=1,2
        CALL GET(19,KEYREC,*301)
C       READ (19,'(A)',END=301) KEYREC
        IF (KEYREC(:4).NE.IT) THEN
C@1
            WRITE (6,'(''-KEYS.1----> KEY RECORDS OUT OF ORDER AT '',A)')
     &          KEYREC
            STOP
        ENDIF
        IWIND=ICOLS(5,6)
        IP=8
        IF (KEYREC(7:7).EQ.'X') THEN
            DO 20 J=1,NVW(IWIND,KEYN,ITNO)
            VWX(J,IWIND,KEYN,ITNO)=COLS(IP,IP+3,1)
C           WRITE (6,'('' VWX = '',F4.1)') VWX(J,IWIND,KEYN,ITNO)
   20       IP=IP+4
        ELSE IF (KEYREC(7:7).EQ.'Y') THEN
            DO 21 J=1,NVW(IWIND,KEYN,ITNO)
            VWY(J,IWIND,KEYN,ITNO)=COLS(IP,IP+3,1)
C           WRITE (6,'('' VWY = '',F4.1)') VWY(J,IWIND,KEYN,ITNO)
   21       IP=IP+4
        ELSE
C@2
            WRITE (6,'(''-KEYS.2----> KEYREC WINDOW RECORD W/O '',
     &          ''X/Y IN COL 7'')')
            STOP
        ENDIF
   30   CONTINUE
        GO TO 201
  301   CONTINUE
        NKEYS(ITNO)=KEYBIG
        RETURN
        END
```

STORAGE MAP

TAG: SET(S) ENTRY(N) ASSIGNED(G)   IN COMMON(C)   EQUIVALENCED(E)   INITIAL VALUE(V)   INTRINSIC FCT(I)
     REFERENCED(F) SUBPROGRAM(X) NAMED CONSTANT(K) STATEMENT FUNCTION(T) USED AS ARGUMENT(A) SUBPROGRAM NAME(

PROGRAM NAME: KEYS.    SIZE OF PROGRAM:   A0C HEX BYTES.

| NAME | MODE | TAG | ADDR | NAME | MODE | TAG | ADDR | NAME | MODE | TAG | ADDR | NAME | MODE | TAG | ADDR |
|---|---|---|---|---|---|---|---|---|---|---|---|---|---|---|---|
| COLS | R*4 | FX | 000394 | EOF | L*4 | V | UNREFD | GET | | FX | 000378 | ICOLS | I*4 | FX | 0003AC |
| IP | I*4 | SFA | 0001D0 | IT | CHAR | SF | 00031C | ITNO | I*4 | SF | 0001D8 | ITYPE | I*4 | SF | 0003BC |
| IWIND | I*4 | SF | 0001E0 | J | I*4 | SF | 0001C4 | K | I*4 | SF | 0001C8 | KEYBIG | I*4 | SF | 0001EC |
| KEYN | I*4 | SF | 0001DC | KEYREC | CHAR | FA | 000320 | KEYS | | R | 000000 | KVAL | I*4 | SF | 000398 |
| KXY | I*4 | SF | 0001D4 | MAXKEY | I*4 | F | 0003CC | MAXS | I*4 | | UNREFD | MAXVRT | I*4 | F | 0003DC |
| MAXWND | I*4 | F | 0003D4 | N | I*4 | SF | 0001CC | NKEYS | I*4 | SF | 0003B8 | NVW | I*4 | SF | 00037C |
| NWIND | I*4 | SF | 0003C0 | OPEN | | FX | 0003A8 | VFEE# | | FX | 0003C8 | VFIXF# | | FX | 0003D8 |
| VFWSF# | | FX | 0003DC | VWX | R*4 | SF | 000384 | VWY | R*4 | SF | 00038C | | | | |

LABEL INFORMATION.

| LABEL | DEFINED | ADDR. | LABEL | DEFINED | ADDR. | LABEL | DEFINED | ADDR. | LABEL | DEFINED | AD |
|---|---|---|---|---|---|---|---|---|---|---|---|
| 10 | 26 | 0006E2 | 20 | 39 | 00084E | 21 | 43 | 0008DE | 30 | 48 | 000 |
| 201 | 10 | 000552 | 301 | 50 | 000936 | | | | | | |

*STATISTICS*  SOURCE STATEMENTS = 52, PROGRAM SIZE = 2572 BYTES, PROGRAM NAME = KEYS    PAGE:  4.

*STATISTICS*  NO DIAGNOSTICS GENERATED.

KEYS END OF COMPILATION 2 ******

OPTIONS IN EFFECT: NOLIST  MAP NOXREF  GOSTMT NODECK  SOURCE  TERM  OBJECT FIXED  NOTEST NOTRMFLG  SRCFLG
                   NOSYM NORENT NOSDUMP AUTODBL(NONE)  NOSXM  IL
                   OPT(2) LANGLVL(77) NOFIPS  FLAG(E)  NAME(MAIN )  LINECOUNT(60)  CHARLEN(32767)

```
        *....*...1.........2.........3.........4.........5.........6.........7.*......8
ISN   1       INCLUDE (GETIT)
ISN   2       SUBROUTINE GETIT(ID,ITNO,X,Y,WT,NPIX,*)
        C
        C     RETURNS THE STUDENT ID AND ITEM NUMBER ALONG WITH THE
        C     THE SET OF POINTS (X,Y), ASSOCIATED WEIGHTS (WT),
        C     AND # OF PIXELS (NPIX) WHICH CONSTITUTE THE RESPONSE OF THAT
        C     STUDENT THAT ON ITEM.
        C
        C     ID    = STUDENT ID
        C     ITNO  = ITEM NUMBER
        C     X(NPIX)  = RETURNED VECTOR OF X COORDINATES IN STUDENT RESPONSE
        C     Y(NPIX)  = RETURNED VECTOR OF Y COORDINATES IN STUDENT RESPONSE
        C     WT(NPIX) = RETURNED VECTOR OF WEIGHTS FOR STUDENT RESPONSES
        C     NPIX  = RETURNED NUMBER OF PIXELS CONSTITUTING STUDENT'S RESPONSE
        C
ISN   3       CHARACTER*(*) ID
ISN   4       CHARACTER*80  REC
ISN   5       CHARACTER*8   ID8
ISN   6       REAL     X(*), Y(*), WT(*)
ISN   7       INTEGER  ITNO, NPIX
ISN   8       LOGICAL  $FIRST/.TRUE./,EOF/.FALSE./
ISN   9       IF (EOF) RETURN 1
ISN  11       IF ($FIRST) THEN
ISN  12          CALL OPEN(10)
ISN  13          CALL GET(10,REC)
        C        READ (10,'(A)') REC
        C        CALL CARDSW(REC)
ISN  14          $FIRST = .FALSE.
ISN  15       END IF
ISN  16       ID8 = REC
ISN  17       ID  = REC
ISN  18       ITNO = ICOLS(7,8)
ISN  19       NPIX = 0
ISN  20       GO TO 10
ISN  21   100 CALL GET(10,REC,*500)
        C 100 READ (10,'(A)',END=500) REC
ISN  22       IF (ID8.NE.REC(:8)) RETURN
ISN  23    10 NPIX = NPIX + 1
ISN  24       XPIX = COLS(12,14)
ISN  25       YPIX = COLS(15,17)
ISN  26       WT(NPIX) = COLS(18,20)
ISN  27       X(NPIX) = XPIX / 15.0
ISN  28       Y(NPIX) = YPIX / 15.0
ISN  29       GO TO 100
ISN  30   500 EOF=.TRUE.
ISN  31       RETURN
ISN  32       END
```

```
        *....*...1.........2.........3.........4.........5.........6.........7.*......8
        8                         X(K).NE.P(M)) THEN
        C-- LINE SEGMENT IS ENTIRELY ABOVE THE POINT; WE CROSS IT
        C   BUT NOT TWICE (I.E. ONLY WHEN X(J) IS EQUAL TO P)
        C
ISN  17          NCROSS=NCROSS+1
ISN  18       ELSE IF (Y(J).GT.Q(M) .AND. X(J).EQ.P(M)) THEN
        C
        C-- (P,Q) IS DIRECTLY UNDER A VERTEX; WE CROSS IT.
        C
ISN  19          NCROSS=NCROSS+1
ISN  20       ELSE IF (X(K).NE.P(M)) THEN
        C
        C-- LINE SEGMENT Y'S STRADDLE THE POINT; CHECK FOR INTERSECT
        C
ISN  21          CALL LINEF(X(J),Y(J),X(K),Y(K),A,B)
ISN  22          YSTAR=A*P(M)+B
ISN  23          IF (YSTAR.GT.Q(M)) NCROSS=NCROSS+1
ISN  25       END IF
ISN  26    10 CONTINUE
ISN  27       IF (MOD(NCROSS,2).EQ.1) THEN
ISN  28          NIN = NIN + 1
ISN  29          LIN(NIN) = M
ISN  30       END IF
ISN  31    20 CONTINUE
ISN  32       RETURN
ISN  33       END
```

OPTIONS IN EFFECT: NOLIST  MAP NOXREF  GOSTMT NODECK  SOURCE  TERM  OBJECT FIXED  NOTEST NOTRMFLG  SRCFLG
                   NOSYM NORENT NOSDUMP AUTODBL(NONE)  NOSXM  IL
                   OPT(2) LANGLVL(77) NOFIPS  FLAG(E)  NAME(MAIN )  LINECOUNT(60)  CHARLEN(32767)

```
        *....*...1.........2.........3.........4.........5.........6.........7.*......8
ISN   1       INCLUDE (NPOLY)
ISN   2       SUBROUTINE NPOLY(X,Y,N,P,Q,LL,NPT,LIN,NIN)
        C
        C   RETURNS LIST OF SUBSET OF POINTS FROM (P,Q) THAT ARE INSIDE
        C   THE POLYGON DEFINED BY THE ORDERED SET
        C   OF POINTS (X,Y) CONSISTING OF N VERTICES. (BASED ON EMK(INPOLYV))
        C
        C   X(N)    = THE X'S FOR THE POLYGON VERTICES
        C   Y(N)    = THE Y'S FOR THE POLYGON VERTICES
        C   N       = NUMBER OF VERTICES
        C   P(*)    = X VECTOR OF 'CANDIDATE' POINTS
        C   Q(*)    = Y VECTOR OF 'CANDIDATE' POINTS
        C   LL(NPT) = LIST OF 'CANDIDATE' POINTS TO CONSIDER
        C   NPT     = NUMBER OF 'CANDIDATE' POINTS TO CONSIDER
        C   LIN(NIN)= RETURNED LIST OF POINTERS TO INSIDE POINTS
        C   NIN     = RETURNED NUMBER OF 'CANDIDATE' POINTS IN POLYGON
```

```
         C
ISN  3         REAL X(N), Y(N)
ISN  4         REAL P(*), Q(*)
ISN  5         INTEGER LIN(*),LL(*)
ISN  6         LOGICAL DIRX
ISN  7         NIN=0
         C
         C-- LOOP THRU EACH 'CANDIDATE' POINT SEPARATELY:
         C
ISN  8         DO 20 MM=1,NPT
ISN  9            M=LL(MM)
ISN 10            NCROSS=0
         C
         C-- IF THE NUMBER OF EDGES CROSSED ON THE WAY TO A POINT (X,YHI)
         C   ABOVE THE POLYGON IS EVEN, THEN THE POINT LIES OUTSIDE THE
         C   POLYGON, IF ODD, THEN INSIDE.
         C
ISN 11            DO 10 J=1,N
ISN 12               K=MOD(J,N)+1
         C
         C-- THE LINE SEGMENT TO LOOK AT BEGINS AT (X(J),Y(J)) AND
         C   ENDS AT (X(K),Y(K)).
         C
ISN 13               IF (X(J).EQ.X(K)) THEN
         C
         C-- SEGMENT IS VERTICAL AND OVER THE POINT; IGNORE IT.
         C
ISN 14               ELSE IF (DIRX(X,J,N,-P(M)) .EQV. DIRX(X,K,N,P(M))) THEN
         C
         C-- SEGMENT IS OFF TO LEFT OR RIGHT; IGNORE IT.
         C
ISN 15               ELSE IF (Y(J).LE.Q(M) .AND. Y(K).LE.Q(M)) THEN
         C
         C-- LINE SEGMENT IS ENTIRELY BELOW THE POINT; IGNORE IT.
         C
ISN 16               ELSE IF (Y(J).GT.Q(M).AND.Y(K).GT.Q(M).AND.
```

STORAGE MAP

TAG: SET(S) ENTRY(N)   ASSIGNED(G)    IN COMMON(C)       EQUIVALENCED(E)        INITIAL VALUE(V)    INTRINSIC FCT(I)
     REFERENCED(F)     SUBPROGRAM(X)  NAMED CONSTANT(K)  STATEMENT FUNCTION(T)  USED AS ARGUMENT(A) SUBPROGRAM NAME(

PROGRAM NAME: TYPE1.   SIZE OF PROGRAM: 1D4A HEX BYTES.

| NAME | MODE | TAG | ADDR | NAME | MODE | TAG | ADDR | NAME | MODE | TAG | ADDR | NAME | MODE | TAG | ADDR |
|---|---|---|---|---|---|---|---|---|---|---|---|---|---|---|---|
| IN | I*4 | SF | 000194 | J | I*4 | SF | 000184 | K | I*4 | SF | 000188 | L | I*4 | SF | 00018( |
| LIN | I*4 | FA | 000278 | LOUT | I*4 | SFA | 001000 | MAXPIX | I*4 | FK | | MAXVRT | I*4 | F | 00181: |
| NIN | I*4 | FA | 00019C | NINTOT | I*4 | SF | 00018B | NPIX | I*4 | F | 001808 | NPOLY | | FX | 00180( |
| NPT | I*4 | SFA | | NVW | I*4 | FA | 0017F0 | NWIND | I*4 | F | 001810 | S | R*4 | SF | 00019 |
| SOUT | R*4 | SF | 0001A0 | STOT | R*4 | SF | 0001A4 | THRESH | R*4 | FK | 000170 | TYPE1 | | R | 00000: |
| VFFXF# | | FX | 001818 | VFIXF# | | FX | 00181C | VFWSF# | | FX | 001820 | VWX | R*4 | FA | 0017F: |
| VWY | R*4 | FA | 001800 | WT | R*4 | F | 0017E8 | X | R*4 | FA | 0017D8 | Y | R*4 | FA | 0017E |

LABEL INFORMATION.

| LABEL | DEFINED | ADDR. | LABEL | DEFINED | ADDR. | LABEL | DEFINED | ADDR. | LABEL | DEFINED | AD |
|---|---|---|---|---|---|---|---|---|---|---|---|
| 1 | 14 | 001A82 | 10 | 24 | 001B86 | 12 | 26 | 0013C6 | 13 | 28 | 001: |
| 15 | 31 | 001C0A | 30 | 39 | 001C40 | | | | | | |

*STATISTICS*   SOURCE STATEMENTS = 43, PROGRAM SIZE = 7498 BYTES, PROGRAM NAME = TYPE1    PAGE:  9.

*STATISTICS*   NO DIAGNOSTICS GENERATED.

TYPE1 END OF COMPILATION 4 ******

STORAGE MAP

TAG: SET(S) ENTRY(N)   ASSIGNED(G)    IN COMMON(C)       EQUIVALENCED(E)        INITIAL VALUE(V)    INTRINSIC FCT(I)
     REFERENCED(F)     SUBPROGRAM(X)  NAMED CONSTANT(K)  STATEMENT FUNCTION(T)  USED AS ARGUMENT(A) SUBPROGRAM NAME(

PROGRAM NAME: DIRX.    SIZE OF PROGRAM: 302 HEX BYTES.

| NAME | MODE | TAG | ADDR. | NAME | MODE | TAG | ADDR. | NAME | MODE | TAG | ADDR. | NAME | MODE | TAG | ADDR. |
|---|---|---|---|---|---|---|---|---|---|---|---|---|---|---|---|
| ABS | | I | | DIRX | L*4 | SFR | 00014C | INCR | I*4 | SF | 000150 | INT | | I | |
| ISIGN | I*4 | I | | J | I*4 | SF | 00014D | JJ | I*4 | F | 000170 | KT | I*4 | SF | 00014( |
| MOD | | I | | N | I*4 | SF | 000160 | P | R*4 | F | 000164 | PP | R*4 | SF | 00014E |
| VFEE# | | FX | 000174 | VFWSF# | | FX | 000178 | X | R*4 | F | 000168 | | | | |

LABEL INFORMATION.

| LABEL | DEFINED | ADDR. | LABEL | DEFINED | ADDR. | LABEL | DEFINED | ADDR. | LABEL | DEFINED | ADD |
|---|---|---|---|---|---|---|---|---|---|---|---|
| 5 | 13 | 00022C | | | | | | | | | |

*STATISTICS*   SOURCE STATEMENTS = 28, PROGRAM SIZE = 770 BYTES, PROGRAM NAME = DIRX    PAGE: 15.

*STATISTICS*   NO DIAGNOSTICS GENERATED.

DIRX END OF COMPILATION 6 ******

```
         *....*....1.........2.........3.........4.........5.........6.........7.*.......8
ISN 23         DO 10 K=1,NIN
ISN 24      10 S=S+WT(LIN(K))
         C------- AND MAKE A NEW LIST OF THE REMAINING POINTS TO CHECK
ISN 25         IN=1
ISN 26         K=0
ISN 27      12 K=K+1
ISN 28         IF (K.GT.NPT) GO TO 30
         C         13 IF (LOUT(K).EQ.LIN(IN)) THEN
         C------------ SHIFT LOUT OVER ONE
ISN 29               IF (K.LT.NPT) THEN
ISN 30                  DO 15 L=K+1,NPT
ISN 31      15            LOUT(L-1)=LOUT(L)
```

```
ISN    32        ENDIF
             C---------- AND RESET LENGTH OF LOUT & LIN POINTER
ISN    33            NPT=NPT-1
ISN    34            IN=IN+1
ISN    35            IF (IN.GT.NIN) GO TO 30
ISN    36            GO TO 13
ISN    37        ENDIF
ISN    38        GO TO 12
ISN    39     30 CONTINUE
             C
             C-------- DETERMINE WHETHER KEY IS SATISFIED
             C
ISN    40        IF (NINTOT.EQ.NPIX) RETURN
ISN    42        SOUT=STOT-S
ISN    43        IF (S/SOUT .GE. THRESH) RETURN
ISN    45        RETURN 1
ISN    46        END
```

OPTIONS IN EFFECT: NOLIST  MAP NOXREF  GOSTMT NODECK  SOURCE  TERM  OBJECT FIXED  NOTEST NOTRMFLG  SRCFLG
                  NOSYM NORENT NOSDUMP AUTODBL(NONE)  NOSXM  IL
                  OPT(2) LANGLVL(77) NOFIPS  FLAG(E)  NAME(MAIN )  LINECOUNT(60)  CHARLEN(32767)

```
                M....M...1.........2.........3.........4.........5.........6.........7.M.......8

ISN     1        INCLUDE (TYPE1)
ISN     2        SUBROUTINE TYPE1(X,Y,WT,NPIX,NWIND,NVW,VWX,VWY,MAXVRT,*)
ISN     3        PARAMETER (MAXPIX=500,THRESH=20.)
             C
             C  THIS SCORES A TYPE 1 (MARK-IN) FIGURAL RESPONSE ITEM.
             C
             C  GENERAL DESCRIPTION:  DETERMINE WHETHER THERE IS A MARK OF ANY SORT
             C          IN ANY ONE OF A NUMBER OF WINDOWS AND ALSO NO SIGNIFICANT
             C          MARK TO BE FOUND OUTSIDE ALL OF THE SPECIFIED WINDOWS.  THE
             C          KEY IS SATISFIED IF THE RATIO OF TOTAL PIXEL WEIGHT INSIDE
             C          THE WINDOWS TO THE TOTAL PIXEL WEIGHT OUTSIDE THE WINDOWS
             C          IS GREATER THAN OR EQUAL TO THE PARAMETER "THRESH".
             C
             C  EXAMPLE:  ITEM 15, WHERE THE CORRECT RESPONSE IS AN "X" INSIDE THE
             C          NUCLEUS OF THE CELL.
             C
             C  X(NPIX) = LIST OF X-COORDINATES FOR FIGURAL RESPONSE
             C  Y(NPIX) = LIST OF Y-
             C  WT(NPIX) = CORRESPONDING WEIGHTS
             C  NPIX = NUMBER OF PIXEL/POINTS
             C  NWIND = NUMBER OF WINDOWS IN WHICH TO LOOK FOR CORRECT RESPONSE
             C  NVW(NWIND) = THE NO. OF VERTICES FOR EACH WINDOW
             C  VWX(MAXVRT,NWIND) = X-COORDINATES FOR VERTICES FOR EACH WINDOW
             C  VWY(MAXVRT,NWIND) = Y-
             C  MAXVRT = MAXIMUM NO. OF VERTICES FOR ANY ONE WINDOW
             C  * = RETURN TO TAKE IF RESPONSE FAILS TO SATISFY KEY.
             C
ISN     4        REAL X(NPIX),Y(NPIX),WT(NPIX),VWX(MAXVRT,NWIND),VWY(MAXVRT,NWIND)
ISN     5        INTEGER NVW(NWIND),LIN(MAXPIX),LOUT(MAXPIX)
             C@1,2
ISN     6        WRITE (6,'('' TYPE1.1   POINTS TO ASSESS:'')')
ISN     7        WRITE (6,'((T15,2F8.1))') (X(J),Y(J),J=1,NPIX)
ISN     8        WRITE (6,'('' TYPE1.2   VERTICES OF WINDOW:'')')
ISN     9        WRITE (6,'((T15,2F8.1))') (VWX(J,1),VWY(J,1),J=1,NVW(1))
ISN    10        S=0.
ISN    11        STOT=0.
ISN    12        DO 1 J=1,NPIX
ISN    13        STOT=STOT+WT(J)
ISN    14      1 LOUT(J)=J
ISN    15        NPT=NPIX
ISN    16        NINTOT=0
             C
             C-------- LOOP THROUGH ALL WINDOWS; DETERMINE SUM OF WEIGHTS OF
             C         POINTS IN ALL WINDOWS.
             C
ISN    17        DO 30 J=1,NWIND
ISN    18        IF (NINTOT.EQ.NPIX) RETURN
ISN    20        CALL NPOLY(VWX(1,J),VWY(1,J),NVW(J),X,Y,
                &           LOUT,NPT,LIN,NIN)
ISN    21        IF (NIN.EQ.0) GO TO 30
ISN    22        NINTOT=NINTOT+NIN
             C-------- ACCUMULATE SUM OF WEIGHTS FOR POINTS THAT ARE IN
```

STORAGE MAP

TAG: SET(S) ENTRY(N)  ASSIGNED(G)    IN COMMON(C)     EQUIVALENCED(E)      INITIAL VALUE(V)    INTRINSIC FCT(I)
     REFERENCED(F)    SUBPROGRAM(X)  NAMED CONSTANT(K)  STATEMENT FUNCTION(T)  USED AS ARGUMENT(A)  SUBPROGRAM NAME(

PROGRAM NAME: NPOLY.   SIZE OF PROGRAM:   564 HEX BYTES.

| NAME | MODE | TAG | ADDR. | NAME | MODE | TAG | ADDR. | NAME | MODE | TAG | ADDR. | NAME | MODE | TAG | ADDR. |
|---|---|---|---|---|---|---|---|---|---|---|---|---|---|---|---|
| A | R*4 | FA | 000110 | B | R*4 | FA | 000114 | DIRX | L*4 | FX | 0001BC | J | I*4 | SFA | 000118 |
| K | I*4 | SFA | 00011C | LIN | I*4 | SF | 0001AC | LINEF | | FX | 0001C0 | LL | I*4 | F | 0001A4 |
| M | I*4 | SF | 000120 | MM | I*4 | SF | 000124 | MOD | | I | | N | I*4 | FA | 000180 |
| NCROSS | I*4 | SF | 000134 | NIN | I*4 | SF | 0001B4 | NPOLY | | R | 000000 | NPT | I*4 | F | 0001B8 |
| P | R*4 | FA | 000184 | Q | R*4 | F | 00018C | X | R*4 | FA | 000194 | Y | R*4 | FA | 00019C |
| YSTAR | R*4 | SF | 000128 | | | | | | | | | | | | |

LABEL INFORMATION.

| LABEL | DEFINED | ADDR. | LABEL | DEFINED | ADDR. | LABEL | DEFINED | ADDR. | LABEL | DEFINED | ADD |
|---|---|---|---|---|---|---|---|---|---|---|---|
| 10 | 26 | 00042C | 20 | 31 | 00048E | | | | | | |

*STATISTICS*  SOURCE STATEMENTS = 32, PROGRAM SIZE = 1380 BYTES, PROGRAM NAME = NPOLY   PAGE:  12.

*STATISTICS*  NO DIAGNOSTICS GENERATED.

NPOLY END OF COMPILATION 5 ******

OPTIONS IN EFFECT: NOLIST  MAP NOXREF  GOSTMT NODECK  SOURCE  TERM  OBJECT FIXED  NOTEST NOTRMFLG  SRCFLG
                  NOSYM NORENT NOSDUMP AUTODBL(NONE)  NOSXM  IL
                  OPT(2) LANGLVL(77) NOFIPS  FLAG(E)  NAME(MAIN )  LINECOUNT(60)  CHARLEN(32767)

M....M...1.........2.........3.........4.........5.........6.........7.M.......8

```
ISN       1            INCLUDE (DIRX)
ISN       2            LOGICAL FUNCTION DIRX(X,JJ,N,P)
                 C
                 C     RETURNED TRUE IF X-COORDINATE X IS TO THE RIGHT OF X-COORDINATE P.
                 C     IF THEY ARE EQUAL, THE VECTOR X IS SEARCHED BACKWARDS WHEN P IS
                 C     NEGATIVE AND FORWARDS WHEN P IS POSITIVE.  THE ACTUAL COORDINATE
                 C     VALUE FOR P IS ALWAYS POSITIVE; THE SIGN IS ONLY A DIRECTION FLAG
                 C     FOR THIS TIE-BREAKER SEARCH.  THIS FUNCTION IS USED BY INPOLY.
                 C
                 C     X(N)  = VECTOR OF X-VALUES
                 C     JJ    = POSITION OF CURRENT X-VALUE IN VECTOR X
                 C     N     = TOTAL NO. OF X-VALUES
                 C     P     = THE X-VALUE TO LOCATE.
                 C
ISN       3            REAL X(N)
ISN       4            PP=ABS(P)
ISN       5            J=JJ
ISN       6            INCR=ISIGN(1,INT(P))+N
ISN       7            IF (X(J).GT.PP) THEN
ISN       8               DIRX=.TRUE.
ISN       9            ELSE IF (X(J).LT.PP) THEN
ISN      10               DIRX=.FALSE.
ISN      11            ELSE
                 C----------- X(J) EQUALS P; NEED TO EXAMINE ADJACENT VALUES
ISN      12               KT=1
ISN      13        5      KT=KT+1
ISN      14               IF (KT.GT.N) THEN
                 C81--------- MAKE SURE WE DON'T WRAP ENTIRELY AROUND THE POLYGON
ISN      15                  WRITE (6,'(''-DIRX.1------>> BAD POLYGON'')')
ISN      16                  STOP
ISN      17               ENDIF
ISN      18               J=MOD(J+INCR-1,N) + 1
ISN      19               IF (X(J).GT.PP) THEN
ISN      20                  DIRX=.TRUE.
ISN      21               ELSE IF (X(J).LT.PP) THEN
ISN      22                  DIRX=.FALSE.
ISN      23               ELSE
ISN      24                  GO TO 5
ISN      25               ENDIF
ISN      26            ENDIF
ISN      27            RETURN
ISN      28            END

OPTIONS IN EFFECT:  NOLIST   MAP NOXREF   GOSTMT NODECK   SOURCE   TERM   OBJECT FIXED   NOTEST NOTRMFLG   SRCFLG
                    NOSYM NORENT NOSDUMP AUTODBL(NONE)   NOSXM   IL
                       OPT(2) LANGLVL(77) NOFIPS   FLAG(E)   NAME(MAIN )   LINECOUNT(60)      CHARLEN(32767)

*....*...1.........2.........3.........4.........5.........6.........7.*.......8

ISN       1            INCLUDE (LINEF)
ISN       2            SUBROUTINE LINEF(XJ,YJ,XX,YK,A,B)
                 C
                 C     RETURN THE EQUATION OF THE LINE Y=AX+B WHICH PASSES THROUGH THE
                 C     TWO POINTS (XJ,YJ) AND (XX,YK)
                 C
ISN       3            A=0.
ISN       4            B=0.
ISN       5            IF (XJ.EQ.XX) RETURN
ISN       7            A = (YJ-YK) / (XJ-XK)
ISN       8            B = (XJ*YK-XK*YJ) / (XJ-XX)
ISN       9            RETURN
ISN      10            END
```

TAG: SET(S) ENTRY(N)  ASSIGNED(G)     IN COMMON(C)      EQUIVALENCED(E)       INITIAL VALUE(V)    INTRINSIC FCT(I
     REFERENCED(F)    SUBPROGRAM(X)   NAMED CONSTANT(K) STATEMENT FUNCTION(T) USED AS ARGUMENT(A) SUBPROGRAM NAME

PROGRAM NAME: LINEF.    SIZE OF PROGRAM:   1C8 HEX BYTES.

| NAME | MODE | TAG | ADDR.  | NAME | MODE | TAG | ADDR.  | NAME  | MODE | TAG | ADDR.  | NAME | MODE | TAG | ADDR  |
|------|------|-----|--------|------|------|-----|--------|-------|------|-----|--------|------|------|-----|-------|
| A    | R*4  | SF  | 0000FC | B    | R*4  | SF  | 000100 | LINEF |      | R   | 000000 | XJ   | R*4  | F   | 00010 |
| XX   | R*4  | F   | 000108 | YJ   | R*4  | F   | 00010C | YK    | R*4  | F   | 000110 |      |      |     |       |

*** NO USER LABELS ***

*STATISTICS*   SOURCE STATEMENTS = 9, PROGRAM SIZE = 448 BYTES, PROGRAM NAME = LINEF   PAGE:  17.

*STATISTICS*   NO DIAGNOSTICS GENERATED.

LINEF END OF COMPILATION 7 ******

TAG: SET(S) ENTRY(N)  ASSIGNED(G)     IN COMMON(C)      EQUIVALENCED(E)       INITIAL VALUE(V)    INTRINSIC FCT(I;
     REFERENCED(F)    SUBPROGRAM(X)   NAMED CONSTANT(K) STATEMENT FUNCTION(T) USED AS ARGUMENT(A) SUBPROGRAM NAME(

PROGRAM NAME: LINEF.    SIZE OF PROGRAM:   1C8 HEX BYTES.

| NAME | MODE | TAG | ADDR.  | NAME | MODE | TAG | ADDR.  | NAME  | MODE | TAG | ADDR.  | NAME | MODE | TAG | ADDR  |
|------|------|-----|--------|------|------|-----|--------|-------|------|-----|--------|------|------|-----|-------|
| A    | R*4  | SF  | 0000FC | B    | R*4  | SF  | 000100 | LINEF |      | R   | 000000 | XJ   | R*4  | F   | 00010 |
| XX   | R*4  | F   | 000108 | YJ   | R*4  | F   | 00010C | YK    | R*4  | F   | 000110 |      |      |     |       |

*** NO USER LABELS ***

*STATISTICS*   SOURCE STATEMENTS = 9, PROGRAM SIZE = 448 BYTES, PROGRAM NAME = LINEF   PAGE:  17.

*STATISTICS*   NO DIAGNOSTICS GENERATED.

LINEF END OF COMPILATION 7 ******

SUMMARY OF MESSAGES AND STATISTICS FOR ALL COMPILATIONS

*STATISTICS*   SOURCE STATEMENTS = 58, PROGRAM SIZE = 410294 BYTES, PROGRAM NAME = MAIN   PAGE:  1.

*STATISTICS*   NO DIAGNOSTICS GENERATED.

MAIN END OF COMPILATION 1 ******

*STATISTICS*   SOURCE STATEMENTS = 52, PROGRAM SIZE = 2572 BYTES, PROGRAM NAME = KEYS   PAGE:  4.

*STATISTICS* NO DIAGNOSTICS GENERATED.
KEYS END OF COMPILATION 2 ******
*STATISTICS* SOURCE STATEMENTS = 31, PROGRAM SIZE = 1094 BYTES, PROGRAM NAME = GETIT    PAGE:    7.
*STATISTICS* NO DIAGNOSTICS GENERATED.
GETIT END OF COMPILATION 3 ******
*STATISTICS* SOURCE STATEMENTS = 43, PROGRAM SIZE = 7498 BYTES, PROGRAM NAME = TYPE1    PAGE:    9.
*STATISTICS* NO DIAGNOSTICS GENERATED.
TYPE1 END OF COMPILATION 4 ******
*STATISTICS* SOURCE STATEMENTS = 32, PROGRAM SIZE = 1380 BYTES, PROGRAM NAME = NPOLY    PAGE:   12.
*STATISTICS* NO DIAGNOSTICS GENERATED.
NPOLY END OF COMPILATION 5 ******
*STATISTICS* SOURCE STATEMENTS = 28, PROGRAM SIZE = 770 BYTES, PROGRAM NAME = DIRX    PAGE:   15.
*STATISTICS* NO DIAGNOSTICS GENERATED.
DIRX END OF COMPILATION 6 ******
*STATISTICS* SOURCE STATEMENTS = 9, PROGRAM SIZE = 448 BYTES, PROGRAM NAME = LINEF    PAGE:   17.
*STATISTICS* NO DIAGNOSTICS GENERATED.
LINEF END OF COMPILATION 7 ******
***** SUMMARY STATISTICS ***** 0 DIAGNOSTICS GENERATED. HIGHEST SEVERITY CODE IS 0.
*STATISTICS* SOURCE STATEMENTS = 58, PROGRAM SIZE = 410294 BYTES, PROGRAM NAME = MAIN    PAGE:    1.
*STATISTICS* NO DIAGNOSTICS GENERATED.
MAIN END OF COMPILATION 1 ******
*STATISTICS* SOURCE STATEMENTS = 52, PROGRAM SIZE = 2572 BYTES, PROGRAM NAME = KEYS    PAGE:    4.
*STATISTICS* NO DIAGNOSTICS GENERATED.
KEYS END OF COMPILATION 2 ******
*STATISTICS* SOURCE STATEMENTS = 31, PROGRAM SIZE = 1094 BYTES, PROGRAM NAME = GETIT    PAGE:    7.
*STATISTICS* NO DIAGNOSTICS GENERATED.
GETIT END OF COMPILATION 3 ******
*STATISTICS* SOURCE STATEMENTS = 43, PROGRAM SIZE = 7498 BYTES, PROGRAM NAME = TYPE1    PAGE:    9.
*STATISTICS* NO DIAGNOSTICS GENERATED.
TYPE1 END OF COMPILATION 4 ******
*STATISTICS* SOURCE STATEMENTS = 32, PROGRAM SIZE = 1380 BYTES, PROGRAM NAME = NPOLY    PAGE:   12.
*STATISTICS* NO DIAGNOSTICS GENERATED.
NPOLY END OF COMPILATION 5 ******
*STATISTICS* SOURCE STATEMENTS = 28, PROGRAM SIZE = 770 BYTES, PROGRAM NAME = DIRX    PAGE:   15.
*STATISTICS* NO DIAGNOSTICS GENERATED.
DIRX END OF COMPILATION 6 ******
*STATISTICS* SOURCE STATEMENTS = 9, PROGRAM SIZE = 448 BYTES, PROGRAM NAME = LINEF    PAGE:   17.
*STATISTICS* NO DIAGNOSTICS GENERATED.
LINEF END OF COMPILATION 7 ******

```
MVS/XA DFP VER 2 LINKAGE EDITOR
JOB JJF6600A    STEP LKED
INVOCATION PARAMETERS = MAP,LIST,AMODE=31,RMODE=ANY
ACTUAL SIZE=(317440,86016)
OUTPUT DATA SET SYS89097.T141445.RA000.JJF6600A.GOSET IS ON VOLUME ETS012
```

MODULE MAP

| CONTROL SECTION | | | ENTRY | | | | | | | |
|---|---|---|---|---|---|---|---|---|---|---|
| NAME | ORIGIN | LENGTH | NAME | LOCATION | NAME | LOCATION | NAME | LOCATION | NAME | LOCATION |
| MAIN | 00 | 64236 | | | | | | | | |
| KEYS | 6423B | A0C | | | | | | | | |
| GETIT | 64CC8 | 446 | | | | | | | | |
| TYPE1 | 65110 | 1D4A | | | | | | | | |
| NPOLY | 66E60 | 564 | | | | | | | | |
| DIRX | 673C8 | 302 | | | | | | | | |
| LINEF | 676D0 | 1C0 | | | | | | | | |
| FDA * | 67890 | 4D2 | | | | | | | | |
| FDB * | 67D68 | 66E | | | | | | | | |
| FDC * | 683D8 | 1622 | | | | | | | | |
| IFYVINTE* | 69A00 | 205 | | | | | | | | |
| | | | VFEIM@ | 69A0E | VFEIN@ | 69A42 | VFEE@ | 69A88 | VFES@ | 69ACE |
| | | | VFEP@ | 69B06 | VFELC@ | 69B42 | | | | |
| IFYVIOFM* | 69C08 | 360 | | | | | | | | |
| | | | VFRSF@ | 69C16 | VFWSF@ | 69C3C | VFCSF@ | 69C62 | VFDSF@ | 69C88 |
| | | | VFESF@ | 69CAE | VFRDF@ | 69CD4 | VFWDF@ | 69CFA | VFRIF@ | 69D20 |
| | | | VFWIF@ | 69D46 | VFRKF@ | 69D6C | VFWKF@ | 69D92 | VFQKF@ | 69DB8 |
| | | | VFUVF@ | 69DDE | VFIXF@ | 69E04 | VFSXF@ | 69E2A | VFFXF@ | 69E50 |
| IFYVIOIO* | 69F68 | D | IFYVIOI1 | 69F68 | | | | | | |
| ETSIOXA * | 69F78 | DF4 | | | | | | | | |
| | | | OPEN | 69F78 | GET | 6A16E | PUT | 6A2A8 | CLOSE | 6A38E |
| | | | REOPEN | 6A458 | | | | | | |
| CHKMOD * | 6AD70 | 1EC | | | | | | | | |
| COLPRG * | 6AF60 | 400 | | | | | | | | |
| | | | COL | 6AF60 | COLS | 6AF78 | ICOL | 6AF92 | ICOLS | 6AFAC |
| MODCHK * | 6B360 | 208 | | | | | | | | |
| MOVSTR * | 6B568 | 88 | | | | | | | | |
| NUMARG * | 6B5F0 | 56 | | | | | | | | |

```
SCLEAR   *  63648      352
START    *  639A0      45A                STARTX     6BD8E

STEXIT   *  6BE00      CA8
VSINIT   *  6CAA8       88
DATE     *  6CB30      1C0
IFYVLCIO *  6CCF0      406                IFYVLCI1  6CCF0    IFYCLCIO  6CCF0    IFYDLCIO  6CCF0    IFYVLCIN  6CCF0

IFYVCLSI *  6D0F8      370
MOVCHR   *  6D468       36
NEWPG    *  6D4A0      548
TRBCD    *  6D9E8      28A
CLOCK    *  6DC78      1F0
LOCSTR   *  6DE68      2D4
SETCLK   *  6E140       C4

FSTAT       6E208       EC                ITIME      6E182
PGTOP       6E2F8       F8
LIST        6E3F0     1F40
REX         70330       34
```

ENTRY ADDRESS        00

```
TOTAL LENGTH    70368
** GO      DID NOT PREVIOUSLY EXIST BUT WAS ADDED AND HAS AMODE 31
** LOAD MODULE HAS RMODE ANY
** AUTHORIZATION CODE IS       0
```

SCORE THE FIGURAL RESPONSE DATA
TRY USING ARTIFICIAL ITEM 15 DATA

IN THIS RUN, THE FOLLOWING LIMITATIONS ARE IMPOSED:

```
         MAX. NO. OF ITEMS = 15
     MAX. NO. OF ITEM TYPES =  1
      MAX. NO. KEYS PER ITEM =  8
    MAX. NO. WINDOWS PER KEY = 20
   MAX. NO. VERT. PER WINDOW = 20
  MAX. NO. PTS. PER RESPONSE = 500
         MAXIMUM KEY VALUE =  8
```

TYPE1.1   POINTS TO ASSESS:
```
            5.3   5.1
            5.1   5.1
            5.3   5.1
            5.2   5.2
            5.3   5.2
            5.3   5.2
            5.2   5.3
            5.3   5.3
            5.3   5.3
            5.1   5.3
            5.2   5.3
            5.3   5.3
            5.4   5.3
```

TYPE1.2   VERTICES OF WINDOW:
```
            5.0   4.9
            5.5   5.2
            6.1   4.9
            6.3   5.5
            5.9   6.1
            5.5   6.2
            5.0   6.0
            4.8   5.5
```

SCORE.1  123456  SCORE =  0.  0.  0.  0.  0.  0.  0.  0.  0.  0.  0.  0.  0.  0.  0.

TYPE1.1   POINTS TO ASSESS:
```
            3.2   6.1
            3.2   6.2
            3.3   6.2
            3.3   6.2
            3.4   6.2
            3.2   6.3
            3.3   6.3
            3.3   6.3
            3.2   6.3
            3.3   6.3
            3.3   6.3
            3.4   6.3
```

TYPE1.2   VERTICES OF WINDOW:
```
            5.0   4.9
            5.5   5.2
            6.1   4.9
            6.3   5.5
            5.9   6.1
            5.5   6.2
            5.0   6.0
            4.8   5.5
```

TYPE1.1   POINTS TO ASSESS:
```
            3.2   6.1
            3.2   6.2
            3.3   6.2
            3.3   6.2
            3.4   6.2
            3.2   6.3
            3.3   6.3
            3.3   6.3
            3.2   6.3
            3.3   6.3
            3.3   6.3
            3.4   6.3
```

TYPE1.2   VERTICES OF WINDOW:
```
            6.5   6.0
            7.0   6.0
            7.0   6.5
            6.5   6.5
```

SCORE.4  789012  SCORE =  0.  0.  0.  0.  0.  0.  0.  0.  0.  0.  0.  0.  0.  0.  5.

SCORE THE FIGURAL RESPONSE DATA
TRY USING ARTIFICIAL ITEM 15 DATA
SUMMARY OF RESPONSES

| SCORE INTERVALS | TOTAL | | GROUP 1 | | GROUP 2 | | GROUP 3 | | GROUP 4 | | GROUP 5 | |
|---|---|---|---|---|---|---|---|---|---|---|---|---|
| | FREQ | PRCNT | FREQ | PRCNT | FREQ | PRCNT | FREQ | PRCNT | FREQ | PRCNT | FREQ | PRCNT |
| 8.000 | 1 | 50.0 | 0 | 0.0 | 0 | 0.0 | 0 | 0.0 | 0 | 0.0 | 0 | 0.0 |
| 7.000 | 0 | 0.0 | 0 | 0.0 | 0 | 0.0 | 0 | 0.0 | 0 | 0.0 | 0 | 0.0 |
| 6.000 | 0 | 0.0 | 0 | 0.0 | 0 | 0.0 | 0 | 0.0 | 0 | 0.0 | 0 | 0.0 |
| 5.000 | 1 | 50.0 | 0 | 0.0 | 0 | 0.0 | 0 | 0.0 | 0 | 0.0 | 0 | 0.0 |
| 4.000 | 0 | 0.0 | 0 | 0.0 | 0 | 0.0 | 0 | 0.0 | 0 | 0.0 | 0 | 0.0 |
| 3.000 | 0 | 0.0 | 0 | 0.0 | 0 | 0.0 | 0 | 0.0 | 0 | 0.0 | 0 | 0.0 |
| 2.000 | 0 | 0.0 | 0 | 0.0 | 0 | 0.0 | 0 | 0.0 | 0 | 0.0 | 0 | 0.0 |
| 1.000 | 0 | 0.0 | 0 | 0.0 | 0 | 0.0 | 0 | 0.0 | 0 | 0.0 | 0 | 0.0 |
| 0.000 | 0 | 0.0 | 0 | 0.0 | 0 | 0.0 | 0 | 0.0 | 0 | 0.0 | 0 | 0.0 |
| MINIMUM VALUE = | 5.000 | | ********** | | ********** | | ********** | | ********** | | ********** | |
| MAXIMUM VALUE = | 8.000 | | ********** | | ********** | | ********** | | ********** | | ********** | |
| CASES PROCESSED = | 2 | | 0 | | 0 | | 0 | | 0 | | 0 | |

| SCORE INTERVALS | TOTAL | | GROUP 6 | | GROUP 7 | | GROUP 8 | | GROUP 9 | | GROUP 10 | |
|---|---|---|---|---|---|---|---|---|---|---|---|---|
| | FREQ | PRCNT | FREQ | PRCNT | FREQ | PRCNT | FREQ | PRCNT | FREQ | PRCNT | FREQ | PRCNT |
| 8.000 | 1 | 50.0 | 0 | 0.0 | 0 | 0.0 | 0 | 0.0 | 0 | 0.0 | 0 | 0.0 |
| 7.000 | 0 | 0.0 | 0 | 0.0 | 0 | 0.0 | 0 | 0.0 | 0 | 0.0 | 0 | 0.0 |
| 6.000 | 0 | 0.0 | 0 | 0.0 | 0 | 0.0 | 0 | 0.0 | 0 | 0.0 | 0 | 0.0 |
| 5.000 | 1 | 50.0 | 0 | 0.0 | 0 | 0.0 | 0 | 0.0 | 0 | 0.0 | 0 | 0.0 |
| 4.000 | 0 | 0.0 | 0 | 0.0 | 0 | 0.0 | 0 | 0.0 | 0 | 0.0 | 0 | 0.0 |
| 3.000 | 0 | 0.0 | 0 | 0.0 | 0 | 0.0 | 0 | 0.0 | 0 | 0.0 | 0 | 0.0 |
| 2.000 | 0 | 0.0 | 0 | 0.0 | 0 | 0.0 | 0 | 0.0 | 0 | 0.0 | 0 | 0.0 |
| 1.000 | 0 | 0.0 | 0 | 0.0 | 0 | 0.0 | 0 | 0.0 | 0 | 0.0 | 0 | 0.0 |
| 0.000 | 0 | 0.0 | 0 | 0.0 | 0 | 0.0 | 0 | 0.0 | 0 | 0.0 | 0 | 0.0 |
| MINIMUM VALUE = | 5.000 | | ********** | | ********** | | ********** | | ********** | | ********** | |
| MAXIMUM VALUE = | 8.000 | | ********** | | ********** | | ********** | | ********** | | ********** | |
| CASES PROCESSED = | 2 | | 0 | | 0 | | 0 | | 0 | | 0 | |

| SCORE INTERVALS | TOTAL | | GROUP 11 | | GROUP 12 | | GROUP 13 | | GROUP 14 | | GROUP 15 | |
|---|---|---|---|---|---|---|---|---|---|---|---|---|
| | FREQ | PRCNT | FREQ | PRCNT | FREQ | PRCNT | FREQ | PRCNT | FREQ | PRCNT | FREQ | PRCNT |
| 8.000 | 1 | 50.0 | 0 | 0.0 | 0 | 0.0 | 0 | 0.0 | 0 | 0.0 | 1 | 50.0 |
| 7.000 | 0 | 0.0 | 0 | 0.0 | 0 | 0.0 | 0 | 0.0 | 0 | 0.0 | 0 | 0.0 |
| 6.000 | 0 | 0.0 | 0 | 0.0 | 0 | 0.0 | 0 | 0.0 | 0 | 0.0 | 0 | 0.0 |
| 5.000 | 1 | 50.0 | 0 | 0.0 | 0 | 0.0 | 0 | 0.0 | 0 | 0.0 | 1 | 50.0 |
| 4.000 | 0 | 0.0 | 0 | 0.0 | 0 | 0.0 | 0 | 0.0 | 0 | 0.0 | 0 | 0.0 |
| 3.000 | 0 | 0.0 | 0 | 0.0 | 0 | 0.0 | 0 | 0.0 | 0 | 0.0 | 0 | 0.0 |
| 2.000 | 0 | 0.0 | 0 | 0.0 | 0 | 0.0 | 0 | 0.0 | 0 | 0.0 | 0 | 0.0 |
| 1.000 | 0 | 0.0 | 0 | 0.0 | 0 | 0.0 | 0 | 0.0 | 0 | 0.0 | 0 | 0.0 |
| 0.000 | 0 | 0.0 | 0 | 0.0 | 0 | 0.0 | 0 | 0.0 | 0 | 0.0 | 0 | 0.0 |
| MINIMUM VALUE = | 5.000 | | ********** | | ********** | | ********** | | ********** | | 5.000 | |
| MAXIMUM VALUE = | 8.000 | | ********** | | ********** | | ********** | | ********** | | 8.000 | |
| CASES PROCESSED = | 2 | | 0 | | 0 | | 0 | | 0 | | 2 | |

33 CARDS/RECORDS WERE READ

I/O SUMMARY:

| | UNIT | FT10 | FT11 | FT12 | FT13 | FT14 |
|---|---|---|---|---|---|---|
| CALLS TO GET | | 25 | 0 | 0 | 0 | 0 |
| CALLS TO PUT | | 0 | 2 | 0 | 0 | 0 |

| | UNIT | FT15 | FT16 | FT17 | FT18 | FT19 |
|---|---|---|---|---|---|---|
| CALLS TO GET | | 0 | 0 | 0 | 0 | 0 |

NO ERRORS DETECTED BY F4STAT

ETS-5

PREP

JES2 JOB LOG -- SYSTEM CPU2 -- NODE P0

```
-------- JOB 5796   IEF097I JJF6600P - USER JJF6600 ASSIGNED
15.53.07 JOB 5796   IEF677I WARNING MESSAGE(S) FOR JOB JJF6600P ISSUED
15.53.07 JOB 5796   $HASP373 JJF6600P STARTED - INIT 1 - CLASS A - SYS CPU2
15.53.07 JOB 5796   IEF403I JJF6600P - STARTED - TIME=15.53.07
15.53.45 JOB 5796   IEF404I JJF6600P - ENDED - TIME=15.53.45
15.53.45 JOB 5796   $HASP395 JJF6600P ENDED

------ JES2 JOB STATISTICS ------

07 APR 89 JOB EXECUTION DATE

28 CARDS READ 1,389 SYSOUT PRINT RECORDS

0 SYSOUT PUNCH RECORDS

101 SYSOUT SPOOL KBYTES 0.63 MINUTES EXECUTION TIME
```

```
1   //JJF6600P JOB (6600,55,1,5),'39109,TRN,FERRISJJ',CLASS=A,              JOB 5796
    //         MSGCLASS=T
    ***JOBPARM  S=CPU2,P=PROC02
    *** $ACFJ219 ACF2 ACTIVE P0                                             ACF2
    ***ROUTE PRINT LOCAL
    ***UTPUT FT06 N=1                                                       00000030
2   // EXEC RSTATVLG
    ***ORT.SYSPRINT DD DUMMY
    ***                                                 NAE.PROCLIB(RSTATVLG) 00010012
3   XXRSTATVLG PROC CLIB=FORTVS,COMPILR=FORTVS,FORTREG=1200K,C='X',         00020013
    XX         SOURCE=SOURCE,LIST=NOLIST,XREF=NOXREF,MAP=MAP,               00030021
    XX         OPTLVL=2,LANGLVL=77,MSGS=E,TERM=TERM,OBSPACE='(125,50)',     00040021
    XX         NAME=GO,LLIB1=VFORTLIB,LLIB2=VFORTLIB,AMODE=31,RMODE=ANY,    00050020
    XX         MYLIB='OCS.FVSTAT',MYLIB2='OCS.FVSTAT',MYLIB3='OCS.FVSTAT',  00060020
    XX         GOREG=4000K,DUMP=SHORT                                      00070024
    ***************************************************************        00080000
    ***              VS FORTRAN COMPILE, LINK AND GO                *       00090002
    ***************************************************************        00100000
    ***                                                                     00110000
    ***      STEP    PARAMETER  DEFAULT   USE                               00120000
    ***                                                                     00130000
    ***      FORT    CLIB       FORTVS    COMPILER LIBRARY                  00140000
    ***              COMPILR    FORTVS    COMPILER NAME                     00150000
    ***              FORTREG    1200K     FORT-STEP REGION SIZE             00160002
    ***              SOURCE     SOURCE    SOURCE LISTING PRINT CONTROL      00170000
    ***              LIST       NOLIST    OBJECT LISTING PRINT CONTROL      00180000
    ***              XREF       NOXREF    XREF PRINT CONTROL                00190000
    ***              MAP        MAP       MAP PRINT CONTROL                 00200006
    ***              OPTLVL     2         OPTIMIZATION LEVEL                00210000
    ***              LANGLVL    77        LANGUAGE LEVEL                    00220000
    ***              MSGS       E         MESSAGE PRINT CONTROL             00230021
    ***              TERM       TERM      SYSTERM PRINT CONTROL             00240010
    ***              OBSPACE    (125,50)  OBJECT MODULE SPACE ALLOC         00250004
    ***                                                                     00260000
    ***      LKED    NAME       GO        LOAD MODULE NAME                  00270004
    ***              GOSET                MODULE LIBRARY                    00280000
    ***              AMODE      31        ADDRESSING MODE                   00290020
    ***              RMODE      ANY       RESIDENCY MODE                    00300020
    ***              LLIB1      VFORTLIB  SYSTEM LINK LIBRARY               00310000
    ***              LLIB2      VFORTLIB  SYSTEM LINK LIBRARY               00320000
    ***              MYLIB      OCS.FVSTAT USER LINK LIBRARY                00330015
    ***              MYLIB2     OCS.F4STAT USER LINK LIBRARY                00340004
    ***              MYLIB3     OCS.F4STAT USER LINK LIBRARY                00350004
    ***                                                                     00360000
    ***      GO      GOREG      4000K     GO-STEP REGION SIZE               00370024
    ***                                                                     00380002
    ***      DMP     DUMP       SHORT     DUMP LENGTH                       00390002
    ***************************************************************        00400018
4   XXFORT  EXEC  PGM=&COMPILR,REGION=&FORTREG,COND=(4,LT),                 00410000
    IEF653I SUBSTITUTION JCL - PGM=FORTVS,REGION=1200K,COND=(4,LT),
    XX      PARM=('&SOURCE','&LIST','&XREF','&MAP','OPT(&OPTLVL)',          00420011
    IEF653I SUBSTITUTION JCL - PARM=('SOURCE','NOLIST','NOXREF','MAP','OPT(2)',
    XX      'LANGLVL(&LANGLVL)','FLAG(&MSGS)','&TERM',                     00430011
    IEF653I SUBSTITUTION JCL - 'LANGLVL(77)','FLAG(E)','TERM',
    XX      'CHARLEN(32767)','GOSTMT','NOTF')                               00440011
5   XXSTEPLIB   DD DSN=SYS1.&CLIB,DISP=SHR                                  00450014
    IEF653I SUBSTITUTION JCL - DSN=SYS1.FORTVS,DISP=SHR
6   XXSYSLIN    DD DSN=&&LOADSET,DISP=(MOD,PASS),UNIT=TEMP,                 00460014
    XX             SPACE=(3200,&OBSPACE),DCB=BLKSIZE=3200                   00470000
    IEF653I SUBSTITUTION JCL - SPACE=(3200,(125,50)),DCB=BLKSIZE=3200
```

```
 7    XXSYSPRINT  DD SYSOUT=&C,DCB=BLKSIZE=3429                          00480014
      IEF653I SUBSTITUTION JCL - SYSOUT=*,DCB=BLKSIZE=3429
 8    XXSYSPUNCH  DD SYSOUT=B,DCB=BLKSIZE=3440                           00490014
 9    XXSYSTERM   DD SYSOUT=&C                                           00500014
      IEF653I SUBSTITUTION JCL - SYSOUT=*
10    //FORT.SYSIN   DD DSN=JJF6600.FIG.FORT(PREPTRY),DISP=SHR
11    //FORT.SYSLIB  DD DSN=JJF6600.FIG.FORT,DISP=SHR
12    //             DD DSN=JJF6600.MISC.FORT,DISP=SHR
      XXX0.FT06F001 DD SYSOUT=(*,,FT06)                                  00000090
13    XXLKED     EXEC PGM=IEWL,PARM='MAP,LIST,AMODE=&AMODE,RMODE=&RMODE',00510022
      IEF653I SUBSTITUTION JCL - PGM=IEWL,PARM='MAP,LIST,AMODE=31,RMODE=ANY',
      XX           COND=(4,LT,FORT)                                      00520014
14    XXSYSLIB    DD DISP=SHR,DSN=SYS1.&LLIB1                            00530000
      IEF653I SUBSTITUTION JCL - DISP=SHR,DSN=SYS1.VFORTLIB
15    XX          DD DISP=SHR,DSN=SYS1.&LLIB2                            00540000
      IEF653I SUBSTITUTION JCL - DISP=SHR,DSN=SYS1.VFORTLIB
16    XX          DD DISP=SHR,DSN=&MYLIB                                 00550000
      IEF653I SUBSTITUTION JCL - DISP=SHR,DSN=OCS.FVSTAT
17    XX          DD DISP=SHR,DSN=OCS.FVSTAT                             00560015
18    XX          DD DISP=SHR,DSN=&MYLIB2                                00570000
      IEF653I SUBSTITUTION JCL - DISP=SHR,DSN=OCS.FVSTAT
19    XX          DD DISP=SHR,DSN=NAE.PGM.XALIB                          00580023
20    XX          DD DISP=SHR,DSN=&MYLIB3                                00590000
      IEF653I SUBSTITUTION JCL - DISP=SHR,DSN=OCS.FVSTAT
21    XX          DD DISP=SHR,DSN=ETS.SYSLIB                             00600000
22    XXSYSLIN    DD DSN=&&LOADSET,DISP=(OLD,DELETE)                     00610000
23    XX          DD DDNAME=SYSIN                                        00620000
24    XXSYSLMOD   DD DSN=&GOSET(&NAME),DISP=(MOD,PASS),UNIT=TEMP,       +00630000
      IEF653I SUBSTITUTION JCL - DSN=&GOSET(GO),DISP=(MOD,PASS),UNIT=TEMP,
      XX             SPACE=(CYL,(2,1,1))                                 00640000
25    XXSYSPRINT  DD SYSOUT=&C,DCB=BUFNO=1                               00650013
      IEF653I SUBSTITUTION JCL - SYSOUT=*,DCB=BUFNO=1
26    XXSYSUT1    DD DSN=&&SYSUT1,UNIT=TEMP,DCB=BLKSIZE=1024,           +00660000
      XX             SPACE=(1024,(20,10),RLSE)                           00670000
27    XXGO       EXEC PGM=&NAME,COND=((4,LT,FORT),(4,LT,LKED)),REGION=&GOREG 00680000
      IEF653I SUBSTITUTION JCL - PGM=GO,COND=((4,LT,FORT),(4,LT,LKED)),REGION=4000K
28    XXSTEPLIB   DD DSN=&GOSET,DISP=(OLD,KEEP,DELETE)                   00690000
29    XX          DD DSN=SYS1.VFORTLIB,DISP=SHR                          00700019
30    XX          DD DSN=OCS.FVSTAT,DISP=SHR                             00710019
31    XX          DD DSN=NAE.PGM.XALIB,DISP=SHR                          00720023
32    XXFT05F001  DD DDNAME=SYSIN                                        00730000
33    XXFT06F001  DD SYSOUT=&C                                           00740013
      IEF653I SUBSTITUTION JCL - SYSOUT=*
34    XXFT07F001  DD SYSOUT=B                                            00750000
35    XXFT97F001  DD SPACE=(CYL,(1,1)),DISP=NEW,UNIT=TEMP,DSN=&&SYSUT1   00760000
36    XXFT98F001  DD SPACE=(CYL,(1,1)),DISP=NEW,UNIT=TEMP,DSN=&&SYSUT2   00770000
37    XXSYSUDUMP  DD DSN=&&DUMP,SPACE=(CYL,(1,1)),UNIT=TEMP,DISP=(NEW,PASS) 00780004
38    //GO.FT20F001 DD DSN=JJF6600.FIG.FLIPBYTE,DISP=SHR
39    //GO.FT10F001 DD DSN=JJF6600.FIG.TRYBYTE,DISP=SHR
      XXX0.FT10F001 DD DSN=JJF6600.FIG.TRY01,DISP=SHR
      XXX
      XXX        NDPI = NO. DOTS PER INCH IN IMAGE PROCESSOR INPUT
      XXX        NPPI = NO. SUPER-PIXELS PER INCH IN PREP OUTPUT
      XXX        XMIN, ETC. = PLOTTING WINDOW; SET ONE OF A PAIR TO -1. FOR
      XXX                   BEST RESOLUTION; BOTH TO -1. FOR FULL PAGE;
      XXX                   SET BOTH RANGES TO CONTROL SCALE BUT NOT
      XXX                   IDENTIFY INDIVIDUAL WEIGHTS OF POINTS.
      XXX     READ (5,'(2I4)') NDPI,NPPI
      XXX     READ (5,'(4F5.3)') XMIN,XMAX,YMIN,YMAX
      XXX
40    //GO.SYSIN  DD *
41    XXDMP     EXEC PGM=SHRTDMP,COND=ONLY,REGION=50K,PARM=&DUMP         00790000
      IEF653I SUBSTITUTION JCL - PGM=SHRTDMP,COND=ONLY,REGION=50K,PARM=SHORT
42    XXSTEPLIB   DD DSN=OCS.SAPGM,DISP=SHR                              00800000
43    XXFT06F001  DD SYSOUT=&C                                           00810013
      IEF653I SUBSTITUTION JCL - SYSOUT=*
44    XXFT10F001  DD DSN=&&DUMP,DISP=(OLD,DELETE)                        00820000

STMT NO. MESSAGE
   27   IEF686I DDNAME REFERRED TO ON DDNAME KEYWORD IN PRIOR STEP WAS NOT RESOLVED
   28   IEF648I INVALID DISP FIELD- PASS SUBSTITUTED
IEF236I ALLOC. FOR JJF6600P FORT
IEF237I D2E  ALLOCATED TO STEPLIB
IEF237I E0C  ALLOCATED TO SYSLIN
IEF237I JES2 ALLOCATED TO SYSPRINT
IEF237I JES2 ALLOCATED TO SYSPUNCH
IEF237I JES2 ALLOCATED TO SYSTERM
IEF237I 12B  ALLOCATED TO SYSIN
IEF237I 25B  ALLOCATED TO SYS02660
IEF237I 12B  ALLOCATED TO SYSLIB
IEF237I A29  ALLOCATED TO
IEF142I JJF6600P FORT - STEP WAS EXECUTED - COND CODE 0004
IEF285I   SYS1.FORTVS                                   KEPT
IEF285I   VOL SER NOS= SYS004.
IEF285I   SYS89097.T155307.RA000.JJF6600P.LOADSET       PASSED
IEF285I   VOL SER NOS= ETS010.
IEF285I   JES2.JOB05796.SO000102                        SYSOUT
IEF285I   JES2.JOB05796.SO000103                        SYSOUT
IEF285I   JES2.JOB05796.SO000104                        SYSOUT
IEF285I   JJF6600.FIG.FORT                              KEPT
IEF285I   VOL SER NOS= USER09.
IEF285I   ICFCAT.VSYS017                                KEPT
IEF285I   VOL SER NOS= SYS017.
IEF285I   JJF6600.FIG.FORT                              KEPT
IEF285I   VOL SER NOS= USER09.
IEF285I   JJF6600.MISC.FORT                             KEPT
IEF285I   VOL SER NOS= USER01.
IEF373I STEP /FORT   / START 89097.1553
IEF374I STEP /FORT   / STOP  89097.1553 CPU   0MIN 00.50SEC SRB   0MIN 00.01SEC VIRT 1216K SYS   284K EXT     4K SYS   8860K

JOB       STEP     PROGRAM   CC/RC    STEP    START    WALL CLK   CPU  (300X)
  NAME      NAME     EXECUTED            DATE    TIME    HH.MM.SS   HH.MM.SS.HD

JJF6600P   FORT     FORTVS    0004    89.097   15.53     0.06      0.50
```

| PRIVATE AREA RECLAIMS | PAGE INS NON-SWAP | PAGE OUTS NON-SWAP | MOUNTS DISK TAPE | DEDICATED DISK TAPE | EST STEP COST |
|---|---|---|---|---|---|
| 0 | 3 | 0 | 0 0 | 0 0 | .15 |

| ADDRESS | ACCESSES | ADDRESS | ACCESSES | ADDRESS | ACCESSES |
|---|---|---|---|---|---|
| 0D2E | 68 | 0E0C | 10 | 0128 | 4 |
| 025B | 0 | 0128 | 13 | 0A29 | 0 |

```
xxxxxxxxxxxxxxxxxxxxxxxxxxxxxxxxxxxxxxxxxxxxxxxxxxxxxxxxxxxxxxxxx
IEF236I ALLOC. FOR JJF6600P LKED
IEF237I D2E ALLOCATED TO SYSLIB
IEF237I D2E ALLOCATED TO
IEF237I E1C ALLOCATED TO
IEF237I E1C ALLOCATED TO
IEF237I E06 ALLOCATED TO
IEF237I E1C ALLOCATED TO
IEF237I 704 ALLOCATED TO
IEF237I 704 ALLOCATED TO SYS02664
IEF237I 25B ALLOCATED TO SYS02662
IEF237I E0C ALLOCATED TO SYSLIN
IEF237I DMY ALLOCATED TO
IEF237I E0E ALLOCATED TO SYSLMOD
IEF237I JES2 ALLOCATED TO SYSPRINT
IEF237I E0C ALLOCATED TO SYSUT1
IEF142I JJF6600P LKED - STEP WAS EXECUTED - COND CODE 0000
IEF285I    SYS1.VFORTLIB                              KEPT
IEF285I    VOL SER NOS= SYS004.
IEF285I    SYS1.VFORTLIB                              KEPT
IEF285I    VOL SER NOS= SYS004.
IEF285I    OCS.FVSTAT                                 KEPT
IEF285I    VOL SER NOS= CICS01.
IEF285I    OCS.FVSTAT                                 KEPT
IEF285I    VOL SER NOS= CICS01.
IEF285I    OCS.FVSTAT                                 KEPT
IEF285I    VOL SER NOS= CICS01.
IEF285I    MAE.PGM.XALIB                              KEPT
IEF285I    VOL SER NOS= CICS02.
IEF285I    OCS.FVSTAT                                 KEPT
IEF285I    VOL SER NOS= CICS01.
IEF285I    ETS.SYSLIB                                 KEPT
IEF285I    VOL SER NOS= SYS027.
IEF285I    CATALOG.VSYS027                            KEPT
IEF285I    VOL SER NOS= SYS027.
IEF285I    ICFCAT.VSYS017                             KEPT
IEF285I    VOL SER NOS= SYS017.
IEF285I    SYS89097.T155307.RA000.JJF6600P.LOADSET    DELETED
IEF285I    VOL SER NOS= ETS010.
IEF285I    SYS89097.T155307.RA000.JJF6600P.GOSET      PASSED
IEF285I    VOL SER NOS= ETS012.
IEF285I    JES2.JOB05796.S0000105                     SYSOUT
IEF285I    SYS89097.T155307.RA000.JJF6600P.SYSUT1     DELETED
IEF285I    VOL SER NOS= ETS010.
IEF373I STEP /LKED    / START 89097.1553
IEF374I STEP /LKED    / STOP  89097.1553 CPU  0MIN 00.20SEC SRB  0MIN 00.05SEC VIRT  432K SYS  280K EXT  0K SYS  88/
xxxxxxxxxxxxxxxxxxxxxxxxxxxxxxxxxxxxxxxxxxxxxxxxxxxxxxxxxxxxxxxxx
```

| JOB NAME | STEP NAME | PROGRAM EXECUTED | CC/RC | STEP DATE | START TIME | WALL CLK HH.MM.SS | CPU (308X) HH.MM.SS.HD |
|---|---|---|---|---|---|---|---|
| JJF6600P | LKED | IEWL | 0000 | 89.097 | 15.53 | 0.16 | 0.20 |

| PRIVATE AREA RECLAIMS | PAGE INS NON-SWAP | PAGE OUTS NON-SWAP | MOUNTS DISK TAPE | DEDICATED DISK TAPE | EST STEP COST |
|---|---|---|---|---|---|
| 0 | 0 | 0 | 0 0 | 0 0 | .06 |

| ADDRESS | ACCESSES | ADDRESS | ACCESSES | ADDRESS | ACCESSES |
|---|---|---|---|---|---|
| 0D2E | 140 | 0D2E | 0 | 0E1C | 158 |
| 0E1C | 0 | 0E1C | 0 | 0E06 | 2 |
| 0E1C | 0 | 0704 | 2 | 0704 | 0 |
| 025B | 0 | 0E0C | 11 | 0E0E | 54 |
| 0E0C | 72 | | | | |

```
xxxxxxxxxxxxxxxxxxxxxxxxxxxxxxxxxxxxxxxxxxxxxxxxxxxxxxxxxxxxxxxxx
IEF236I ALLOC. FOR JJF6600P GO
IEF237I E0E ALLOCATED TO STEPLIB
IEF237I D2E ALLOCATED TO
IEF237I E1C ALLOCATED TO
IEF237I E06 ALLOCATED TO
IEF237I 704 ALLOCATED TO SYS02668
IEF237I 25B ALLOCATED TO SYS02666
IEF237I JES2 ALLOCATED TO FT05F001
IEF237I JES2 ALLOCATED TO FT06F001
IEF237I JES2 ALLOCATED TO FT07F001
IEF237I E0C ALLOCATED TO FT97F001
IEF237I E0E ALLOCATED TO FT98F001
IEF237I E0C ALLOCATED TO SYSUDUMP
IEF237I 708 ALLOCATED TO FT20F001
IEF237I 128 ALLOCATED TO FT10F001
IEF142I JJF6600P GO - STEP WAS EXECUTED - COND CODE 0000
IEF285I    SYS89097.T155307.RA000.JJF6600P.GOSET      PASSED
IEF285I    VOL SER NOS= ETS012.
IEF285I    SYS1.VFORTLIB                              KEPT
IEF285I    VOL SER NOS= SYS004.
IEF285I    OCS.FVSTAT                                 KEPT
IEF285I    VOL SER NOS= CICS01.
IEF285I    MAE.PGM.XALIB                              KEPT
IEF285I    VOL SER NOS= CICS02.
IEF285I    CATALOG.VSYS027                            KEPT
IEF285I    VOL SER NOS= SYS027.
IEF285I    ICFCAT.VSYS017                             KEPT
IEF285I    VOL SER NOS= SYS017.
IEF285I    JES2.JOB05796.SI000101                     SYSIN
IEF285I    JES2.JOB05796.S0000106                     SYSOUT
IEF285I    JES2.JOB05796.S0000107                     SYSOUT
IEF285I    SYS89097.T155307.RA000.JJF6600P.SYSUT1     DELETED
IEF285I    VOL SER NOS= ETS010.
IEF285I    SYS89097.T155307.RA000.JJF6600P.SYSUT2     DELETED
IEF285I    VOL SER NOS= ETS012.
IEF285I    SYS89097.T155307.RA000.JJF6600P.DUMP       PASSED
IEF285I    VOL SER NOS= ETS010.
IEF285I    JJF6600.FIG.FLIPBYTE                       KEPT
IEF285I    VOL SER NOS= USER08.
IEF285I    JJF6600.FIG.TRY100                         KEPT
IEF285I    VOL SER NOS= USER09.
IEF373I STEP /GO     / START 89097.1553
IEF374I STEP /GO     / STOP  89097.1553 CPU  0MIN 04.58SEC SRB  0MIN 00.00SEC VIRT  64K SYS  300K EXT  212K SYS  886
xxxxxxxxxxxxxxxxxxxxxxxxxxxxxxxxxxxxxxxxxxxxxxxxxxxxxxxxxxxxxxxxx
```

| JOB NAME | STEP NAME | PROGRAM EXECUTED | CC/RC | STEP DATE | START TIME | WALL CLK HH.MM.SS | CPU (308X) HH.MM.SS.HD |
|---|---|---|---|---|---|---|---|
| JJF6600P | GO | GO | 0000 | 89.097 | 15.53 | 0.13 | 4.58 |

| PRIVATE AREA RECLAIMS | PAGE INS NON-SWAP | PAGE OUTS NON-SWAP | MOUNTS DISK TAPE | DEDICATED DISK TAPE | EST STEP COST |
|---|---|---|---|---|---|
| 0 | 0 | 0 | 0 0 | 0 0 | 1.40 |

| ADDRESS | ACCESSES | ADDRESS | ACCESSES | ADDRESS | ACCESSES |
|---|---|---|---|---|---|
| 0E0E | 11 | 0D2E | 10 | 0E1C | 2 |
| 0E06 | 0 | 0704 | 0 | 0253 | 0 |
| 0E0C | 0 | 0E0E | 0 | 0E0C | 0 |
| 0708 | 2 | 0128 | 20 | | |

```
********************************************************************************
IEF202I JJF6600P DMP - STEP WAS NOT RUN BECAUSE OF COND=ONLY
IEF272I JJF6600P DMP - STEP WAS NOT EXECUTED.
IEF373I STEP /DMP    / START 89097.1553
IEF374I STEP /DMP    / STOP  89097.1553 CPU    0MIN 00.00SEC SRB    0MIN 00.00SEC VIRT    0K SYS    0K EXT    212K SYS    886
********************************************************************************
```

| JOB NAME | STEP NAME | PROGRAM EXECUTED | CC/RC | STEP DATE | START TIME | WALL CLK HH.MM.SS | CPU (308X) HH.MM.SS.HD |
|---|---|---|---|---|---|---|---|
| JJF6600P | DMP | SHRTDMP | 0000 | 89.097 | 15.53 | 24.00.00 | 0.00 |

| PRIVATE AREA RECLAIMS | PAGE INS NON-SWAP | PAGE OUTS NON-SWAP | MOUNTS DISK TAPE | DEDICATED DISK TAPE | EST STEP COST |
|---|---|---|---|---|---|
| 0 | 0 | 0 | 0 0 | 0 0 | .00 |

```
********************************************************************************
IEF237I E0E ALLOCATED TO SYS00001
IEF285I    SYS89097.T155344.RA000.JJF6600P.R0000001    KEPT
IEF285I    VOL SER NOS= ETS012.
IEF285I    SYS89097.T155307.RA000.JJF6600P.GOSET       DELETED
IEF285I    VOL SER NOS= ETS012.
IEF237I E0C ALLOCATED TO SYS00003
IEF285I    SYS89097.T155344.RA000.JJF6600P.R0000003    KEPT
IEF285I    VOL SER NOS= ETS010.
IEF285I    SYS89097.T155307.RA000.JJF6600P.DUMP        DELETED
IEF285I    VOL SER NOS= ETS010.
IEF375I JOB /JJF6600P/ START 89097.1553
IEF376I JOB /JJF6600P/ STOP  89097.1553 CPU    0MIN 05.28SEC SRB    0MIN 00.06SEC

LEVEL 1.4.1 (MAY 1985)              VS FORTRAN

REQUESTED OPTIONS (EXECUTE): SOURCE,NOLIST,NOXREF,MAP,OPT(2),LANGLVL(77),FLAG(E),TERM,CHARLEN(32767),GOSTMT,NOTF

OPTIONS IN EFFECT:  NOLIST   MAP  NOXREF   GOSTMT NODECK   SOURCE   TERM   OBJECT FIXED  NOTEST NOTRMFLG   SRCFLG
                    NOSYM NORENT NOSDUMP AUTODBL(NONE)    NOSXM    IL
                    OPT(2) LANGLVL(77) NOFIPS   FLAG(E)   NAME(MAIN )  LINECOUNT(60)      CHARLEN(32767)

*....*...1.........2.........3.........4.........5.........6.........7.*.......8

ISM     1            PARAMETER (LH=512,LRECL=112,MAXPT=4000)
                C
                C-------   LH    = NO. BYTES IN THE HEADER RECORD
                C          LRECL = NO. BYTES IN A LOGICAL RECORD
                C          MAXPT = MAX. NO. TOTAL COLLECTED POINTS
                C          NDPI  = NO. DOTS PER INCH IN IMAGE PROCESSOR INPUT
                C          NPPI  = NO. SUPER-PIXELS PER INCH IN PREP OUTPUT
                C          XMIN, ETC. = PLOTTING WINDOW; SET ONE OF A PAIR TO -1. FOR
                C                       BEST RESOLUTION; BOTH TO -1. FOR FULL PAGE;
                C                       SET BOTH RANGES TO CONTROL SCALE BUT NOT
                C                       IDENTIFY INDIVIDUAL WEIGHTS OF POINTS.
                C
ISM     2            CHARACTER*(LRECL) REC,P
ISM     3            CHARACTER*256 TABLE
ISM     4            CHARACTER*3 DPI,PPI
ISM     5            INTEGER NPP(2)
ISM     6            REAL     PN(2),X(MAXPT),Y(MAXPT),WT(MAXPT)
ISM     7            REAL*8   XMIN,XMAX,YMIN,YMAX,PNX,PNY,XR,YR,ASPECT
ISM     8            LOGICAL FULL,SPEC,FLIP
ISM     9            COMMON/FSTAT/UN(33),NREX
ISM    10            READ (5,'(2I4)') NDPI,NPPI
ISM    11            READ (5,'(4F5.3)') XMIN,XMAX,YMIN,YMAX
ISM    12            WRITE (DPI,'(I3)') NDPI
ISM    13            WRITE (PPI,'(I3)') NPPI
ISM    14            CALL START('TRY IMAGE PROCESSOR DATA AT '//DPI//' DPI',
                    &            'SUPER-PIXELS AT '//PPI//' TO THE INCH*')
ISM    15            WRITE (6,'('' 0PLOT WINDOW INPUT (XMIN,XMAX,YMIN,YMAX) ='',4F8.2)')
                    &            XMIN,XMAX,YMIN,YMAX
ISM    16            CALL OPEN(10)
ISM    17            READ (20) TABLE
ISM    18            ASPECT=49.D0/60.D0
ISM    19            NPP(1)=NDPI/NPPI
ISM    20            NPP(2)=NDPI/NPPI
                C------- UNLESS THE NUMBER OF BITS PER SUPER-PIXEL IS A MULTIPLE OF
                C        EIGHT, WE MUST FLIP EACH BYTE END FOR END TO ACCOMMODATE THE
                C        RIGHT-TO-LEFT STORAGE OF BITS IN A BYTE BY THE IMAGE PROC.
ISM    21            FLIP=.TRUE.
ISM    22            IF (MOD(NPP(1),8).EQ.0) FLIP=.FALSE.
ISM    24            PNX=1.D0/NPPI
ISM    25            PNY=1.D0/NPPI
ISM    26            PN(1)=ROUND(PNX)
ISM    27            PN(2)=ROUND(PNY)
ISM    28            FULL=.FALSE.
ISM    29            SPEC=.FALSE.
ISM    30            IF (XMIN*XMAX.LT.0.) THEN
ISM    31               XR=100.D0/NPPI
ISM    32               IF (XMIN.LT.0.) THEN
ISM    33                  XMAX=XMAX-DMOD(XMAX,PNX) + PNX/2.
ISM    34                  XMIN=XMAX-XR
ISM    35               ELSE IF (XMAX.LT.0.) THEN
ISM    36                  XMIN=XMIN-DMOD(XMIN,PNX) + PNX/2.
ISM    37                  XMAX=XMIN+XR
ISM    38               ENDIF
ISM    39            ELSE IF (XMIN.LT.0.) THEN
ISM    40               FULL=.TRUE.
ISM    41            ELSE
ISM    42               SPEC=.TRUE.
ISM    43            ENDIF
ISM    44            IF (YMIN*YMAX.LT.0.) THEN
ISM    45               YR=49.D0/NPPI
```

```
        46          IF (SPEC) THEN
        47              WRITE (6,'(''-=====> PLOT RETAINS ACTUAL SLOPES.'')')
        48              YR=(XMAX-XMIN)*ASPECT
        49          ENDIF
        50          IF (YMIN.LT.0.) THEN
        51              YMAX=YMAX-DMOD(YMAX,PNY) + PNY/2.
        52              YMIN=YMAX-YR
        53          ELSE IF (YMAX.LT.0.) THEN
        54              YMIN=YMIN-DMOD(YMIN,PNY) + PNY/2.
        55              YMAX=YMIN+YR
        56          ENDIF
        57      ENDIF
        58      IA=MOD(LH-1,LRECL) + 1
        59      IB=LRECL-IA
        60      IF (LH.EQ.0) GO TO 201
        61      DO 1 N=1,LH,LRECL
        62    1 CALL GET(10,REC)
        63      GO TO 5
        64  201 CALL GET(10,REC,=301)
        65      P(IB+1:)=REC(:IA)
        66      CALL PREP(P,LRECL*8,MPP,PN,X,Y,WT,NN,.FALSE.,TABLE,FLIP)
        67      IF (NN.GT.MAXPT) WRITE (6,'(''-----> TOO MANY POINTS'')')
        68    5 P(:IB)=REC(IA+1:)
        69      GO TO 201
        70  301 CALL PREP(P,LRECL*8,MPP,PN,X,Y,WT,NN,.TRUE.,TABLE,FLIP)
        71      WRITE (6,'(''-'',5X,I6,'' POINTS OF DARK FOUND BY PREP.'')') NN
        72      IF (FULL) THEN
        73          CALL F4PLOT(X,Y,WT,NN,
        74     &       'DERIVED X- AND Y-COORDINATES - LOCATIONS ONLY,'//
        75     &       ' RANGES FULL WITHIN MARGINS*')
        76      ELSE
        77          IF (SPEC) THEN
                        CALL F4PLOT(X,Y,WT,NN,
               &            'DERIVED X- AND Y-COORDINATES - LOCATIONS ONLY,'//
               &            ' RANGES SPECIFIED*',
               &            0,XMIN,XMAX,YMIN,YMAX)
        78          ELSE
        79              CALL F4PLOT(X,Y,WT,-NN,
               &            'DERIVED X- AND Y-COORDINATES - WEIGHT VALUES PLOTTED*',
               &            0,XMIN,XMAX,YMIN,YMAX)
        80          ENDIF
        81      ENDIF
            C  &          4.0,7.34, 5.86,7.5)
            C  &          4.0,7.5, 4.5,7.5)
        82      CALL STEXIT
        83      STOP
ISN     84      END
```

STORAGE MAP

TAG: SET(S) ENTRY(N)  ASSIGNED(G)    IN COMMON(C)      EQUIVALENCED(E)      INITIAL VALUE(V)    INTRINSIC FCT(I)
     REFERENCED(F)    SUBPROGRAM(X)  NAMED CONSTANT(K) STATEMENT FUNCTION(T) USED AS ARGUMENT(A) SUBPROGRAM NAME(R)

PROGRAM NAME: MAIN.    SIZE OF PROGRAM:   0D96 HEX BYTES.

| NAME | MODE | TAG | ADDR. | NAME | MODE | TAG | ADDR. | NAME | MODE | TAG | ADDR. | NAME | MODE | TAG | ADDR. |
|---|---|---|---|---|---|---|---|---|---|---|---|---|---|---|---|
| ASPECT | R*8 | SF | 0003D0 | CNCAT0 | R*4 | FX | 00CE88 | DMOD | R*8 | I | | DPI | CHAR | SFA | 000780 |
| FLIP | L*4 | SFA | 0003E8 | FULL | L*4 | SF | 0003EC | F4PLOT | | | FX | 00CE8C | GET | | FX | 00CEA0 |
| IA | I*4 | SF | 0003DC | IB | I*4 | SF | 0003E0 | LH | I*4 | FK | 00025C | LRECL | I*4 | FK | 000254 |
| MAXPT | I*4 | FK | 000258 | MOD | | I | | N | I*4 | SF | 0003D8 | NDPI | I*4 | SFA | 0003F0 |
| NN | I*4 | FA | 0003E4 | MPP | I*4 | SFA | 000948 | NPPI | I*4 | SFA | 0003F4 | NREX | I*4 | C | UNREFD |
| OPEN | | FX | 00CEA4 | P | CHAR | SFA | 000710 | PN | R*4 | SFA | 000940 | PNX | R*8 | SFA | 0003A0 |
| PNY | R*8 | SFA | 0003A8 | PPI | CHAR | SFA | 000783 | PREP | | | FX | 00CEA8 | REC | CHAR | FA | 000786 |
| ROUND | R*4 | FX | 00CEAC | SPEC | L*4 | SF | 0003F8 | START | | | FX | 00CEB0 | STEXIT | | FX | 00CEC0 |
| TABLE | CHAR | SFA | 0007F8 | UN | R*4 | C | UNREFD | VFEE0 | | | FX | 00CEB4 | VFEIM0 | | FX | 00CEC4 |
| VFIXF0 | | FX | 00CEC8 | VFIXU0 | | | FX | 00CECC | VFRSF0 | | | FX | 00CED0 | VFRSU0 | | FX | 00CED4 |
| VFWIF0 | | FX | 00CED8 | VFWSF0 | | | FX | 00CEDC | WT | R*4 | FA | 009000 | X | R*4 | FA | 001000 |
| XMAX | R*8 | SFA | 0003B0 | XMIN | R*8 | SFA | 000388 | XR | R*8 | SF | 000398 | Y | R*4 | FA | 005000 |
| YMAX | R*8 | SFA | 0003C0 | YMIN | R*8 | SFA | 0003C8 | YR | R*8 | SF | 000398 | | | | |

COMMON INFORMATION

NAME: FSTAT.   SIZE:    88 HEX BYTES. (E) - EQUIVALENCED

| NAME | MODE | DISPL. | NAME | MODE | DISPL. | NAME | MODE | DISPL. | NAME | MODE | DISPL. |
|---|---|---|---|---|---|---|---|---|---|---|---|
| UN | R*4 | 000000 | NREX | I*4 | 000084 | | | | | | |

LABEL INFORMATION.

| LABEL | DEFINED | ADDR. | LABEL | DEFINED | ADDR. | LABEL | DEFINED | ADDR. | LABEL | DEFINED | ADDR. |
|---|---|---|---|---|---|---|---|---|---|---|---|
| 1 | 62 | 00D24A | 5 | 69 | 00D2CC | 201 | 64 | 00D268 | 301 | 71 | 00D2EE |

*STATISTICS*   SOURCE STATEMENTS = 82, PROGRAM SIZE = 54166 BYTES, PROGRAM NAME = MAIN    PAGE:   1.

*STATISTICS*   NO DIAGNOSTICS GENERATED.

MAIN END OF COMPILATION 1 ******

OPTIONS IN EFFECT: NOLIST  MAP NOXREF  GOSTMT NODECK  SOURCE  TERM  OBJECT FIXED  NOTEST NOTRMFLG  SRCFLG
                   NOSYM NORENT NOSDUMP AUTODBL(NONE)  NOSXM  IL
                   OPT(2) LANGLVL(77) NOFIPS  FLAG(E)  NAME(MAIN )  LINECOUNT(60)    CHARLEN(32767)

*....*...1.........2.........3.........4.........5.........6.........7.*........8

```
ISN     1       INCLUDE (PREP)
ISN     2       SUBROUTINE PREP(P,LR,MPP,PN,X,Y,WT,NN,EOF,TABLE,FLIP)
ISN     3       PARAMETER (MAXBYT=1000,WTMIN=.00,DLEFT=1.0,DBOT=1.0,DTOP=1.0,
              &            DRIGHT=0.0,MAXPIX=2400)
        C
        C---- PARAMETERS:  MAXBYT = MAXIMUM LENGTH IN BYTES OF INPUT RECORD
        C                  WTMIN  = MINIMUM WEIGHT OF A SUPER-PIXEL
        C                  DLEFT  = INCHES OF LEFT MARGIN (EDGE TO IGNOR)
        C                  DBOT   =    "      " BOTTOM  "  ( "   "   " )
        C                  DTOP   =    "      "  TOP    "  ( "   "   " )
        C                  DRIGHT =    "      " RIGHT   "  ( "   "   " )
        C                  MAXPIX = MAX. NO. OF SUPER-PIXELS PER FILE
        C
        C     THIS ROUTINE PREPROCESSES IMAGE PROCESSOR OUTPUT
        C     CONSISTING OF PIXELS.  THE PIXELS ARE GROUPED IF DESIRED AND SETS
        C     OF POINTS WITH THEIR WEIGHTS ARE DEVELOPED.  THE INPUT IS ASSUMED
        C     TO BE A SET OF LOGICAL RECORDS ARRIVING ROW-WISE WITH RESPECT TO THE
        C     SCANNED VIEWING SURFACE (V.S.).  EACH CALL TO PREP PRESENTS A
        C     COMPLETE ROW OF PIXELS IN THE RECORD PASSED.  X AND Y-COORDINATES
```

```
C     ARE KEPT IN UNITS OF SUPER-PIXELS UNTIL EOF IS PASSED AS .TRUE.,
C     AT WHICH TIME THEY ARE CONVERTED TO INCHES USING THE VALUES IN PN.
C     END-OF-FILE (EOF) DEFINES THE END OF THE VIEWING SURFACE.
C
C     P(N) = THE CURRENT RECORD OF PIXELS (MAX LENGTH IN BYTES = MAXBYT)
C     LR   = THE NUMBER OF PIXELS IN P, EQUAL TO ONE ROW
C     NPP(2) = SUPER-PIXEL DEF.:  NPP(1) = NO. PIXELS PER S-P HORIZONTALLY
C                                    (2) =  "      "     "   "  VERTICALLY
C     PN(2) = SUPER-PIXEL SIZE:   PN(1) = WIDTH OF SUPER-PIXEL IN INCHES
C                                   (2) = HEIGHT "      "      "    "
C     X(NN) = RETURNED X-VALUES IN INCHES RELATIVE TO LEFT SIDE OF V.S.
C     Y(NN) =    "     Y-VALUES  "    "       "    "  BOTTOM  "   "
C     WT(NN) =   "     CORRESPONDING WEIGHTS, SCALED 0-1
C     NN    =    "     NO. OF SUPER-PIXEL POSITIONS DISCOVERED
C     EOF   = .TRUE. IF THE FILE HAS BEEN COMPLETELY READ
C     TABLE = TRANSLATION TABLE TO FLIP BYTES IF NECESSARY
C     FLIP  = .TRUE. IF FLIPPING IS NECESSARY
C
      CHARACTER*(*) P,TABLE
      CHARACTER*(MAXBYT) EMPTY
      REAL       PN(2),X(*),Y(*),WT(*),W(MAXPIX)
      INTEGER    NPP(2)
      LOGICAL    FIRST/.TRUE./,EOF,ROWEND,ANY,FLIP
C
C-------- CATALOG OF VARIABLES OF INTEREST:
C
C     NPPX = NO. PIXELS PER SUPER-PIXEL HORIZONTALLY
C     NPPY = NO.    "      "     "      VERTICALLY
C     NR   = NO. SUPER-PIXELS PER ROW
C     NPPR = NO. PIXELS IN A FULL SET OF NPPY ROWS
C     JP   = NO. PIXELS THAT HAVE ALREADY BEEN PROCESSED (NOT USED)
C     IP   = SAME AS JP, BUT RELATIVE TO THE BEG. OF CURRENT LOGICAL RECORD
C     MARGL = X-PIXEL NO. AT WHICH TO BEGIN LOCATING SUPER-PIXELS
C     MARGR = X-PIXEL NO. BEYOND " STOP "
C     MARGT = Y-PIXEL NO. AT WHICH TO BEGIN NOTING SUPER-PIXELS
C     MARGB = Y-PIXEL NO. BEYOND WHICH TO IGNORE SUPER-PIXELS
C
      IF (FIRST) THEN
         NPPX = NPP(1)
         NPPY = NPP(2)
         WTHRSH = INT(WTMIN*NPPX*NPPY)
         WRITE (6,'('' A POINT IS IGNORED IF ITS WEIGHT IS LESS THAN'',
     &     F8.2,''%'')') WTMIN*100.
         MARGT = INT(DTOP/PN(2)+.5) * NPPY + 1
         MARGL = INT(DLEFT/PN(1)+.5) * NPPX + 1
         MARGR = LR - INT(DRIGHT/PN(1)+.5)*NPPX
CDEBUG:
C        WRITE (6,'('' MARGL = '',I6)') MARGL
         WRITE (6,'('' A POINT IS IGNORED IF IT LIES OUTSIDE A LEFT''
     &     ,'' MARGIN OF '',F5.2,'' INCHES'')') DLEFT
         WRITE (6,'('' A POINT IS IGNORED IF IT LIES OUTSIDE A RIGHT''
     &     ,'' MARGIN OF '',F5.2,'' INCHES'')') DRIGHT
         WRITE (6,'('' A POINT IS IGNORED IF IT LIES ABOVE A TOP'',
     &     '' MARGIN OF '',F5.2,'' INCHES'')') DTOP
         WRITE (6,'('' A POINT IS IGNORED IF IT LIES BELOW A BOTT'',
     &     ''OM MARGIN OF '',F5.2,'' INCHES'')') DBOT
         NR   = LR/NPPX
         NPPR = LR*NPPY
         NREC = 0
         NBYT = LR/8
         NWD  = (NBYT-1)/4+1
         IF (NWD.GT.MAXBYT/4) THEN
C01
            WRITE (6,'(''----> PREP.1   RECORD LENGTH TOO BIG:'',
     &        I6)') NBYT
            STOP
         ENDIF
         CALL SCLEAR(EMPTY,NWD)
         NN=0
         ROWEND=.FALSE.
         ANY=.FALSE.
         IF (NR.GT.MAXPIX) THEN
C02
            WRITE (6,'(''----> PREP.2   TOO MANY SUPER-PIXELS'',
     &        '' PER RECORD:'',I6)') NR
            STOP
         ENDIF
         CALL SCLEAR(W,NR)
         FIRST=.FALSE.
      ENDIF
      IF (EOF) THEN
         FIRST=.TRUE.
C------------- CONVERT X'S AND Y'S TO INCHES; SCALE WT'S 0-1
         XI=PN(1)
         YI=PN(2)
         YMXP=FLOAT(NREC)/NPPY + .5
C(NOT USED)... MARGB = YMXP - INT(DBOT/PN(2)) * NPPY + .501
         FN=NPPX*NPPY
         DO 10 J=1,NN
            Y(J)=(YMXP-Y(J)) * YI
            IF (Y(J).LT.DBOT) THEN
               NN=J-1
               RETURN
            ENDIF
            X(J)=(X(J)-.5) * XI
            WT(J)=WT(J)/FN
 10      CONTINUE
         RETURN
      ENDIF
C----------------- NOT USED:...   JP=NREC*LR
      NREC=NREC+1
      IF (NREC.LT.MARGT) RETURN
      IF (MOD(NREC,NPPY).EQ.0) ROWEND=.TRUE.
C
C-------- ROWEND IS .TRUE. WHEN WE ARE ABOUT TO CONSIDER THE
C         LAST ROW OF PIXELS IN A SUPER-PIXEL.
      IF (P(:NBYT).EQ.EMPTY(:NBYT)) GO TO 30
C
C-------- WE HAVE SOME BITS ON (SET "ANY" TO .TRUE.)
      ANY=.TRUE.
      IF (FLIP) CALL TRANSL(NBYT,1,P,TABLE)
      IPIX=(MARGL-1)/NPPX
      DO 20 IP=MARGL,MARGR,NPPX
         IPIX=IPIX+1
         WNOW=NBITS(NPPX,IP,P)
CDEBUG:
         IF (IPIX.GT.MAXPIX)
     &   WRITE (6,'('' NREC,IPIX,NBITS ='',2I6,F7.0)') NREC,IPIX,WNOW
```

```
ISN    73           20 W(IPIX)=W(IPIX)+WNOW
                  C
                  C-------- FINISHED PROCESSING THIS RECORD
ISN    74           30 IF (.NOT.ROWEND) RETURN
                  C
                  C-------- WE HAVE FINISHED THIS ROW; COLLECT ACCUMULATED S-P'S
ISN    76              ROWEND=.FALSE.
ISN    77              IF (.NOT.ANY) RETURN
ISN    78              IPIX=(MARGL-1)/NPPX
ISN    80              DO 35 IP=MARGL,MARGR,NPPX
ISN    81              IPIX=IPIX+1
                  CDEBUG:
                  C       IF (IPIX.GT.MAXPIX)
                  C      &WRITE (6,'('' NREC,IPIX ='',2I6)') NREC,IPIX
ISN    82              IF (W(IPIX).GT.WTHRSH) THEN
                  C
                  C---------- WE HAVE A NEW SUPER-PIXEL TO DOCUMENT
                  C
ISN    83                NN=NN+1
                  CDEBUG:
                  C         WRITE (6,'('' NREC,IPIX,NN,W,WTHRSH ='',3I6,F10.3,Z10)')
                  C      &         NREC,IPIX,NN,W(IPIX),WTHRSH
ISN    84                X(NN)=IPIX
ISN    85                Y(NN)=NREC/NPPY
                  C         Y(NN)=(JP+IP-1)/NPPR+1   ... THIS IS FINE BUT UNNECESSARY
                  CDEBUG:
                  C         WRITE (6,'('' NN,X,Y ='',I6,2F8.2)') NN,X(NN),Y(NN)
ISN    86                WT(NN)=W(IPIX)
ISN    87              ENDIF
ISN    88           35 CONTINUE
ISN    89              ANY=.FALSE.
ISN    90              IF (NR.GT.MAXPIX) THEN
                  C83
ISN    91              WRITE (6,'(''!----> PREP.3  TOO MANY SUPER-PIXELS'',
                  &         '' PER RECORD:'',I6)') NR
ISN    92              STOP
ISN    93              ENDIF
ISN    94              CALL SCLEAR(W,NR)
ISN    95              RETURN
ISN    96              END

LEVEL 1.4.1 (MAY 1985)        VS FORTRAN
STORAGE MAP

TAG: SET(S) ENTRY(N)  ASSIGNED(G)    IN COMMON(C)     EQUIVALENCED(E)    INITIAL VALUE(V)   INTRINSIC FCT(I)
     REFERENCED(F)    SUBPROGRAM(X)  NAMED CONSTANT(K) STATEMENT FUNCTION(T) USED AS ARGUMENT(A) SUBPROGRAM NAME(R

PROGRAM NAME: PREP.    SIZE OF PROGRAM:    3D9E HEX BYTES.
```

| NAME | MODE | TAG | ADDR. | NAME | MODE | TAG | ADDR. | NAME | MODE | TAG | ADDR. | NAME | MODE | TAG | ADDR. |
|---|---|---|---|---|---|---|---|---|---|---|---|---|---|---|---|
| ANY | L*4 | SF | 0003A8 | DBOT | R*4 | FK | 000364 | DLEFT | R*4 | FK | 000364 | DRIGHT | R*4 | FK | 000358 |
| DTOP | R*4 | FK | 000364 | EMPTY | CHAR | FA | 00051C | EOF | L*4 | F | 0035BC | FIRST | L*4 | SFV | 0003C8 |
| FLIP | L*4 | F | 0035C8 | FLOAT | R*4 | I | | FN | R*4 | SF | 0038BC | INT | | I | |
| IP | I*4 | SFA | 000390 | IPIX | I*4 | SFA | 0003A8 | J | I*4 | SF | 000388 | LR | I*4 | F | 0035A4 |
| MARGL | I*4 | SF | 0003CC | MARGR | I*4 | SF | 0003D0 | MARGT | I*4 | SF | 0003D4 | MAXBYT | I*4 | FK | 00035C |
| MAXPIX | I*4 | FK | 000360 | MOD | | I | | NBITS | I*4 | FX | 0035CC | NBYT | I*4 | SFA | 0003AC |
| NN | I*4 | SF | 0035A8 | NPP | I*4 | F | 0035C8 | NPPR | I*4 | SF | 0003B8 | NPPX | I*4 | SFA | 0003B4 |
| NPPY | I*4 | SF | 0003B8 | NR | I*4 | SFA | 000394 | NREC | I*4 | SFA | 0003BC | NWD | I*4 | SFA | 0003A4 |
| P | CHAR | FA | 00035C | PN | R*4 | F | 0035AC | PREP | | R | 000000 | ROWEND | L*4 | SF | 0003E0 |
| SCLEAR | | FX | 0035DC | TABLE | CHAR | FA | 0035D0 | TRANSL | | FX | 0035E0 | VFEE0 | | FX | 0035D8 |
| VFELC0 | | FX | 0035E4 | VFIXF0 | | FX | 0035E8 | VFWSF0 | | FX | 0035EC | W | R*4 | SFA | 001000 |
| WNOW | R*4 | SFA | 0003C0 | WT | R*4 | SF | 0035B4 | WTHRSH | R*4 | SF | 0003E4 | WTMIN | R*4 | FK | 000358 |
| X | R*4 | SF | 000394 | XI | R*4 | SF | 000398 | Y | R*4 | SF | 00359C | YI | R*4 | SF | 00039C |
| YMXP | R*4 | SF | 0003C4 | | | | | | | | | | | | |

LABEL INFORMATION.

| LABEL | DEFINED | ADDR. | LABEL | DEFINED | ADDR. | LABEL | DEFINED | ADDR. | LABEL | DEFINED | ADDR. |
|---|---|---|---|---|---|---|---|---|---|---|---|
| 10 | 55 | 003988 | 20 | 73 | 003ACC | 30 | 74 | 003AF0 | 35 | 88 | 003C1 |

```
*STATISTICS*  SOURCE STATEMENTS = 90, PROGRAM SIZE = 15774 BYTES, PROGRAM NAME = PREP

*STATISTICS*  NO DIAGNOSTICS GENERATED.

PREP END OF COMPILATION 2 ******

OPTIONS IN EFFECT: NOLIST  MAP NOXREF  GOSTMT NODECK  SOURCE  TERM  OBJECT FIXED NOTEST NOTRMFLG  SRCFLG
                   NOSYM NORENT NOSDUMP AUTODBL(NONE)  NOSXM   IL
                   OPT(2) LANGLVL(77) NOFIPS  FLAG(E)  NAME(MAIN )  LINECOUNT(60)     CHARLEN(32767)

M....M...1.........2.........3.........4.........5.........6.........7.M........8
ISN    1           INCLUDE (NBITS)
ISN    2           FUNCTION NBITS(NB,IA,A)
                 C
                 C THIS FUNCTION RETURNS THE NUMBER OF ON-BITS IN A SPECIFIED STRING.
                 C NOTE THAT IT USES SUBROUTINE MOVBTS, ATTACHED HEREWITH.
                 C
                 C NB = NO. OF BITS TO INTERROGATE (MAX=31)
                 C IA = POSITION OF FIRST BIT IN ARRAY A
                 C A(N) = ARRAY CONTAINING BITS
                 C
ISN    3           INTEGER A(N),IVEC(16)/0,1,1,2,1,2,2,3,1,2,2,3,2,3,3,4/
ISN    4           NBITS=0
ISN    5           IF (NB.LT.1 .OR. NB.GT.31) RETURN
ISN    7           N=0
ISN    8           CALL MOVBTS(NB,IA,A,33-NB,N)
ISN    9           IF (N.EQ.0) RETURN
ISN    11       10 IP=MOD(N,16)+1
ISN    12          NBITS=NBITS+IVEC(IP)
ISN    13          N=N/16
ISN    14          IF (N.GT.0) GO TO 10
ISN    15          RETURN
ISN    16          END
```

STORAGE MAP

TAG: SET(S) ENTRY(N) ASSIGNED(G) IN COMMON(C) EQUIVALENCED(E) INITIAL VALUE(V) INTRINSIC FCT(I)
REFERENCED(F) SUBPROGRAM(X) NAMED CONSTANT(K) STATEMENT FUNCTION(T) USED AS ARGUMENT(A) SUBPROGRAM NAME(

PROGRAM NAME: NBITS.     SIZE OF PROGRAM:    282 HEX BYTES.

| NAME | MODE | TAG | ADDR. | NAME | MODE | TAG | ADDR. | NAME | MODE | TAG | ADDR. | NAME | MODE | TAG | ADDR. |
|------|------|-----|-------|------|------|-----|-------|------|------|-----|-------|------|------|-----|-------|
| A | I*4 | FA | 000170 | IA | I*4 | FA | 000178 | IP | I*4 | SF | 000114 | IVEC | I*4 | FV | 000130 |
| MOD | | I | | MOVBTS | | FX | 000188 | N | I*4 | SFA | 000110 | NB | I*4 | FA | 00017C |
| NBITS | I*4 | SFR | 000118 | | | | | | | | | | | | |

LABEL INFORMATION.

| LABEL | DEFINED | ADDR. | LABEL | DEFINED | ADDR. | LABEL | DEFINED | ADDR. | LABEL | DEFINED | ADD |
|-------|---------|-------|-------|---------|-------|-------|---------|-------|-------|---------|-----|
| 10 | 11 | 0001EE | | | | | | | | | |

*STATISTICS*   SOURCE STATEMENTS = 14, PROGRAM SIZE = 642 BYTES, PROGRAM NAME = NBITS    PAGE:  10.

*STATISTICS*   NO DIAGNOSTICS GENERATED.

*NBITS* END OF COMPILATION 3 ******

OPTIONS IN EFFECT: NOLIST  MAP NOXREF  GOSTMT NODECK  SOURCE  TERM  OBJECT FIXED  NOTEST NOTRMFLG  SRCFLG
                   NOSYM NORENT NOSDUMP AUTODBL(NONE)  NOSXM  IL
                   OPT(2) LANGLVL(77) NOFIPS  FLAG(E) NAME(MAIN )  LINECOUNT(60)    CHARLEN(32767)

```
       *....*...1.........2.........3.........4.........5.........6.........7.*.......8
ISN    1        SUBROUTINE MOVBTS(NBIT,IBIT,A,JBIT,B)
                C
                C THIS ROUTINE IS THE MOVSTR OF BIT STRINGS.  IN KEEPING WITH THE
                C NUMBERING OF BYTES IN MOVSTR, BITS ARE NUMBERED LEFT TO RIGHT
                C BEGINNING WITH BIT 1, WHERE BIT 1 IS THE LEFT-MOST BIT OF THE
                C ADDRESS OF ARRAY "A".
                C
                C THIS VERSION USES NO VS FORTRAN; F4STAT MOVCHR/STR & BOOL ARE USED.
                C
                C NBIT = NUMBER OF BITS TO BE MOVED
                C IBIT = LEFT-MOST BIT OF BIT STRING TO BE MOVED
                C A() = ARRAY CONTAINING STRING TO BE MOVED
                C JBIT = LEFT-MOST BIT OF DESTINATION POSITION
                C B() = DESTINATION ARRAY
                C
ISN    2        LOGICAL*1 A(N),B(N)
ISN    3        INTEGER MMASK/Z0000FF00/,AND,OR,COMP
                C
                C------- SOME DEFINITIONS:
                C       LOC1A = BYTE # IN "A" CONTAINING FIRST BIT OF STRING
                C       LOC1B = BYTE # IN "B" CONTAINING FIRST BIT OF DESTINATION
                C       LOCZB = BYTE # IN "B" CONTAINING LAST BIT OF DESTINATION
                C
ISN    4        LOC1A=(IBIT-1)/8+1
ISN    5        LOC1B=(JBIT-1)/8+1
ISN    6        LOCZB=(JBIT+NBIT-2)/8+1
ISN    7        NSHIFT=MOD(IBIT-1,8)-MOD(JBIT-1,8)
ISN    8        FSHIFT=2.**NSHIFT
ISN    9        MLEAD=MMASK*2**(8-MOD(JBIT-1,8))
ISN   10        MTRAIL=MMASK/2**(MOD(JBIT+NBIT-2,8)+1)
                C
                C------- MOVE LOOP
                C
ISN   11        IBYTE=LOC1A
ISN   12        DO 25 JBYTE=LOC1B,LOCZB
ISN   13        IWK=0
ISN   14        CALL MOVSTR(3,IBYTE-1,A,2,IWK)
ISN   15        IWK=IWK*FSHIFT
ISN   16        CALL MOVCHR(JBYTE,B,3,JWK)
ISN   17        MASK=0
ISN   18        IF (JBYTE.EQ.LOC1B) MASK=MLEAD
ISN   20        IF (JBYTE.EQ.LOCZB) MASK=OR(MASK,MTRAIL)
ISN   22        IF (MASK.EQ.0) THEN
ISN   23            CALL MOVCHR(3,IWK,JBYTE,B)
ISN   24        ELSE
                C------- STRIP OUT THE UNWANTED BITS
ISN   25            IWK=AND(IWK,COMP(MASK))
ISN   26            JWK=AND(JWK,MASK)
                C------- DEVELOP RESULT BYTE AND MOVE IT INTO B
ISN   27            JWK=OR(IWK,JWK)
ISN   28            CALL MOVCHR(3,JWK,JBYTE,B)
ISN   29        ENDIF
ISN   30     25 IBYTE=IBYTE+1
ISN   31        RETURN
ISN   32        END
```

STORAGE MAP

TAG: SET(S) ENTRY(N) ASSIGNED(G) IN COMMON(C) EQUIVALENCED(E) INITIAL VALUE(V) INTRINSIC FCT(I
REFERENCED(F) SUBPROGRAM(X) NAMED CONSTANT(K) STATEMENT FUNCTION(T) USED AS ARGUMENT(A) SUBPROGRAM NAME

PROGRAM NAME: MOVBTS.    SIZE OF PROGRAM:    4BC HEX BYTES.

| NAME | MODE | TAG | ADDR. | NAME | MODE | TAG | ADDR. | NAME | MODE | TAG | ADDR. | NAME | MODE | TAG | ADDR. |
|------|------|-----|-------|------|------|-----|-------|------|------|-----|-------|------|------|-----|-------|
| A | L*1 | FA | 0001EC | AND | I*4 | FX | 000200 | B | L*1 | FA | 0001F4 | COMP | I*4 | FX | 00020 |
| FIXPI0 | R*4 | FX | 000214 | FRXPI0 | R*4 | FX | 000218 | FSHIFT | R*4 | SF | 000160 | IBIT | I*4 | F | 00020 |
| IBYTE | I*4 | SF | 000140 | IWK | I*4 | SFA | 000134 | JBIT | I*4 | F | 00020C | JBYTE | I*4 | SFA | 00014 |
| JWK | I*4 | SFA | 000138 | LOCZB | I*4 | SF | 000148 | LOC1A | I*4 | SF | 00014C | LOC1B | I*4 | SF | 00015 |
| MASK | I*4 | SFA | 00013C | MLEAD | I*4 | SF | 000154 | MMASK | I*4 | FV | 000158 | MOD | | I | |
| MOVBTS | | R | 000000 | MOVCHR | | FX | 00021C | MOVSTR | | FX | 000220 | MTRAIL | I*4 | SFA | 00016 |
| NBIT | I*4 | F | 000210 | NSHIFT | I*4 | SF | 000168 | OR | I*4 | FX | 0001FC | | | | |

LABEL INFORMATION.

| LABEL | DEFINED | ADDR. | LABEL | DEFINED | ADDR. | LABEL | DEFINED | ADDR. | LABEL | DEFINED | AD |
|---|---|---|---|---|---|---|---|---|---|---|---|
| 25 | 30 | 000424 | | | | | | | | | |

*STATISTICS* SOURCE STATEMENTS = 30, PROGRAM SIZE = 1212 BYTES, PROGRAM NAME = MOVBTS   PAGE: 12.

*STATISTICS* NO DIAGNOSTICS GENERATED.

*MOVBTS* END OF COMPILATION 4 ******

OPTIONS IN EFFECT: NOLIST  MAP NOXREF  GOSTMT NODECK  SOURCE  TERM  OBJECT FIXED  NOTEST NOTRMFLG  SRCFLG
NOSYM NORENT NOSDUMP AUTODBL(NONE)  NOSXM  IL
OPT(2) LANGLVL(77) NOFIPS  FLAG(E) NAME(MAIN ) LINECOUNT(60)  CHARLEN(32767)

```
*....*...1.........2.........3.........4.........5.........6.........7.*.......8

ISN   1        INCLUDE (FIGPLOT)                                         00000020
ISN   2        SUBROUTINE F4PLOT(X,Y,WT,NPO,HD,/ISTAT/,/XMIN/,/XMAX/,    00000030
      &                         /YMIN/,/YMAX/)                           00000040
      C ROUTINE TO GENERATE ONE-PAGE PLOT OF X VS. Y
      C BASED ON PROGRAM WRITTEN BY FORREST W. YOUNG NOV., 1965
      C
      C  XMAX,XMIN,YMAX,YMIN ARE THE UPPER AND LOWER BOUNDS FOR EACH     00000050
      C                     AXIS, IF KNOWN.  IF MAX=MIN, ROUTINE         00000060
      C                     GENERATES ITS OWN BOUNDS.                    00000070
      C  NPO IS THE NO. OF POINTS TO BE PLOTTED.  IF NPO IS NEGATIVE,    00000080
      C                     INDIVIDUAL POINTS ARE IDENTIFIED (MAX=35)    00000090
      C  ISTAT = 1 IF MEANS, S.D.'S, AND CORREL. ARE DESIRED             00000100
      C        = 2 IF EACH POINT IS TO BE PROPOGATED DOWN TO THE X-AXIS  00000110
      C           (NOTE:  ISTAT OPTIONS MAY BE COMBINED BY SETTING ISTAT TO 00000120
      C                   THE SUM OF THE ISTAT FLAG VALUES FOR THE OPTIONS DESIRED) 00000130
      C                                                                  00000140
ISN   3        DIMENSION X(1),Y(1),HD(1),WT(1)                           00000150
ISN   4        LOGICAL SPIKE                                             00000160
ISN   5        LOGICAL FIRSTC                                            00000170
ISN   6        INTEGER AND                                               00000180
ISN   7        COMMON/FSTAT/KIN,KOUT,UNUSED(5),FB,FE,UNXXX(17),HCHAR     00000190
ISN   8        COMMON /PGTOP/UNU(61),IPGCH                               00000200
ISN   9        REAL*8 SX,SY,SX2,SY2,SXY,F,G,AVX,AVY,FN,XJ,YJ,DX,DY,SMALL(21) 00000210
ISN  10        REAL*8 XMIN,XMAX,YMIN,YMAX,XMN,XMX,YMN,YMX
ISN  11        INTEGER*2 A,B,P(50,101),HOLQ(35),HOLL(11),DD,PLUS,VERT,HOR,HCHAR 00000220
ISN  12        DATA HOLQ/'0 ','1 ','2 ','3 ','4 ','5 ','6 ','7 ','8 ','9 ','A ', 00000230
     +'C ','D ','E ','F ','G ','H ','I ','J ','K ','L ','M ','N ','O ', 00000240
     +'P ','Q ','R ','S ','T ','U ','V ','W ','X ','Y ','Z '/           00000250
ISN  13        DATA HOLL/' ',' ','2 ','3 ','4 ','5 ','6 ','7 ','8 ','9 ','M '/ 00000260
ISN  14        DATA DD,PLUS,VERT,HOR/'. ','+ ','I ','- '/                00000270
ISN  15        REAL COLMES(12)                                           00000280
ISN  16        DATA COLMES/'THE ','FOLL','OWIN','G PL','OT C','ONTA','INS ', 00000290
     +'THES','E CO','LLIS','IONS','! '/                                  00000300
ISN  17   310 FORMAT (14X,'X.X',20('XXX.X'))                             00000310
ISN  18   300 FORMAT (1X,F11.2,1X,105A1,F11.2)                           00000320
ISN  19        IF (NPO.EQ.0) RETURN                                      00000330
ISN  21        FIRSTC=.TRUE.                                             00000340
ISN  22        SPIKE=.FALSE.                                             00000350
ISN  23        ISAVPG=IPGCH                                              00000360
ISN  24        CALL MOVCHR(1,HCHAR,46,COLMES)                            00000370
ISN  25        HOLL(2)=HCHAR                                             00000380
ISN  26        NPLOT=0                                                   00000390
ISN  27        NL=50                                                     00000400
ISN  28        NC=101                                                    00000410
ISN  29        FNL=NL-1                                                  00000420
ISN  30        FNC=NC-1                                                  00000430
ISN  31        IDSW=0                                                    00000440
      CXX      IF (NPO .LT.0.AND.NPO .GT.(-36)) IDSW=1                   00000450
ISN  32        IF (NPO .LT.0) IDSW=1                                     00000450
ISN  33        NPOI=IABS(NPO)                                            00000460
ISN  34        IF(NUMARG(NARG).LE.5) GO TO 5                             00000470
ISN  35        IF (AND(ISTAT,2).EQ.2) SPIKE=.TRUE.                       00000480
ISN  36        IF (AND(ISTAT,1).NE.1) GO TO 5                            00000490
ISN  38        FN=0.D0                                                   00000500
ISN  39        SX=0.                                                     00000510
ISN  40        SY=0.                                                     00000520
ISN  41        SX2=0.                                                    00000530
ISN  42        SY2=0.                                                    00000540
ISN  43        SXY=0.                                                    00000550
ISN  44        DO 3 J=1,NPOI                                             00000560
ISN  45        XJ=X(J)                                                   00000570
ISN  46        YJ=Y(J)                                                   00000580
ISN  47        IF (SNGL(XJ).EQ.FB .OR. SNGL(XJ).EQ.FE                    00000590
ISN  48       &   .OR. SNGL(YJ).EQ.FB .OR. SNGL(YJ).EQ.FE) GO TO 3       00000600
ISN  49        FN=FN+1.D0                                                00000610
ISN  50        SX=SX+XJ                                                  00000620
ISN  51        SY=SY+YJ                                                  00000630
ISN  52        SX2=SX2+XJ*XJ                                             00000640
ISN  53        SY2=SY2+YJ*YJ                                             00000650
ISN  54        SXY=SXY+XJ*YJ                                             00000660
ISN  55     3 CONTINUE                                                   00000670
ISN  56        IF (FN.EQ.0.D0) GO TO 99                                  00000680
ISN  57        NPUSED=FN                                                 00000690
ISN  58        F=SX2-SX*SX/FN                                            00000700
ISN  59        G=SY2-SY*SY/FN                                            00000710
ISN  60        AVX=SX/FN                                                 00000720
ISN  61        AVY=SY/FN                                                 00000730
ISN  62        SDX=0.D0                                                  00000740
ISN  63        SDY=0.D0                                                  00000750
ISN  64        IF (FN.NE.1.D0) SDX=DSQRT(F/(FN-1.D0))                    00000760
ISN  66        IF (FN.NE.1.D0) SDY=DSQRT(G/(FN-1.D0))                    00000770
ISN  68        R=0.                                                      00000780
ISN  69        IF(F.GT.0.D0.AND.G.GT.0.D0)                               00000790
              *  R=(SXY-SX*SY/FN)/DSQRT(F*G)                             00000800
ISN  71     5 XMX=0.                                                     00000820
ISN  72        XMN=0.                                                    00000830
ISN  73        IF(NARG.LT.8) GO TO 6                                     00000840
      C        XMX=CHKMOD(XMAX)
      C        XMN=CHKMOD(XMIN)                                          00000850
ISN  74        XMX=XMAX                                                  00000850
ISN  75        XMN=XMIN                                                  00000860
ISN  76     6 YMX=0.                                                     00000870
ISN  77        YMN=0.                                                    00000880
ISN  78        IF(NARG.LT.10) GO TO 7                                    00000890
      C        YMX=CHKMOD(YMAX)
      C        YMN=CHKMOD(YMIN)                                          00000900
ISN  79        YMX=YMAX                                                  00000900
ISN  80        YMN=YMIN                                                  00000910
ISN  81     7 DO 15 I=1,NL
ISN  82        DO 15 J=1,NC                                              00000920
```

```
ISN   83         13 P(I,J)=HOLL(1)
ISN   84            IF (XMX.NE.XMN) GO TO 22
ISN   85            XMX=-10E7
ISN   86            XMN=10E7
ISN   87            DO 21 I=1,NPOI
ISN   88            XI=X(I)
ISN   89            IF (XI.EQ.FB .OR. XI.EQ.FE
                   &    .OR. Y(I).EQ.FB .OR. Y(I).EQ.FE) GO TO 21
ISN   90            IF (XI.GT.XMX) XMX=XI
ISN   92            IF (XI.LT.XMN) XMN=XI
ISN   94         21 CONTINUE
ISN   95            IF (XMX.NE.XMN) GO TO 215
ISN   96            XMX=XMX+.5
ISN   97            XMN=XMN-.5
ISN   98        215 XMX=XMX+4.*(XMX-XMN)/FNC
ISN   99            XMN=XMN-4.*(XMX-XMN)/FNC
ISN  100         22 IF (YMX.NE.YMN) GO TO 24
ISN  101            YMX=-1E7
ISN  102            YMN=1E7
ISN  103            DO 23 I=1,NPOI
ISN  104            YI=Y(I)
ISN  105            IF (X(I).EQ.FB .OR. X(I).EQ.FE
                   &    .OR. YI.EQ.FB .OR. YI.EQ.FE) GO TO 23
ISN  106            IF (YI.GT.YMX) YMX=YI
ISN  108            IF (YI.LT.YMN) YMN=YI
ISN  110         23 CONTINUE
ISN  111            IF (YMX.NE.YMN) GO TO 235
ISN  112            YMX=YMX+.5
ISN  113            YMN=YMN-.5
ISN  114        235 YMX=YMX+2.*(YMX-YMN)/FNL
ISN  115            YMN=YMN-2.*(YMX-YMN)/FNL
ISN  116         24 CONTINUE
ISN  117            XJ=XMX
ISN  118            YJ=YMX
ISN  119            DX=(XJ-XMN)/FNC
ISN  120            DY=(YJ-YMN)/FNL
ISN  121            JZ=NL
ISN  122            IF (YMX.LT.0.) JZ=1
ISN  124            IF (YMX*YMN.GT.0.) GO TO 28
ISN  125            JZ=1.5+YMX/DY
ISN  126            DO 27 K=1,NC
ISN  127         27 P(JZ,K)=HOR
ISN  128         28 CONTINUE
ISN  129            IF (XMX*XMN.GT.0.) GO TO 26
ISN  130            KZ=1.5-XMN/DX
ISN  131            DO 25 J=1,NL
ISN  132         25 P(J,KZ)=VERT
ISN  133         26 CONTINUE
ISN  134            V=YMX+DY
ISN  135            SMALL(1)=XMN
ISN  136            DO 50 I=1,20
ISN  137         50 SMALL(I+1)=SMALL(I)+5.*DX
      C
      C-------- POSITION THE POINTS FOR PLOTTING
      C
ISN  138            DO 35 II=1,NPOI
ISN  139            IIW=10.*WT(II)+1.5
ISN  140            IF (X(II).EQ.FB .OR. X(II).EQ.FE
                   &    .OR. Y(II).EQ.FB .OR. Y(II).EQ.FE) GO TO 35
ISN  141            I=(YMX-Y(II))/DY+1.5
ISN  142            J=(X(II)-XMN)/DX+1.5
ISN  143            IF(I.GT.NL.OR.I.LT.1.OR.J.GT.NC.OR.J.LT.1) GO TO 35
ISN  144            NPLOT=NPLOT+1
ISN  145            IF (IDSW.NE.1) GO TO 33
ISN  146            IF (P(I,J).EQ.HOLL(1) .OR. P(I,J).EQ.HOR .OR. P(I,J).EQ.VERT)
                   &    GO TO 32
      C-------- A COLLISION HAS BEEN DETECTED.
ISN  147            IF (FIRSTC) CALL NEWPG(COLMES)
ISN  149            FIRSTC=.FALSE.
ISN  150            WRITE (KOUT,351) HOLQ(IIW),P(I,J)
ISN  151        351 FORMAT ('0',5X,A2,'HAS COVERED ',A1)
ISN  152         32 CONTINUE
ISN  153            P(I,J)=HOLQ(IIW)
      CDEBUG
      C            WRITE (6,'('' I,J,IIW,X,Y ='',3I5,2F10.4,5X,2I5)') I,J,IIW-1,
      C           &              X(II),Y(II)
ISN  154            GO TO 35
ISN  155         33 DO 34 JJ=1,10
ISN  156            IF (P(I,J).EQ.HOLL(JJ)) GO TO 36
ISN  157         34 CONTINUE
ISN  158            IF(P(I,J).EQ.VERT.OR.P(I,J).EQ.HOR.OR.P(I,J).EQ.DD) P(I,J)=HOLL(2)
ISN  160            GO TO 361
      C            IF (SPIKE) CALL MOVSTR((JZ-I)*2,1,P(I,J),2,P(I,J))
      C            GO TO 35
ISN  161         36 P(I,J)=HOLL(JJ+1)
ISN  162        361 IF (.NOT.SPIKE) GO TO 35
ISN  163            JZMI=(JZ-I)*2
ISN  164            IF (JZMI.GT.0) CALL FILCHR(JZMI,2,P(I,J),P(I,J))
ISN  166            IF (JZMI.LT.0) CALL FILCHR(-JZMI,1,P(JZ,J),P(I,J))
      C            IF (SPIKE) CALL MOVSTR((JZ-I)*2,1,P(I,J),2,P(I,J))
ISN  168         35 CONTINUE
      C
      C-------- POINT LOOP COMPLETED; PRINT THE PLOT
      C
ISN  169            NOFF=NPUSED-NPLOT
ISN  170            IPGCH=0
ISN  171            CALL NEWPG(HD)
ISN  172            IF (NARG.LE.5) GO TO 37
ISN  173            IF (AND(ISTAT,1).NE.1) GO TO 37
ISN  174            WRITE (KOUT,100) AVX,SDX,AVY,SDY,R,NPUSED,NOFF
ISN  175        100 FORMAT(1X,'FOR X: MEAN =',F10.3,'    SD =' ,F8.3,6X,'FOR Y: MEAN
                   1=',F10.3,'    SD =',F8.3,5X,'R =',F8.4,3X,'N =',I6,'  OUT OF RANGE
                   & =',I4)
ISN  176            WRITE (KOUT,101)
ISN  177        101 FORMAT (1X)
ISN  178         37 CONTINUE
ISN  179            WRITE (KOUT,310)
ISN  180            DO 30 I=1,NL
ISN  181            V=V-DY
ISN  182            A=HOLL(1)
ISN  183            B=PLUS
ISN  184            L=I+2
ISN  185            IF (L/5*5-L) 30,10,30
ISN  186         10 B=DD
ISN  187            IF (L/2*2-L) 30,20,30
ISN  188         20 A=DD
ISN  189         30 WRITE (KOUT,300) V,A,B,(P(I,J),J=1,NC),B,A,V
ISN  190            WRITE (KOUT,310)
      C            WRITE (KOUT,301) (SMALL(I),I=2,20,2)
      C 301 FORMAT (15X,10F10.4)
```

LEVEL 1.4.1 (MAY 1985)        VS FORTRAN

```
       N....N...1.........2.........3.........4.........5.........6.........7.N.......8
ISN   191          WRITE (KOUT,302) (SMALL(I),I=1,21,2)                    00002030
ISN   192      302 FORMAT (10X,11F10.4)                                    00002040
ISN   193          DO 70 II=1,NPOI                                         00002050
ISN   194          IF (X(II).EQ.FB .OR. X(II).EQ.FE                        00002060
                  &    .OR. Y(II).EQ.FB .OR. Y(II).EQ.FE) GO TO 70         00002070
ISN   195          I=(YMX-Y(II))/DY+1.5                                    00002080
ISN   196          J=(X(II)-XMN)/DX+1.5                                    00002090
ISN   197          IF(I.GT.NL.OR.I.LT.1.OR.J.GT.NC.OR.J.LT.1) GO TO 70     00002100
ISN   198          P(I,J)=HOLL(1)                                          00002110
ISN   199       70 CONTINUE                                                00002120
ISN   200       99 IPGCH=ISAVPG                                            00002130
ISN   201          WRITE (6,'(''0TOTAL NUMBER OF POINTS PLOTTED = '',I5)') NPLOT
ISN   202          RETURN                                                  00002140
ISN   203          END                                                     00002150
```

STORAGE MAP

TAG: SET(S) ENTRY(N)  ASSIGNED(G)     IN COMMON(C)     EQUIVALENCED(E)     INITIAL VALUE(V)    INTRINSIC FCT(
     REFERENCED(F)    SUBPROGRAM(X)   NAMED CONSTANT(K) STATEMENT FUNCTION(T)  USED AS ARGUMENT(A)  SUBPROGRAM NAM;

PROGRAM NAME: F4PLOT.   SIZE OF PROGRAM:    45E0 HEX BYTES.

| NAME | MODE | TAG | ADDR. | NAME | MODE | TAG | ADDR. | NAME | MODE | TAG | ADDR. | NAME | MODE | TAG | ADDR |
|---|---|---|---|---|---|---|---|---|---|---|---|---|---|---|---|
| A | I*2 | SFA | 0003FC | AND | I*4 | FX | 0037A8 | AVX | R*8 | SFA | 000338 | AVY | R*8 | SFA | 0003: |
| B | I*2 | SFA | 0003FE | COLMES | R*4 | FAV | 000580 | DD | I*2 | FV | 000480 | DSQRT | R*8 | FI | 0037C |
| DX | R*8 | SF | 0002F8 | DY | R*8 | SF | 000300 | F | R*8 | SF | 0002E8 | FB | R*4 | FC | 0000: |
| FE | R*4 | FC | 000020 | FILCHR |  | FX | 0037CC | FIRSTC | L*4 | SF | 0003E8 | FN | R*8 | SF | 0003C |
| FNC | R*4 | SF | 000380 | FNL | R*4 | SF | 000384 | F4PLOT |  | R | 000000 | G | R*8 | SF | 0002F |
| HCHAR | I*2 | FCA | 000068 | HD | R*4 | FA | 003798 | HOLL | I*2 | SFV | 000568 | HOL@ | I*2 | FAV | 0005B |
| HOR | I*2 | FV | 000402 | I | I*4 | SF | 000378 | IABS | I*4 | I |  | IDSW | I*4 | SF | 0003C |
| II | I*4 | SF | 000390 | IIW | I*4 | SF | 000388 | IPGCH | I*4 | SFC | 0000F4 | ISAVPG | I*4 | SF | 0003F |
| ISTAT | I*4 | FA | 0037C4 | J | I*4 | SF | 00037C | JJ | I*4 | SF | 000394 | JZ | I*4 | FCA | 00000 |
| JZMI | I*4 | SFA | 0003C8 | K | I*4 | SF | 000380 | KIN | I*4 | C | UNREFD | KOUT | I*4 | FA | 0003C |
| KZ | I*4 | SF | 00039C | L | I*4 | SF | 000384 | MOVCHR |  | FX | 0037D0 | MARG | I*4 | SFA | 0003D |
| NC | I*4 | SF | 0003A0 | NEWPG |  | FX | 0037C8 | NL | I*4 | SF | 0003A4 | NOFF | I*4 | SFA | 0003F |
| NPLOT | I*4 | SFA | 0003D8 | NPO | I*4 | F | 0037AC | NPOI | I*4 | SF | 0003D4 | NPUSED | I*4 | SFA | 00038. |
| NUMARG | I*4 | FX | 0037D4 | P | I*2 | SFA | 001000 | PLUS | I*2 | FV | 000404 | R | R*4 | SFA | 00038. |
| SDX | R*8 | SFA | 0003BC | SDY | R*4 | SFA | 0003C8 | SMALL | R*8 | SFA | 0005F8 | SHGL | R*4 | I |  |
| SPIKE | L*4 | SF | 0003DC | SX | R*8 | SF | 000310 | SXY | R*8 | SF | 000340 | SX2 | R*8 | SF | 00034: |
| SY | R*8 | SF | 000318 | SY2 | R*8 | SF | 000350 | UNU | R*4 | C | UNREFD | UNUSED | R*4 | C | UNREF: |
| UNXXX | R*4 | C | UNREFD | V | R*4 | SFA | 00038C | VERT | I*2 | FV | 000406 | VFIXF8 |  | FX | 0037D2 |
| VFSXF8 |  | FX | 0037DC | VFWSF8 |  | FX | 0037E0 | WT | R*4 | F | 0037A0 | X | R*4 | F | 00378: |
| XI | R*4 | SF | 0003A8 | XJ | R*8 | SF | 000320 | XMAX | R*8 | F | 003780 | XMIN | R*8 | F | 0037B< |
| XMN | R*8 | SF | 000358 | XMX | R*8 | SF | 000360 | Y | R*4 | F | 003790 | YI | R*4 | SF | 0003AC |
| YJ | R*8 | SF | 000328 | YMAX | R*8 | F | 003788 | YMIN | R*8 | F | 0037BC | YMN | R*8 | SF | 000368 |
| YMX | R*8 | SF | 000370 |  |  |  |  |  |  |  |  |  |  |  |  |

COMMON INFORMATION

NAME: FSTAT.  SIZE:    6A HEX BYTES.  (E) - EQUIVALENCED

| NAME | MODE | DISPL. | NAME | MODE | DISPL. | NAME | MODE | DISPL. | NAME | MODE | DISPL. |
|---|---|---|---|---|---|---|---|---|---|---|---|
| KIN | I*4 | 000000 | KOUT | I*4 | 000004 | UNUSED | R*4 | 000008 | FB | R*4 | 00000: |
| FE | R*4 | 000020 | UNXXX | R*4 | 000024 | HCHAR | I*2 | 000068 |  |  |  |

NAME: PGTOP.  SIZE:    F8 HEX BYTES.  (E) - EQUIVALENCED

| NAME | MODE | DISPL. | NAME | MODE | DISPL. | NAME | MODE | DISPL. | NAME | MODE | DISPL. |
|---|---|---|---|---|---|---|---|---|---|---|---|
| UNU | R*4 | 000000 | IPGCH | I*4 | 0000F4 |  |  |  |  |  |  |

LABEL INFORMATION.

| LABEL | DEFINED | ADDR. | LABEL | DEFINED | ADDR. | LABEL | DEFINED | ADDR. | LABEL | DEFINED | ADDR. | LABEL | DEFINED | ADDR |
|---|---|---|---|---|---|---|---|---|---|---|---|---|---|---|
| 3 | 55 | 003A08 | 5 | 71 | 003332 | 6 | 76 | 003862 | 7 | 81 | 003B9 |  |  |  |
| 10 | 186 | 00437E | 15 | 83 | 003DE | 20 | 188 | 004392 | 21 | 94 | 003C9 |  |  |  |
| 22 | 100 | 003CEE | 23 | 110 | 003D84 | 24 | 116 | 003DE2 | 25 | 132 | 003F0 |  |  |  |
| 26 | 133 | 003F0C | 27 | 127 | 003E98 | 28 | 128 | 003EA0 | 30 | 189 | 00439 |  |  |  |
| 32 | 152 | 0040FC | 33 | 155 | 004114 | 34 | 157 | 004158 | 35 | 168 | 00428 |  |  |  |
| 36 | 161 | 004186 | 37 | 178 | 004386 | 50 | 137 | 003F38 | 70 | 199 | 00450 |  |  |  |
| 99 | 200 | 004506 | 100 | 175 | 0000DD | 101 | 177 | 0000D9 | 215 | 98 | 003CB |  |  |  |
| 235 | 114 | 003DB0 | 300 | 18 | 000163 | 302 | 192 | 0000D0 | 310 | 17 | 00017 |  |  |  |
| 351 | 151 | 000148 | 361 | 162 | 0041E2 |  |  |  |  |  |  |  |  |  |

* VS FORTRAN ERROR MESSAGES *

*STATISTICS*   SOURCE STATEMENTS = 188, PROGRAM SIZE = 17888 BYTES, PROGRAM NAME = F4PLOT    PAGE:    15.

*STATISTICS* 68 DIAGNOSTICS GENERATED. HIGHEST SEVERITY CODE IS 4.

F4PLOT END OF COMPILATION 5 ******                                                                      PAGE:

SUMMARY OF MESSAGES AND STATISTICS FOR ALL COMPILATIONS

*STATISTICS*   SOURCE STATEMENTS = 82, PROGRAM SIZE = 54166 BYTES, PROGRAM NAME = MAIN      PAGE:    1.

*STATISTICS*   NO DIAGNOSTICS GENERATED.

MAIN END OF COMPILATION 1 ******

*STATISTICS*   SOURCE STATEMENTS = 98, PROGRAM SIZE = 15774 BYTES, PROGRAM NAME = PREP     PAGE:    5.

*STATISTICS*   NO DIAGNOSTICS GENERATED.

PREP END OF COMPILATION 2 ******

*STATISTICS*   SOURCE STATEMENTS = 14, PROGRAM SIZE = 642 BYTES, PROGRAM NAME = NBITS     PAGE:    10.

*STATISTICS*   NO DIAGNOSTICS GENERATED.

NBITS END OF COMPILATION 3 ******

*STATISTICS*   SOURCE STATEMENTS = 30, PROGRAM SIZE = 1212 BYTES, PROGRAM NAME = MOVBTS   PAGE:    12.

*STATISTICS*   NO DIAGNOSTICS GENERATED.

MOVBTS END OF COMPILATION 4 ******
* VS FORTRAN ERROR MESSAGES *
*STATISTICS*   SOURCE STATEMENTS = 188, PROGRAM SIZE = 17888 BYTES, PROGRAM NAME = F4PLOT     PAGE:   15.
*STATISTICS* 68 DIAGNOSTICS GENERATED. HIGHEST SEVERITY CODE IS 4.
F4PLOT END OF COMPILATION 5 ******
**** SUMMARY STATISTICS ***** 68 DIAGNOSTICS GENERATED. HIGHEST SEVERITY CODE IS 4.
VS FORTRAN COMPILER ENTERED.  15:53:10
*STATISTICS*   SOURCE STATEMENTS = 82, PROGRAM SIZE = 54166 BYTES, PROGRAM NAME = MAIN       PAGE:    1.
*STATISTICS*   NO DIAGNOSTICS GENERATED.
MAIN END OF COMPILATION 1 ******
*STATISTICS*   SOURCE STATEMENTS = 90, PROGRAM SIZE = 15774 BYTES, PROGRAM NAME = PREP       PAGE:    5.
*STATISTICS*   NO DIAGNOSTICS GENERATED.
PREP END OF COMPILATION 2 ******
*STATISTICS*   SOURCE STATEMENTS = 14, PROGRAM SIZE = 642 BYTES, PROGRAM NAME = NBITS        PAGE:   10.
*STATISTICS*   NO DIAGNOSTICS GENERATED.
NBITS END OF COMPILATION 3 ******
*STATISTICS*   SOURCE STATEMENTS = 30, PROGRAM SIZE = 1212 BYTES, PROGRAM NAME = MOVBTS      PAGE:   12.
*STATISTICS*   NO DIAGNOSTICS GENERATED.
MOVBTS END OF COMPILATION 4 ******
* VS FORTRAN ERROR MESSAGES *
*STATISTICS*   SOURCE STATEMENTS = 188, PROGRAM SIZE = 17888 BYTES, PROGRAM NAME = F4PLOT    PAGE:   15.
*STATISTICS* 68 DIAGNOSTICS GENERATED. HIGHEST SEVERITY CODE IS 4.
F4PLOT END OF COMPILATION 5 ******
VS FORTRAN COMPILER EXITED.  15:53:12
MVS/XA DFP VER 2 LINKAGE EDITOR                15:53:16  FRI  APR 07, 1989
JOB JJF6600P   STEP LKED
INVOCATION PARAMETERS - MAP,LIST,AMODE=31,RMODE=ANY
ACTUAL SIZE=(317440,86016)
OUTPUT DATA SET SYS89097.T155307.RA000.JJF6600P.GOSET IS ON VOLUME ETS012

MODULE MAP

| CONTROL SECTION | | | ENTRY | | | | | | | |
|---|---|---|---|---|---|---|---|---|---|---|
| NAME | ORIGIN | LENGTH | NAME | LOCATION | NAME | LOCATION | NAME | LOCATION | NAME | LOCATION |
| MAIN | 00 | D398 | | | | | | | | |
| PREP | D398 | 3D9E | | | | | | | | |
| NBITS | 11138 | 282 | | | | | | | | |
| MOVBTS | 113C0 | 4BC | | | | | | | | |
| F4PLOT | 11880 | 45E0 | | | | | | | | |
| IFYCNCAT* | 15E60 | 1A8 | CNCAT@ | 15E60 | | | | | | |
| IFYVINTE* | 16008 | 205 | VFEIM@ | 16016 | VFEIN@ | 1604A | VFEE@ | 16090 | VFES@ | 160D6 |
| | | | VFEP@ | 1610E | VFELC@ | 1614A | | | | |
| IFYVIOFM* | 16210 | 360 | VFRSF@ | 1621E | VFWSF@ | 16244 | VFCSF@ | 1626A | VFDSF@ | 16290 |
| | | | VFESF@ | 162B6 | VFRDF@ | 162DC | VFWDF@ | 16302 | VFRIF@ | 16328 |
| | | | VFWIF@ | 1634E | VFRKF@ | 16374 | VFWKF@ | 1639A | VFQKF@ | 163C0 |
| | | | VFUVF@ | 163E6 | VFIXF@ | 1640C | VFSXF@ | 16432 | VFFXF@ | 16458 |
| IFYVIOI* | 16570 | D | IFYVIOI1 | 16570 | | | | | | |
| IFYVIOUF* | 16580 | 2A8 | VFRSU@ | 1658E | VFWSU@ | 165B4 | VFRDU@ | 165DA | VFWDU@ | 16600 |
| | | | VFFDU@ | 16626 | VFRKU@ | 1664C | VFWKU@ | 16672 | VFQKU@ | 16698 |
| | | | VFUVU@ | 166BE | VFIXU@ | 166E4 | VFSXU@ | 1670A | VFFXU@ | 16730 |
| ETSIOXA * | 16820 | DF4 | OPEN | 16820 | GET | 16A16 | PUT | 16B50 | CLOSE | 16C36 |
| | | | REOPEN | 16D00 | | | | | | |
| ROUND * | 17618 | 1C2 | | | | | | | | |
| START * | 177E0 | 45A | STARTX | 17BCE | | | | | | |
| BOOL * | 17C40 | A8 | AND | 17C40 | OR | 17C58 | XOR | 17C70 | COMP | 17C88 |
| IFYFIXPI* | 17CE8 | 1D0 | FIXPI@ | 17CE8 | | | | | | |
| IFYFRXPI* | 17EB8 | 1B8 | FRXPI@ | 17EB8 | | | | | | |
| SCLEAR * | 18070 | 352 | | | | | | | | |
| STEXIT * | 183C8 | CA8 | | | | | | | | |
| TRANSL * | 19070 | 2F4 | | | | | | | | |
| IFYLSQRT* | 19368 | 1DC | DSQRT | 19368 | D#SQRT | 19368 | IH#DSQRT | 19368 | | |
| FILCHR * | 19548 | 84 | | | | | | | | |
| IFYVCLMI* | 195D0 | 19C | IFYVCLMA | 196F0 | | | | | | |
| IFYVLCI0* | 19770 | 486 | IFYVLCI1 | 19770 | IFYCLCI@ | 19770 | IFYDLCI@ | 19770 | IFYVLCIN | 19770 |
| MOVCHR * | 19B78 | 36 | | | | | | | | |

| NAME | ORIGIN | LENGTH |
|------|--------|--------|
| MOVSTR * | 19B80 | 88 |
| NEWPG * | 19C38 | 548 |
| NUMARG * | 1A180 | 56 |
| CLOCK * | 1A1D8 | 1F0 |
| DATE * | 1A3C8 | 1C8 |
| IFYVCLSI* | 1A588 | 370 |
| LOCSTR * | 1A8F8 | 2D4 |
| MODCHK * | 1ABD0 | 208 |
| SETCLK * | 1ADD8 | C4 |
| TRBCD * | 1AEA0 | 28A |
| BITPRG * | 1B130 | 29C |
| FSTAT | 1B3D0 | EC |
| PGTOP | 1B4C0 | F8 |
| LIST | 1B5B8 | 1F40 |
| REX | 1D4F8 | 34 |

| NAME | LOCATION | NAME | LOCATION | NAME | LOCATION | NAME | LOCATION |
|------|----------|------|----------|------|----------|------|----------|
| ITIME | 1AE1A | | | | | | |
| CLRBIT | 1B130 | SETBIT | 1B148 | TSTBIT | 1B160 | NXTBIT | 1B178 |
| NXTOFF | 1B190 | | | | | | |

ENTRY ADDRESS      88

TOTAL LENGTH    1D530
** GO      DID NOT PREVIOUSLY EXIST BUT HAS ADDED AND HAS AMODE 31
** LOAD MODULE HAS RMODE ANY
** AUTHORIZATION CODE IS       0.
PLOT WINDOW INPUT (XMIN,XMAX,YMIN,YMAX) =    4.98  -1.00   4.50  -1.00

A POINT IS IGNORED IF ITS WEIGHT IS LESS THAN    0.00%

A POINT IS IGNORED IF IT LIES OUTSIDE A LEFT MARGIN OF  1.00 INCHES

A POINT IS IGNORED IF IT LIES OUTSIDE A RIGHT MARGIN OF  0.00 INCHES

A POINT IS IGNORED IF IT LIES ABOVE A TOP MARGIN OF  1.00 INCHES

A POINT IS IGNORED IF IT LIES BELOW A BOTTOM MARGIN OF  1.00 INCHES

1295 POINTS OF DARK FOUND BY PREP.

TRY IMAGE PROCESSOR DATA AT 100 DPI
SUPER-PIXELS AT 100 TO THE INCH

DERIVED X- AND Y-COORDINATES - WEIGHT VALUES PLOTTED

```
        *.****.****.****.****.****.****.****.****.****.****.****.****.****.****.****.****.****.*
   4.99 *                          AAA                                                         *  4.99
   4.98 *                          AAA                                   -                     *  4.98
   4.97 *                          AAAA                                                        *  4.97
   4.96 ..                         AAAA                                                        .. 4.96
   4.95 *                          AAAA                                                        *  4.95
   4.94 *                          AAAA          A                                             *  4.94
   4.93 *                          AAAA         AA                                             *  4.93
   4.92 *                          AAAA         AA                                             *  4.92
   4.91 *                          AAAA        AAA                                             *  4.91
   4.90 ..                         AAAA        AAA                                             .. 4.90
   4.89 *                  AAA     AAAA        AAA                                             *  4.89
   4.88 *                  AAAA    AAAA       AAA                                              *  4.88
   4.87 .                  AAA     AAAA       AAA                                              .  4.87
   4.86 *                  AAAA    AAAA      AAAA                                              *  4.86
   4.85 *                  AAAA    AAAA      AAA                                               *  4.85
   4.84 ..                 AAAAA   AAA       AAAA                                              .. 4.84
   4.83 .                  AAAAA   AAA      AAAAA                                              .  4.83
   4.82 *                  AAAAA   AAA      AAAAA                                              *  4.82
   4.81 *                   AAAA   AAA     AAAAA                                               *  4.81
   4.80 *                   AAAA   AAA     AAAA                                                *  4.80
   4.79 *                   AAAA   AAA    AAAAA                                                *  4.79
   4.78 ..                  AAAAA  AAA    AAAAA                                                .. 4.78
   4.77 *                    AAAAA AAA   AAAAAA                                                *  4.77
   4.76 *                    AAAAA AAA   AAAAA                                                 *  4.76
   4.75 .                    AAAAA AAA  AAAAAA                                                 .  4.75
   4.74 *                     AAAAAAAA  AAAAAA                                                 *  4.74
   4.73 *                     AAAAAAAA AAAAAAA                                                 *  4.73
   4.72 ..                    AAAAA AAAAAAAAA                                                  .. 4.72
   4.71 *                      AAAAAAAAAAAAAAA                                                 *  4.71
   4.70 *                      AAAAA AAAAAAAAA                                                 *  4.70
   4.69 .                       AAAAAAAAAAAAAA                                                 .  4.69
   4.68 *                       AAAAAAAAAAAAA                                                  *  4.68
   4.67 *                        AAAAAAAAAAAA                                                  *  4.67
   4.66 .                         AAAAAAAAAA                                                   .  4.66
   4.65 *                         AAAAAAAAAA                                                   *  4.65
   4.64 *                         AAA  AAA                                                     *  4.64
   4.63 .                         AAA  AAA                                                     .  4.63
   4.62 *                         AAAAAAAA                                                     *  4.62
   4.61 *                         AAAAAAA                                                      *  4.61
   4.60 .                         AAAAAAA                                                      .  4.60
   4.59 *                          AAA                                                         *  4.59
   4.58 *                                                                                      *  4.58
   4.57 .                                           -                                          .  4.57
   4.56 *                                                                                      *  4.56
   4.55 *                                                                                      *  4.55
   4.54 ..                                                                                     .. 4.54
   4.53 *                                                                                      *  4.53
   4.52 *                                                                                      *  4.52
   4.51 .                                                                                      .  4.51
   4.50 *                                                                                      *  4.50
        *.****.****.****.****.****.****.****.****.****.****.****.****.****.****.****.****.****.*
        4.9850   5.0850   5.1850   5.2850   5.3850   5.4850   5.5850   5.6850   5.7850   5.8850   5.9850
```

TOTAL NUMBER OF POINTS PLOTTED =   393

1055 CARDS/RECORDS WERE READ

I/O SUMMARY:
| UNIT | FT10 | FT11 | FT12 | FT13 | FT14 |
|------|------|------|------|------|------|
| CALLS TO GET | 1055 | 0 | 0 | 0 | 0 |

NO ERRORS DETECTED BY F4STAT

15:53:34  4/07/89  PAGE   2
F4STAT 3.55V

What is claimed is:

1. An automatic testing system for determining a figural response to a test inquiry, comprising:
   (a) a test sheet of predetermined dimensions and having a grid thereon, said grid defining a plurality of marking areas arranged in predetermined positions on said test sheet;
   (b) a two-dimensional figural arrangement on said test sheet, said figural arrangement having a first optical reflectivity, said figural arrangement further being arranged within said grid and corresponding to at least one of said marking areas;
   (c) response indicia of a second optical reflectivity created by a test taker in making a two dimensional figural response by overmarking selected response marking areas on said test sheet in relation to said figural arrangement;
   (d) optical scanning means having different optical sensitivities to said first and second optical reflectivities for scanning said sheet to determine the positions of said response marking areas in at least two dimensions on said test sheet;
   (e) memory means for storing key position data representative of at least one predetermined key marking area on said test sheet; and
   (f) processing means for comparing said response marking areas with said key position data and generating an indication of the comparison.

2. The system of claim 1 wherein optical scanning means comprises image processing means.

3. The system of claim 2 wherein said image processing means comprises a resolution of up to about 400 dpi.

4. The system of claim 3 wherein said image processing means has a resolution of about 40–300 dpi.

5. The system of claim 1 wherein said optical scanning means comprises an optical mark reader.

6. The system of claim 1 wherein said test sheet comprises a plurality of timing marks for indicating a potential row of response positions.

7. The system of claim 1, wherein said memory means comprises stored key position data representative of a plurality of predetermined key marking areas, and wherein said processing means compares said response marking areas with said key marking areas in accordance with a hierarchy of possible figural responses.

8. A method of testing for figural responses to a test inquiry, comprising:
   (a) presenting a test sheet of predetermined dimensions and having a grid thereon, said grid comprising a plurality of marking areas arranged in predetermined positions, said grid further comprising a two-dimensional figural arrangement thereon with a first optical reflectivity, said figural arrangement comprising part of said test inquiry;
   (b) storing the position of at least one predetermined key marking area on said test sheet corresponding to a specified figural response to said test inquiry;
   (c) instructing a test taker to make a figural response to said test inquiry, wherein said test taker provides at least one mark positioned on said sheet in relation to said figural arrangement, said mark having indicia of a second optical reflectivity;
   (d) optically scanning said test sheet to determine the position of said mark made by the test taker in at least two dimensions and generating data representative of a position of said mark; and
   (e) comparing said determined position and said stored position and generating a numerical indication of said comparison.

9. The method of claim 8 wherein said storing step (b) further comprises scanning said predetermined key marking area on a key item sheet to determine the position of said specified figural response.

10. The method of claim 9 wherein said key item sheet comprises a plurality of predetermined key marking areas for defining a range of correct answers.

11. The method of claim 8, wherein said storing step comprises storing data representative of a plurality of key marking areas, and wherein said comparing step comprises comparing said determined position with said stored key marking areas in accordance with a predetermined hierarchy of possible figural response.

12. The method of claim 11, wherein said stored key marking areas data includes data indicative of an incorrect response, and further comprising determining whether an incorrect response has been made.

* * * * *